United States Patent
Hagawa et al.

(10) Patent No.: US 12,494,271 B2
(45) Date of Patent: Dec. 9, 2025

(54) GENERATION PROCESS OUTPUT DEVICE, GENERATION PROCESS OUTPUT METHOD, AND RECORDING MEDIUM

(71) Applicant: Panasonic Intellectual Property Management Co., Ltd., Osaka (JP)

(72) Inventors: Reiko Hagawa, Osaka (JP); Hiromasa Tamaki, Osaka (JP); Mayu Moriwaki, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 2 days.

(21) Appl. No.: 18/234,113

(22) Filed: Aug. 15, 2023

(65) Prior Publication Data

US 2023/0386617 A1    Nov. 30, 2023

Related U.S. Application Data

(63) Continuation of application No. PCT/JP2022/006381, filed on Feb. 17, 2022.

(30) Foreign Application Priority Data

Feb. 22, 2021   (JP) .................... 2021-026720

(51) Int. Cl.
   G06F 16/904   (2019.01)
   G16C 60/00    (2019.01)
(52) U.S. Cl.
   CPC .......... *G16C 60/00* (2019.02); *G06F 16/904* (2019.01)

(58) Field of Classification Search
   CPC ..................................... G06F 16/904
   See application file for complete search history.

(56) References Cited

U.S. PATENT DOCUMENTS

| | | | | |
|---|---|---|---|---|
| 11,610,652 B2* | 3/2023 | Aykol | ............... | B01J 19/004 |
| 2011/0106794 A1* | 5/2011 | Hori | ............... | G16C 20/10 |
| | | | | 707/723 |
| 2020/0050947 A1* | 2/2020 | Kishimoto | ............ | G06N 5/025 |
| 2021/0065851 A1* | 3/2021 | Madrid | ............... | G16C 20/70 |
| 2022/0359045 A1* | 11/2022 | Manica | ............... | G06F 16/355 |
| 2023/0037015 A1* | 2/2023 | Fukada | ............... | G06N 3/09 |

FOREIGN PATENT DOCUMENTS

| | | |
|---|---|---|
| JP | 11-53425 | 2/1999 |
| JP | 2020-77257 | 5/2020 |

OTHER PUBLICATIONS

International Search Report (ISR) issued on May 17, 2022 in International (PCT) Application No. PCT/JP2022/006381.

* cited by examiner

*Primary Examiner* — Khanh B Pham
(74) *Attorney, Agent, or Firm* — Wenderoth, Lind & Ponack, L.L.P.

(57) ABSTRACT

A generation process display device that is a generation process output device includes: a first information obtainer that obtains first information about a target material; a deriver that derives, for each of one or more types of generation processes, a generation parameter based on a database regarding materials, where the generation parameter indicates a degree that the generation process is required for generating the target material specified by the first information; and an outputter that outputs one or more generation parameters that have been derived.

16 Claims, 46 Drawing Sheets

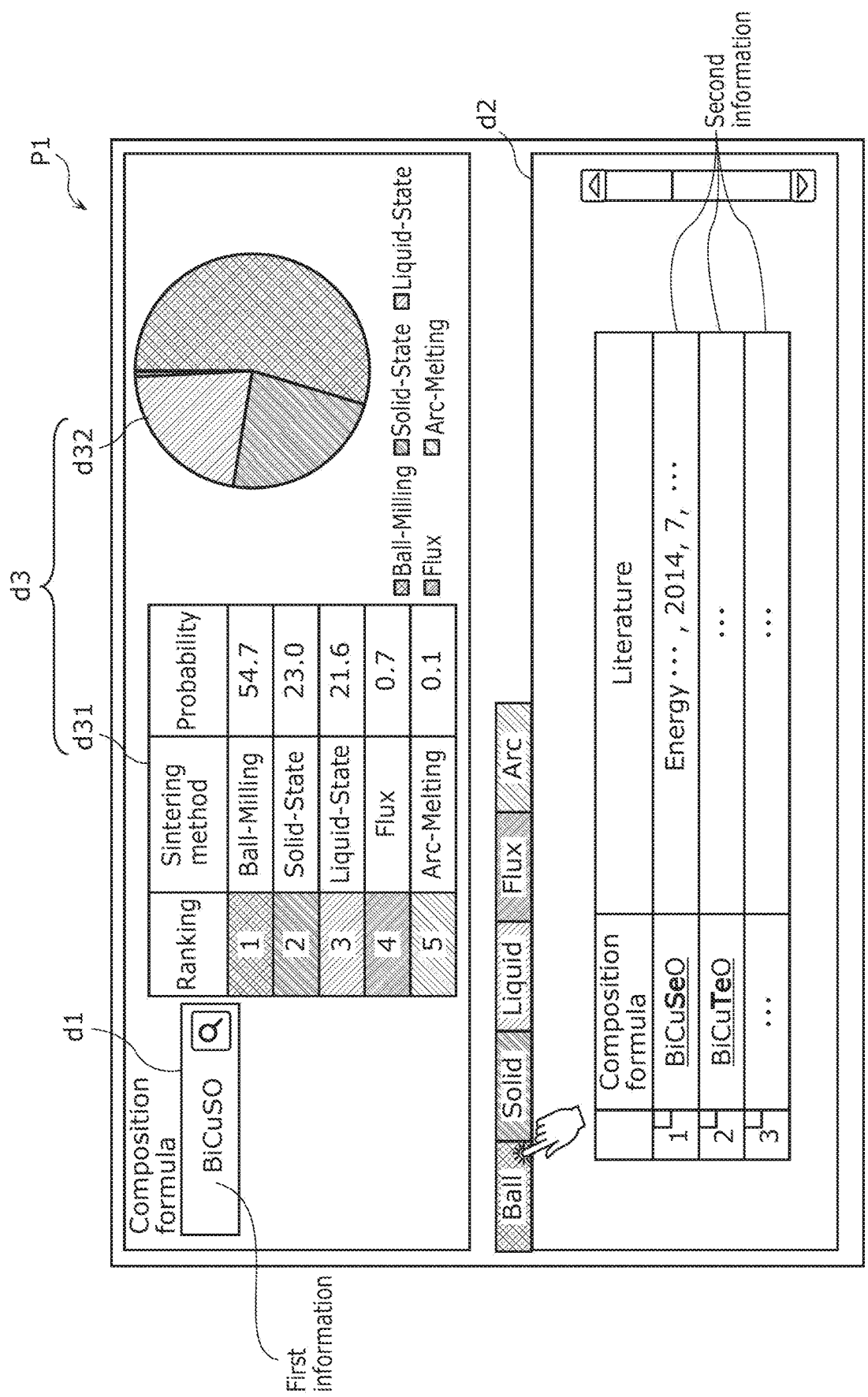

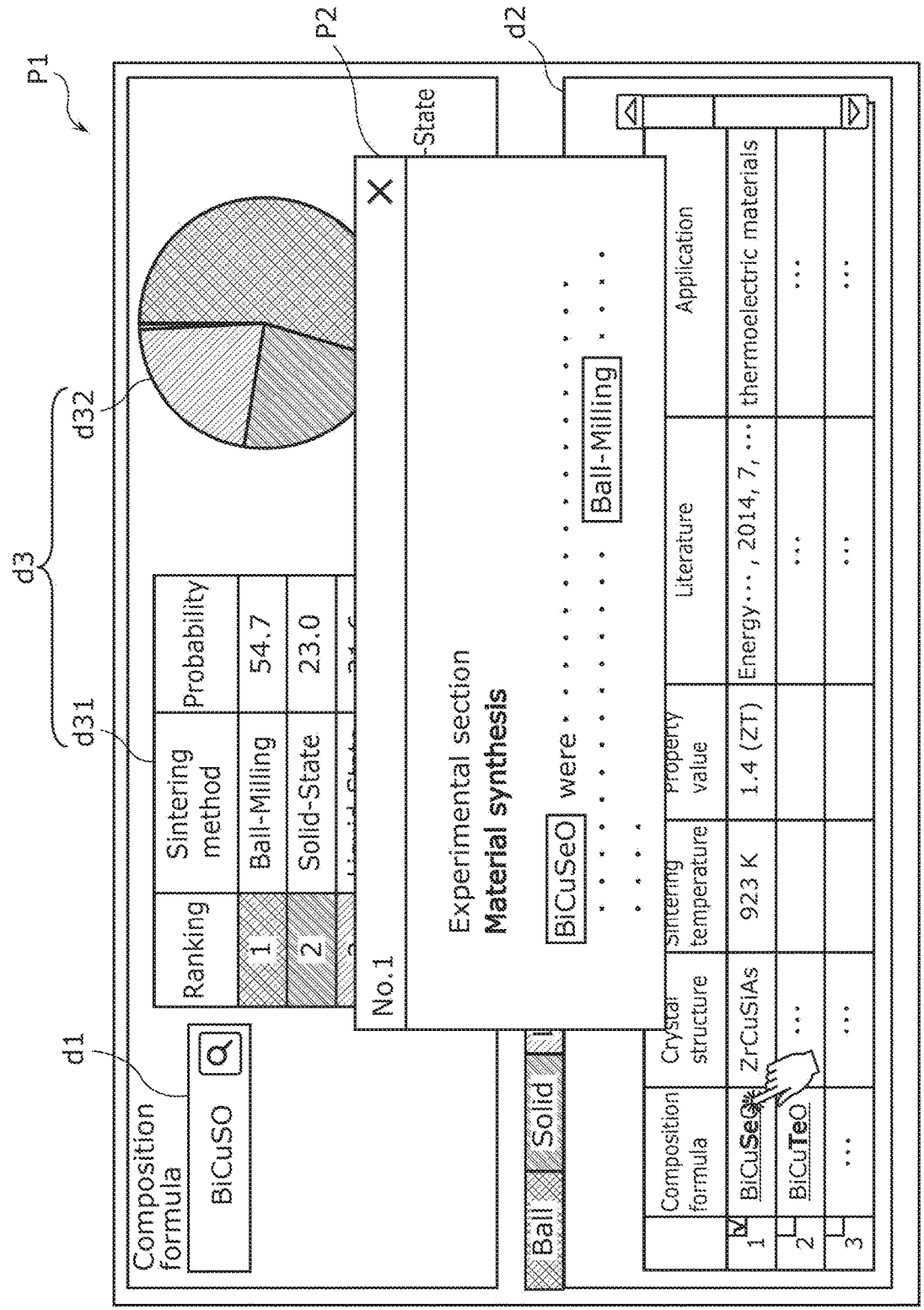

FIG. 10A

| Composition formula | | | |
|---|---|---|---|
| BiCuSO 🔍 | | | |

| Ranking | Sintering method | Probability |
|---|---|---|
| 1 | Ball-Milling | 54.7 |
| 2 | Solid-State | 23.0 |
| 3 | Liquid-State | 21.6 |
| 4 | Flux | 0.7 |
| 5 | Arc-Melting | 0.1 |

☒ Ball-Milling  ☒ Solid-State  ☒ Liquid-State
☒ Flux  ☒ Arc-Melting

| Ball | Solid | Liquid | Flux | Arc |

◉ Similar composition formula  ○ Sintering temperature  ○ Property value  ○ Literature information

[Map display]

| | Composition formula | Crystal structure | Sintering temperature | Property value | Literature | Application |
|---|---|---|---|---|---|---|
| 1 | BiCuSeO | ZrCuSiAs | 923 K | 1.4 (ZT) | Energy···, 2014, 7,··· | thermoelectric materials |
| 2 | BiCuTeO | ··· | | | ··· | ··· |
| 3 | ··· | | | | ··· | ··· |

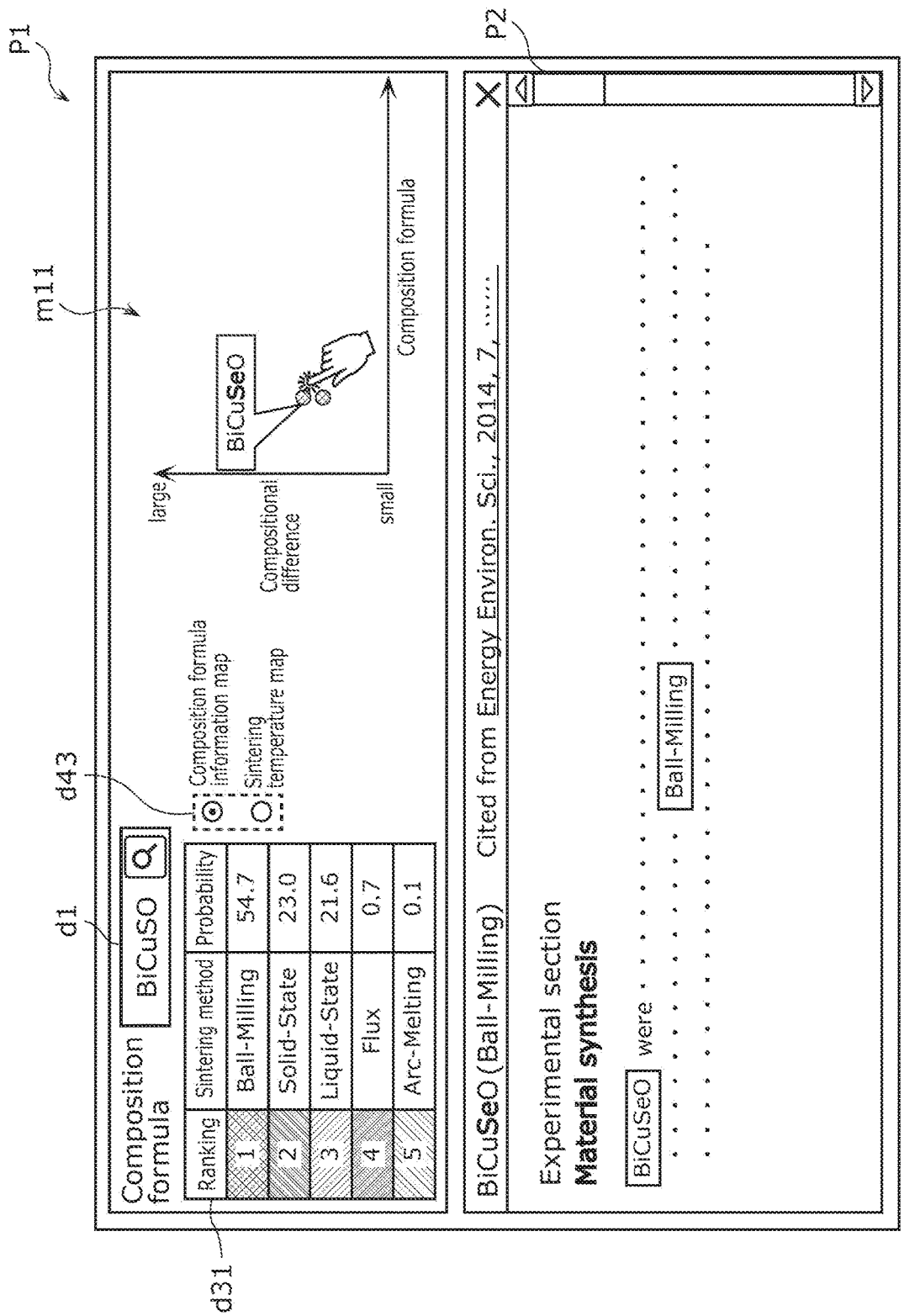

FIG. 22A

Second database

| Literature name | Application | Magnetic material | Amount of magnetic material | Resin | Amount of resin |
|---|---|---|---|---|---|
| Literature A | Magnetic polymer | Magnetic nanocomposite | 2 wt% | PVA | 10 wt% |
| Literature B | Release/Absorb | Magnetic particles | 17 wt% | PVA | 5 wt%, DMSO 10 ml |
| Literature C | Hyperthermia | MnxFe3-xO4-PEG nano particles | 15 wt% | PVP/PVA polymer | Distilled water |
| Literature D | Release/Absorb | Magnetic laponite RD | 0.4 g | PVA | 5 wt%, Distilled water 20 ml |
| Literature E | Magnetic composite film | Fe3O4O4 NP BzMe3NOH aqueous solution | Sonication 5 min | cellulose | 1.2 g |
| Literature F | Release/Absorb | Magnetic laponite RD | 0.4 g, Distilled water 50 ml | mPVA | 1 g, Distilled water 30 ml |
| Literature G | Crystal analysis | Magnetic nanocomposite | 10 wt% | PVA | |
| Literature H | Release/Absorb | Fe3O4 | | PVA | DMSO 10 ml |
| Literature I | Magnetic polymer | Fe2 +, Fe3 + | | PPy/PVA | |

FIG. 22B

Second database

| Literature name | Resin mixing temperature | Resin mixing time | Magnetic material mixing time | Agitation speed of magnetic material | Ultrasonic processing | Freezing temperature | Freezing time | Melting temperature | Melting time | Repetition | Freeze drying | Impurity removal |
|---|---|---|---|---|---|---|---|---|---|---|---|---|
| Literature A | 90°C | | | | FALSE | -20°C | 30 min | 25°C | 30 min | TRUE | | |
| Literature B | 80°C | 6 h | | | TRUE | -20°C | 16 h | 25°C | 5 h | TRUE | | TRUE |
| Literature C | 90°C | 30 min | 5 min | | FALSE | -20°C | 2.5 h | 25°C | 2.5 h | FALSE | | |
| Literature D | 90°C | 3 h | 10 h | 500 rpm | TRUE | -18°C | 10 h | 25°C | 5 h | TRUE | | |
| Literature E | | | 5 min | | FALSE | -24°C | 10 h | 25°C | | FALSE | TRUE | |
| Literature F | 85°C | | 2 h | 700 rpm | TRUE | -20°C | 10 h | 21°C | 5 h | TRUE | | |
| Literature G | 80°C | | | | FALSE | -10°C | 3 h | 25°C | 1 h | TRUE | | |
| Literature H | 80°C | 6 h | | | TRUE | -20°C | 16 h | 25°C | 5 h | TRUE | TRUE | TRUE |
| Literature I | | | | | FALSE | -20°C | 4 h | | | FALSE | TRUE | TRUE |

GENERATION PROCESS OUTPUT DEVICE, GENERATION PROCESS OUTPUT METHOD, AND RECORDING MEDIUM

CROSS REFERENCE TO RELATED APPLICATIONS

This is a continuation application of PCT International Application No. PCT/JP2022/006381 filed on Feb. 17, 2022, designating the United States of America, which is based on and claims priority of Japanese Patent Application No. 2021-026720 filed on Feb. 22, 2021. The entire disclosures of the above-identified applications, including the specifications, drawings and claims are incorporated herein by reference in their entirety.

FIELD

The present disclosure relates to, for instance, a generation process output device that outputs information about a generation process for a material.

BACKGROUND

Conventionally, a system for supporting the search of a synthesis process for a material has been proposed (see PTL 1, for example). A synthesis process is a process for generating a target material through synthesis and is also referred to as a generation process.

CITATION LIST

Patent Literature

PTL 1: Japanese Unexamined Patent Application Publication No. H11-53425

SUMMARY

Technical Problem

However, with the system disclosed in PTL 1 mentioned above, support for the search of a generation process for a target material is insufficient.

In view of this, the present disclosure is to solve the above problem and provides, for instance, a generation process output device capable of more appropriately supporting the search of a generation process for a target material.

Solution to Problem

A generation process output device according to one aspect of the present disclosure includes: a first information obtainer that obtains first information about a target material; a deriver that derives, for each of one or more types of generation processes, a generation parameter based on a database regarding materials, the generation parameter indicating a degree that the generation process is required for generating the target material specified by the first information; and an outputter that outputs one or more generation parameters that have been derived, where each of the one or more generation parameters is the generation parameter.

Advantageous Effects

According to the present disclosure, it is possible to more appropriately support the search of a generation process for a target material.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8A is a diagram illustrating an example of a process-related image according to Embodiment 1.

FIG. 8D is a diagram illustrating an example of a reference image according to Embodiment 1.

FIG. 10A is a diagram illustrating an example of a process-related image according to Embodiment 2.

FIG. 17B is a diagram illustrating an example of a process-related image according to Embodiment 5.

FIG. 22A is a diagram illustrating one example of information indicated in a second database according to Embodiment 6.

FIG. 22B is a diagram illustrating one example of information indicated in the second database according to Embodiment 6.

DESCRIPTION OF EMBODIMENTS

Knowledge Leading to the Present Disclosure

Figure 1:
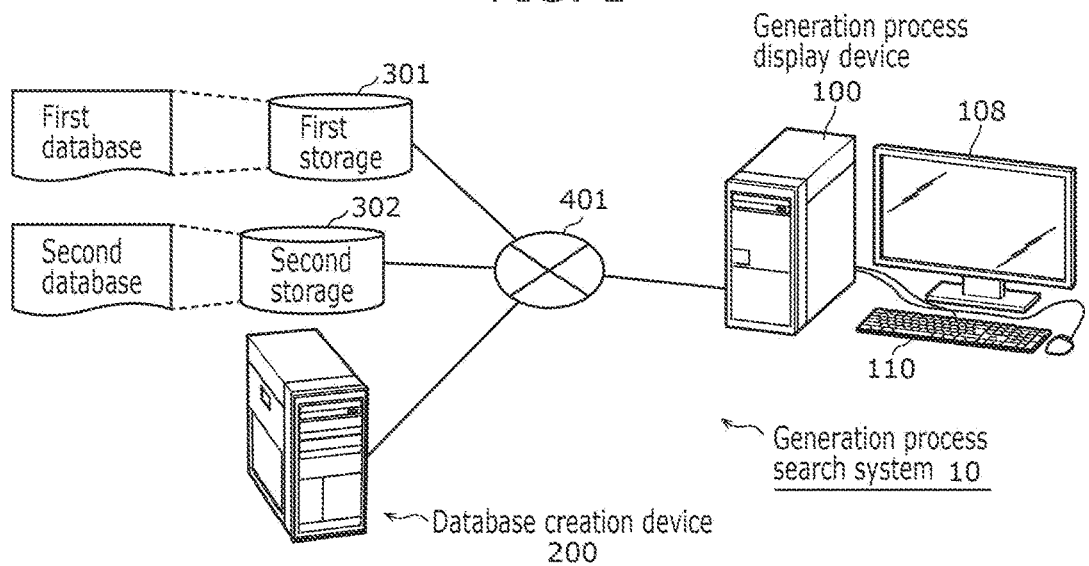
FIG. 1 is a diagram illustrating one example of the configuration of a generation process search system according to each of embodiments.

To create a new material (also referred to as a target material or a new compound), it is necessary to find out a synthesis process from combinations of a huge number of experimental conditions. The current situation is that a search for a synthesis process relies on knowledges and experiences of researchers conducting the search. It requires much time and expenses to find an optimal synthesis process from a vast number of experimental conditions, and it is not easy even for experienced researchers to find a synthesis process for a new compound. This is why there are attempts to reduce development costs for a new material by leaving a search for a synthesis process to a calculator. A search for a synthesis process by a calculator is performed by analyzing the relationship of material names, experimental procedures, and experimental conditions stored in a known database, and studies are in progress focusing on the material development of an organic material (also referred to as an organic compound). There is, however, a problem that even with the system disclosed in PTL 1, the user cannot easily grasp the necessity of each of plural types of generation processes, i.e., plural types of synthesis processes, that is, a possibility that a target material is generated using the generation process if stated differently.

In order to solve the problem as described above, a generation process output device according to one aspect of the present disclosure includes: a first information obtainer that obtains first information about a target material; a deriver that derives, for each of one or more types of generation processes, a generation parameter based on a database regarding materials, where the generation parameter indicates a degree that the generation process is required for generating the target material specified by the first information; and an outputter that outputs one or more generation parameters that have been derived, where each of the one or more generation parameters is the generation parameter. For example, the outputter may output the generation parameter indicating the degree as at least one of a generation probability or a ranking. The generation probability may be a probability that a generation process of a type corresponding to the generation probability is required for the generation of the target material. The ranking may be achieved by arranging the one or more types of generation processes in order of the degree. It should be noted that material generation is, for example, material synthesis, and material synthesis is, for example, material sintering. The one or more types of generation processes may be, for example, one or more types of sintering methods, or may include, for instance, ultrasonic processing.

With this, the generation parameter of each type of a generation process for a target material is output. In other words, the user can easily grasp, for each type of the generation process, the necessity of the generation process for the generation of the target material, i.e., a possibility that the target material is generated using the generation process. Accordingly, in the generation of the target material, the user can firstly grasp, for each generation process type, the possibility that the target material is generated, and then select a generation process. As a result, even if the user is a researcher with poor knowledge and experience, they can easily select a generation process. If the user is a researcher with good knowledge and experience, they can make the use of their knowledges and experiences to select a generation process more accurately. When the generation parameter of each of plural types of generation processes is output and displayed, for example, the user can find out, among those generation processes, a generation process of a type that is most required for the generation of a target material. It can be also said that the generation process of such a type is a generation process of a type that is most likely to generate the target material. The user can then determine that the target material can be generated using that generation process. As a result, the search of a generation process for a target material by the user can be more appropriately supported.

The deriver may input a descriptor related to the target material to a predictor to derive the generation parameter of each of the one or more types of generation processes for the target material. The predictor is trained using the database to output, in response to the input of a descriptor related to a material, the generation parameter of each of the one or more types of generation processes for the material. The predictor is, for example, a neural network. For example, the predictor may be trained using the database to output, in response to the input of a descriptor indicating a composition, the generation parameter of each of the one or more types of generation processes for a material having the composition. The deriver may input a descriptor indicating the composition of the target material to the predictor to derive the generation parameter of each of the one or more types of generation processes for the target material. Alternatively, the predictor may be trained using the database to output, in response to the input of a descriptor indicating one or more raw materials for generating a material, the generation parameter of each of the one or more types of generation processes for the material. The deriver may input a descriptor indicating one or more raw materials for generating the target material to the predictor, to derive the generation parameter of each of the one or more types of generation processes for the target material.

With this, even though neither the composition of a target material nor one or more raw materials are indicated in a database, the generation parameter of each of one or more types of generation processes for an unknown target material can be derived by using a trained predictor.

The outputter may generate a first image indicating the one or more generation parameters, and output the first image to a display to output the one or more generation parameters.

With this, a first image (i.e., a process-related image) indicating generation parameters is displayed on a display, and the user can therefore easily grasp the generation parameters by viewing the first image. When the generation parameter of each of plural types of generation processes is indicated in the first image, for example, the user can determine that a target material can be generated using the generation process of a type corresponding to the largest generation parameter. If the user does not own a generation device capable of implementing the generation process of the type corresponding to the largest generation parameter, the user can check the generation parameter of a type corresponding to a generation process implementable by a generation device owned by the user. The user can determine to attempt the generation of the target material even with the generation process of a type corresponding to the smallest generation parameter if the generation parameter indicates the generation probability of, for example, at least 30%.

The generation process output device may further include: a second information obtainer that obtains second information of each of one or more known materials related to the target material from a database regarding materials. The outputter may generate the first image so as to additionally indicate the second information of each of the one or more known materials. When a single second information item among second information items of the one or more known materials indicated in the first image is selected, the second information obtainer may further obtain, from the database, the area of part of literature that describes a generation process for generating the known material indicated in the selected single second information item. The outputter may further generate, as a second image, an image indicating the description in the area of the part of the literature, to output the image to the display.

With this, the following is displayed for each of one or more known materials related to a target material: second information indicating the known material; and the area of part of literature that describes the generation process of the known material. As a result, in the generation of the target material, the user can firstly grasp, for each generation process type and from a wider viewpoint, a possibility that the target material is generated, and then select a generation process. In other words, the user can easily know what kind of generation process is performed for a known material similar to the target material. Accordingly, the search of a generation process for a target material can be more appropriately supported.

When the generation parameter of each of N types of generation processes is derived by the deriver and the generation parameter of each of M types of generation processes satisfies a predetermined condition, where N is an integer of 3 or greater, M is a predetermined integer of at least 1 and less than N, and the M types of generation processes each have a greater degree than other remaining generation processes among the N types of generation processes, the outputter may generate the first image indicating the generation parameter of each of the M types of generation processes and not indicating generation parameters of the other remaining generation processes among the N types of generation processes.

Accordingly, when a generation probability indicated by the generation parameter of one type of generation process among plural types of generation processes is the only generation probability indicating at least a threshold 80%, for example, only the generation probability of that one type of generation process is displayed and the generation probabilities of the other remaining generation processes are not displayed. In the example described above, a predetermined condition is that a generation probability is at least a threshold 80%. Accordingly, the user can easily find the most probable generation process for a target material. When the sum of two highest generation probabilities among the generation probabilities of three or more generation processes is at least a threshold 90%, for example, only the two highest generation probabilities are displayed and the other remaining generation probabilities are not displayed. The two highest generation probabilities are two generation probabilities higher than any other generation probabilities. In the example described above, a predetermined condition is that the sum of two highest generation probabilities is at least a threshold 90%. Accordingly, a generation parameter such as a generation probability that has no chance of generating a target material can be omitted from the first image, and unnecessary provision of information for the user can be inhibited.

The second information obtainer may obtain the second information indicating the composition formula and attribute of the known material. The outputter may further generate (i) a map presenting the relationship of composition formulae indicated in the second information items of the one or more known materials, (ii) a map presenting the relationship between a composition formula and an attribute indicated in the second information of each of the one or more known materials, or (iii) a map presenting the relationship of attributes indicated in the second information items of the one or more known materials, to output the map to the display, where each of the composition formulae is the composition formula, each of the attributes is the attribute, and each of the second information items is the second information.

With this, even when multiple second information items are displayed, the user can easily find out desired second information from these second information items since the second information items are displayed on a map. As a result, the user can easily select the desired second information and easily view a second image (i.e., a reference image) corresponding to the selected second information.

The attribute of the known material indicated in the second information may be at least one of the following: the crystal structure of the known material; a process condition in a generation process for generating the known material; a property value indicating the property degree of the known material; literature information for identifying literature that describes the known material; and an application of the known material. The process condition is a condition used for a generation process and is, for example, a temperature, a time, or the like.

Since this enables the user to know the attributes of each of known materials, the user can easily predict, based on these attributes, information serving as a reference for the generation of a target material.

The outputter may further: specify the type of a generation process implementable by a generation device owned by a user; and assign mutually different weights to (i) a degree indicated by the generation parameter of the generation process of the specified type, and (ii) degrees indicated by the other remaining generation parameters among the generation parameters of the one or more types of generation processes, to generate the first image indicating the generation parameter of each of the one or more types of generation processes that have been updated.

With this, it is possible to increase the generation parameter of a generation process implementable by a generation device owned by the user and decrease the generation parameter of a generation process implementable only by a generation device not owned by the user. Accordingly, not only a possibility for the chemical generation of a material but also a possibility for a generation that takes user's environment related to the generation into consideration can be derived as a generation parameter. As a result, the display of a large generation parameter can be inhibited for a generation process implementable only by a generation device not owned by the user, i.e., a generation process with a low generation possibility in terms of user's environment.

The second information obtainer may further obtain estimated information regarding the estimation of a generation device that can implement one or more of the other remaining generation processes excluding the generation process of the specified type among the one or more types of generation processes. The outputter may further output an image indicating the estimated information to the display.

This enables the user to easily request, in accordance with displayed estimated information, the estimation of a generation device not owned by the user.

The second information of each of the one or more known materials may include an estimated required time which is a time required for generating the known material. The outputter may arrange the second information of each of the one or more known materials in an order according to the estimated required time indicated in the second information, and generate the first image indicating one or more second information items arranged in the order, where each of the one or more second information items is the second information.

With this, the estimated required time of each of one or more known materials is displayed, and the user can therefore predict a time required for the generation of a target material based on the estimated required times. Moreover, since the estimated required times are arranged in order and displayed, the user can easily grasp the largest value, the smallest value, or the dispersion of the estimated required time and more appropriately predict the time required for the generation of the target material. If the second information of each of one or more known materials also indicates a generation process for generating the known material, the user can easily determine which generation process can reduce the time required for the generation of the target material. Even when the user considers using a generation process corresponding to the largest generation parameter indicated in the first image for the generation of the target material, for example, if the estimated required time of the generation process is long, the user can determine to use a generation process corresponding to the second largest generation parameter for the generation of the target material. In other words, the user can select a generation process for the target material in consideration of a time required for the generation of the target material.

Hereinafter, embodiments of the present disclosure will be described in detail with reference to the drawings.

The embodiments described below each present a general or specific example. The numerical values, shapes, materials, elements, the arrangement and connection of the elements, steps, an order of the steps, etc. described in the following embodiments are mere examples, and therefore are not intended to limit the present disclosure. Among elements described in the following embodiments, those not recited in any of the independent claims indicating the broadest concept are described as optional elements.

The drawings are schematic drawings and are not necessarily strict illustrations. In the drawings, identical elements are assigned with like reference signs.

[Generation Process Search System 10]

Prior to describing Embodiments 1 through 5 in detail, the configuration of generation process search system 10 commonly used in Embodiments 1 through 5 will be described. Embodiments 1 through 5 particularly describe a sintering method in a generation process. In the material development of an inorganic material (also referred to as an inorganic compound), the search of a generation process still very much depends on knowledges and experiences of researchers conducting the search. In creating an inorganic material, in particular, the selection of a sintering method included in a generation process is one of important factors in experimental conditions. A sintering method, in general, is a method of sintering a raw material at high temperature to change the nature of the raw material, and various types of sintering methods are known. An optimal sintering method greatly depends on the combination of types and composition ratio of elements included in the inorganic material. A sintering method is also referred to as a burning method. In concept, material sintering is lower than material synthesis, and material synthesis is lower than material generation. Sintering may be therefore also referred to as generation or synthesis.

PTL 1 mentioned above discloses a synthesis route design system that includes: a means for applying reaction rules stored in a reaction knowledge base to predict a route for generating a target molecule from compounds purchasable from the market (i.e., a synthesis route); a means for estimating, for each of predicted synthesis routes, a variable expense index serving as the rough indication of a cost required for manufacturing a target molecule from starting materials; and a means for presenting estimated variable expense indices in ascending order to the user. In this synthesis route design system, the user can easily determine a synthesis route that is economically and industrially feasible among a large number of predicted synthesis routes.

However, the system disclosed in PTL 1, i.e., a system that supports the search of a synthesis route, does not have any function to display a sintering method with which a target material that is a target molecule is very likely to be synthesized. It is therefore difficult, in the synthesis of the target material, for the user to firstly grasp the synthesis possibility of each sintering method and then set experimental conditions.

Each of Embodiments 1 through 5 describes generation process search system 10 that enables the user to easily grasp the synthesis possibility of each sintering method.

FIG. 1 is a diagram illustrating one example of the configuration of generation process search system 10 according to each of Embodiments 1 through 5.

Generation process search system 10 includes generation process display device 100, display 108, input unit 110, database creation device 200, first storage 301, and second storage 302. For example, generation process display device 100, database creation device 200, first storage 301, and second storage 302 are mutually connected via network 401 such as the Internet.

Generation process display device 100 is configured as, for example, a computer such as a personal computer or a server, and displays, on display 108, information about a generation process which is a process for generating a target material. In each of Embodiments 1 through 5, the generation of a material is performed by synthesizing the material. Accordingly, material generation is also referred to as material synthesis. A generation process is therefore also referred to as a synthesis process. More specifically, the generation or synthesis of the material involves material sintering. Therefore, a generation process or synthesis process according to each of Embodiments 1 through 5 means a material sintering method.

Display 108 displays an image indicating information about the aforementioned generation process, i.e., the aforementioned synthesis process, in accordance with a signal output from generation process display device 100. Such display 108 is, for example, a liquid crystal display, a plasma display, or an organic electroluminescent (EL) display, but is not limited to these examples.

Input unit 110 configured as, for example, a keyboard, a touch sensor, a touch pad, or a mouse receives an input operation from the user of generation process display device 100, and outputs a signal in accordance with the input operation to generation process display device 100. In each of Embodiments 1 through 5, display 108 and input unit 110 are configured separately, but may be configured integrally like a touch panel. In each of Embodiments 1 through 5, generation process display device 100 neither includes display 108 nor input unit 110, but may include them.

Database creation device 200 is configured as, for example, a computer such as a personal computer or a server, and creates a second database to be used by generation process display device 100. Database creation device 200 reads a first database stored in first storage 301 from first storage 301 via network 401, and creates the second database using the first database. Database creation device 200 stores the created second database into second storage 302 via network 401.

First storage 301 is a recording medium for storing a first database. The first database includes a plurality of dissertation data items each indicating the content of a dissertation about material synthesis. Second storage 302 is a recording medium for storing a second database. The first database and the second database are each a database regarding materials. The details of the second database will be described later. These recording media are each any one of, for example, a hard disk drive, random access memory (RAM), read only memory (ROM), and a semiconductor memory. Such a recording medium may be either volatile or non-volatile.

In the example illustrated in FIG. 1, first storage 301 and second storage 302 are disposed outside database creation device 200, but may be included in database creation device 200. First storage 301 and second storage 302 may be directly connected to database creation device 200 without network 401 therebetween. The first database and the second database are stored in mutually different recording media, but may be stored in the same recording medium. A pair of the first database and the second database may be regarded as a single database.

Figure 2:
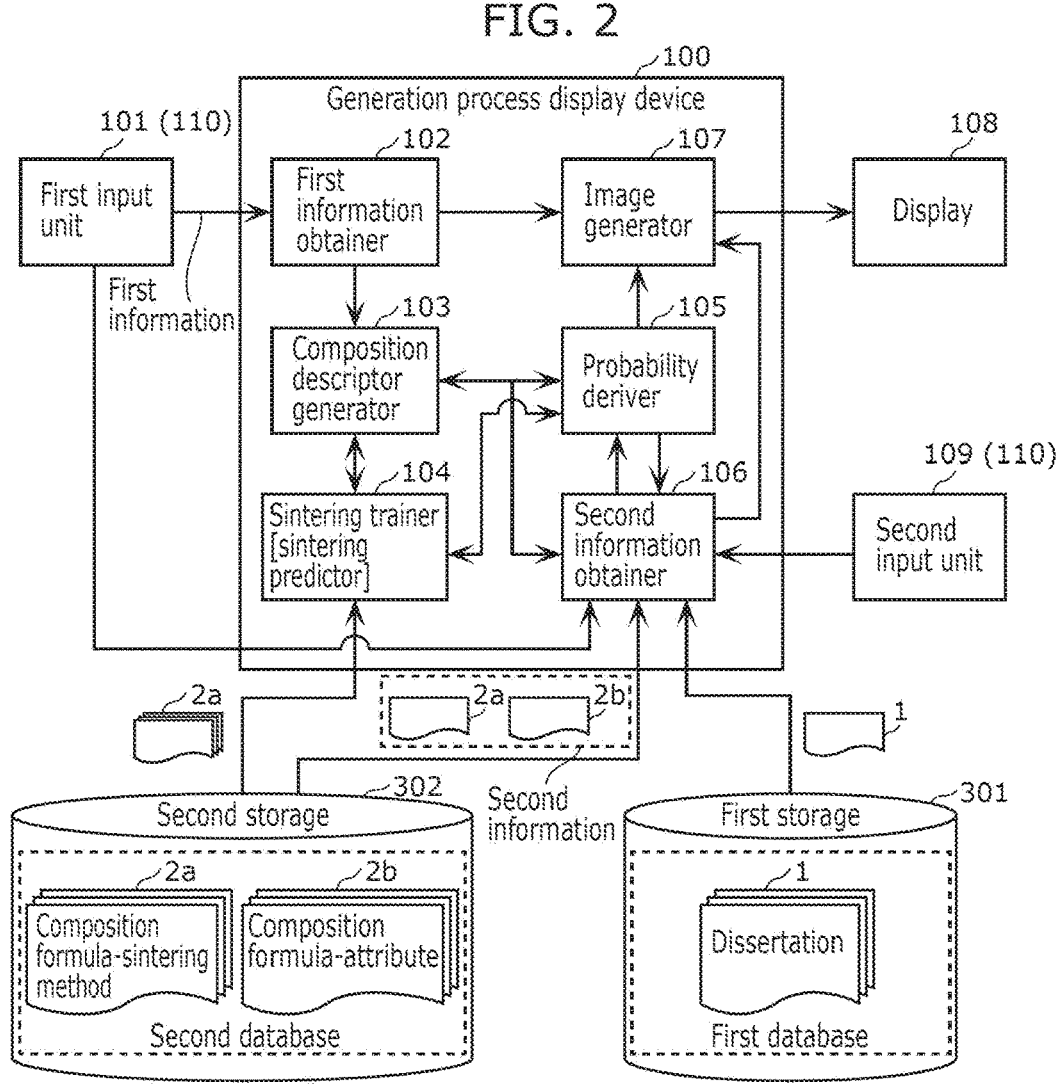
FIG. 2 is a block diagram illustrating one example of the functional configuration of a generation process display device according to each of the embodiments.

FIG. 2 is a block diagram illustrating one example of the functional configuration of generation process display device 100 according to each of Embodiments 1 through 5.

Generation process display device 100 uses a first database stored in first storage 301 and a second database stored in second storage 302. The first database includes a plurality of dissertation data items 1. Each of the plurality of dissertation data items 1 is associated with the composition formula of a primary material (i.e., a known material) to be synthesized which is indicated in dissertation data item 1. The second database includes a plurality of first synthesis information items 2a and a plurality of second synthesis information items 2b. Each of the plurality of first synthesis information items 2a indicates, in association with each other, (i) the composition formula of a known material, which is associated with dissertation data 1, and (ii) the type name of the sintering method of the known material. Each of the plurality of second synthesis information items 2b indicates, in association with each other, (i) the composition formula of a known material, which is associated with dissertation data 1, and (ii) an attribute of the known material indicated in that dissertation data 1. The attribute of the known material may be literature information of dissertation data 1 that indicates the known material, or the location of a paragraph which describes synthesis of the known material in dissertation data 1. The attribute of the known material may be the crystal structure, sintering temperature, property value, or application of the known material. The attribute of the known material may include part or all of the items listed above. Literature information is information for identifying dissertation data 1 and is, for example, part or all of the title, date of issue, year of publication, and name of author of dissertation data 1. The location of a paragraph is, for example, the paragraph number, title, or item number of the paragraph in dissertation data 1. The second database according to each of Embodiments 1 through 5 thus indicates, for each of a plurality of materials, the composition formula, sintering method, and attribute of the material in association with each other. With this, the obtainment of second information and the derivation of a generation probability can be appropriately performed, as will be described later. The data format of the second database, i.e., the data format of first synthesis information $2a$ and the data format of second synthesis information $2b$ may be, for example, a table format or a JavaScript Object Notation (JSON) format.

Hereinafter, the details of each of elements in generation process display device 100 illustrated in FIG. 2 will be described.

First, the details of each of the elements in generation process display device 100 will be described.

[Generation Process Display Device 100]

Generation process display device 100 is a device that displays information about a material generation process, and displays, in response to the input of a target composition formula by the user, the generation probability of each type of a sintering method for the target composition formula. A target composition formula is the composition formula of a material targeted for synthesis (i.e., a target material). The generation probability of each type of a sintering method for a target material or a target composition formula is a probability that indicates, for each of predetermined plural types of sintering methods, that the target material having the target composition formula is sintered using the sintering method. A generation probability is expressed, for example, in percentage. The higher the generation probability of a sintering method for a target material or a target composition formula is, the higher the possibility that the target material is sintered using the sintering method is.

Generation process display device 100 is connected to display 108 as well as first input unit 101 and second input unit 109 included in input unit 110. Generation process display device 100 includes first information obtainer 102, composition descriptor generator 103, sintering trainer 104, probability deriver 105, second information obtainer 106, and image generator 107. In each of Embodiments 1 through 5, generation process display device 100 includes none of first input unit 101, second input unit 109, and display 108, but may include at least one of them.

[First Input Unit 101]

First input unit 101 is a functional element included in input unit 110 and receives an input operation from the user to output, to first information obtainer 102, a composition formula in accordance with the input operation, i.e., a signal indicating the target composition formula of a target material to be displayed, for example.

[First Information Obtainer 102]

First information obtainer 102 receives a signal from first input unit 101. In other words, first information obtainer 102 obtains first information which is a signal indicating a target composition formula. First information obtainer 102 outputs the first information to composition descriptor generator 103 and image generator 107.

[Composition Descriptor Generator 103]

Composition descriptor generator 103 obtains first information from first information obtainer 102 and generates a composition descriptor corresponding to a target composition formula indicated in the first information. A composition descriptor is, for example, a vector uniquely indicating a composition formula. Specifically, when a composition formula is composed of one or more element types among element types of seventy-two types, a composition descriptor corresponding to the composition formula is a seventy-two-dimensional vector. When a composition formula is $CaMnO_3$, for example, a composition descriptor corresponding to the composition formula "$CaMnO_3$" is indicated by a three-dimensional vector composed of a combination of one or more element types among element types of three types, and is expressed by [1,1,3]. This composition descriptor [1,1,3] may be normalized so that the vector sum of the composition descriptor is 1 and may be expressed by [0.2, 0.2, 0.6]. Another example is that a composition descriptor is the weighted average, the largest value, or the smallest value of a known parameter unique to each element. As used herein, a known parameter unique to each element indicates a known number group, such as an atomic volume, a covalent radius, or a density, that each element has, and is obtainable without any physical calculation. The weighted average of the parameter is calculated based on the number of atoms composing a material. For example, the weighted average of the atomic radius of "$CaMnO_3$" is obtained by weighting 197 which is the atomic radius of Ca, 127 which is the atomic radius of Mn, and 60 which is the atomic radius of O with the ratio of "Ca:Mn:O=1:1:3". In other words, the weighted average of the atomic radius of "$CaMnO_3$" is derived by (197+127+60*3)/5=100.8. Composition descriptor generator 103 outputs the composition descriptor to probability deriver 105 and second information obtainer 106.

[Sintering Trainer 104]

Sintering trainer 104 conducts training about the relationship between a composition formula and a sintering method with reference to a second database in second storage 302, to create a sintering predictor that indicates the relationship. Sintering trainer 104 uses, as training data, a plurality of first synthesis information items $2a$ included in the second database. Each of the plurality of first synthesis information items $2a$ indicates, in association with each other, a composition formula and the type name of the sintering method of the known material having the composition formula. Sintering trainer 104 outputs the composition formula indicated in first synthesis information $2a$ to composition descriptor generator 103, and obtains a composition descriptor corresponding to the composition formula from composition descriptor generator 103. Sintering trainer 104 then, for each of the plurality of first synthesis information items $2a$, conducts training that uses, as training data, the composition descriptor corresponding to the composition formula indicated in first synthesis information $2a$ and the type name of the sintering method indicated in first synthesis information $2a$. Sintering trainer 104 thus creates a sintering predictor that outputs the generation probability of each of plural types of sintering methods in response to the input of a composition descriptor. The generation probability of each of the plural types of sintering methods is a probability indicating a possibility that a material having the composition formula corresponding to the input composition descriptor is sintered, i.e., synthesized, using the sintering method.

Upon obtaining, from probability deriver 105, the composition descriptor corresponding to the target composition formula, sintering training 104 inputs the composition descriptor to the sintering predictor to obtain the generation probability of each of the plural types of sintering methods for the target composition formula. Sintering trainer 104 then outputs the generation probabilities to probability deriver 105.

When update of the plurality of first synthesis information items 2a included in the second database is performed, sintering trainer 104 may conduct retraining of the sintering predictor based on the difference between first synthesis information items 2a after the update and first synthesis information items 2a before the update.

Figure 3:
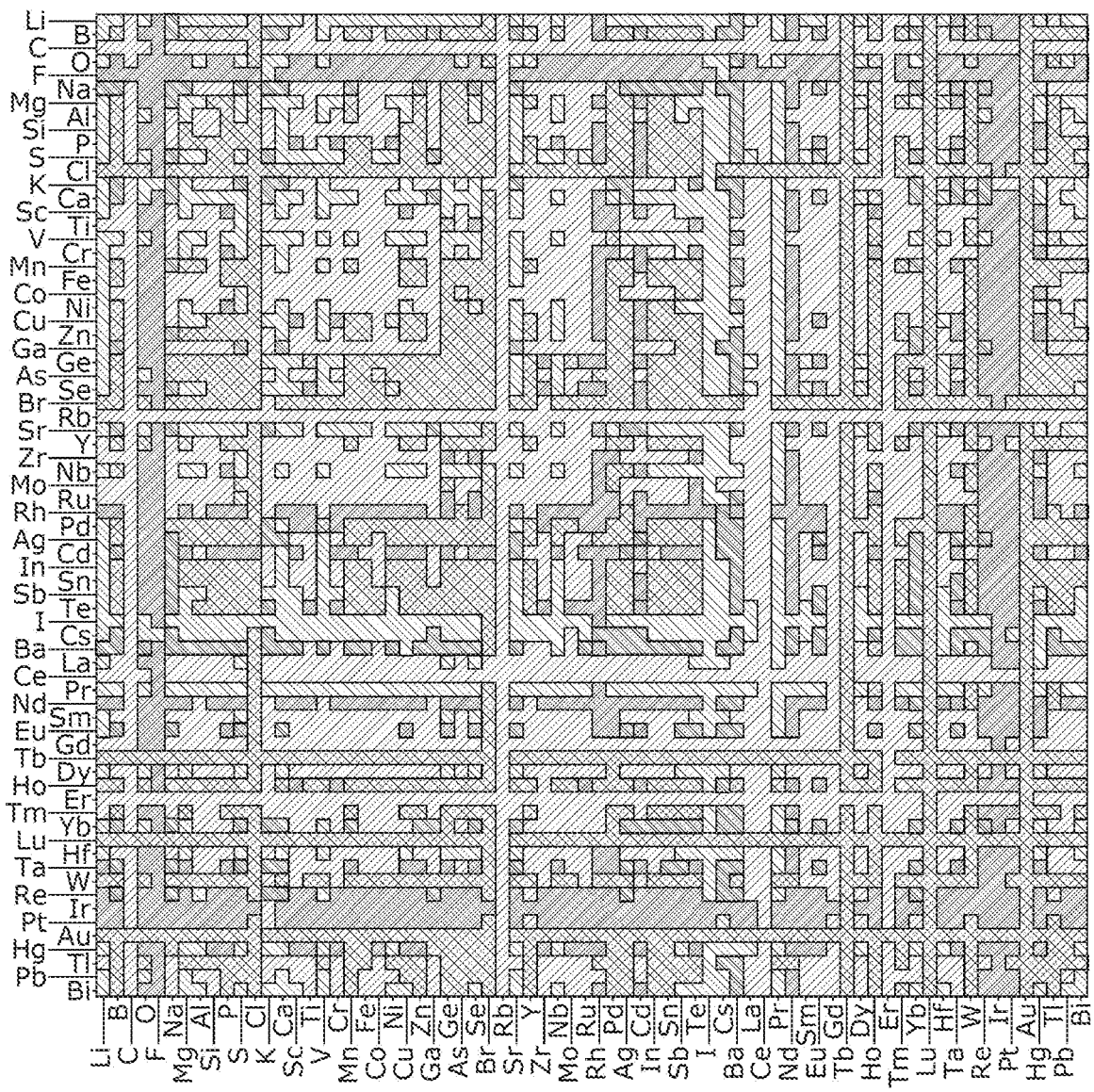
FIG. 3 is a diagram illustrating one example of the result of predicting a sintering method by a sintering predictor of a sintering trainer.

FIG. 3 is a diagram illustrating one example of the result of predicting a sintering method by the sintering predictor of sintering trainer 104. The map illustrated in FIG. 3 is a two-dimensional map having a vertical axis and a horizontal axis. In the two-dimensional map according to each of Embodiments 1 through 5, Li, B, C, O, F, Na, Mg, Al, Si, P, S, CI, K, Ca, Sc, Ti, V, Cr, Mn, Fe, Co, Ni, Cu, Zn, Ga, Ge, As, Se, Br, Rb, Sr, Y, Zr, Nb, Mo, Ru, Rh, Pd, Ag, Cd, In, Sn, Sb, Te, I, Cs, Ba, La, Ce, Pr, Nd, Sm, Eu, Gd, Tb, Dy, Ho, Er, Tm, Yb, Lu, Hf, Ta, W, Re, Ir, Pt, Au, Hg, TI, Pb, and Bi are adopted as element types. The element types listed above are arranged along the vertical axis in the stated order so that the intersection of the vertical axis and the horizontal axis (i.e., the lower left edge in FIG. 3) is an end point. The element types listed above are arranged along the horizontal axis in the stated order so that the intersection is a start point.

Sintering trainer 104 conducts training of the sintering predictor, using a plurality of first synthesis information items 2a obtained from second storage 302 and a plurality of composition descriptors obtained from composition descriptor generator 103. Sintering method types according to each of Embodiments 1 through are five types of Ball-Milling, Solid-State, Liquid-State, Flux, and Arc-Melting.

Next, the details of the two-dimensional map will be described using specific examples. Through the training described above, the sintering predictor of sintering trainer 104 outputs the generation probability of each of the five types of sintering methods in response to the input of a composition descriptor corresponding to the composition formula of a material. The two-dimensional map in FIG. 3 indicates, in association with each other, (i) a composition formula corresponding to a composition descriptor input to the sintering predictor, and (ii) the type of a sintering method corresponding to the highest generation probability among the generation probabilities of the five types of sintering methods, which are output from the sintering predictor for the composition formula. The composition formula is a composition formula formed by combining one element type on the vertical axis and one element type on the horizontal axis with the ratio of 1:1.

The two-dimensional map indicates the following: when one of combined element types is Li, and the other of the combined element types is C, Ti, Rb, Y, Zr, Mo, Ru, Ce, Gd, Er, Tm, or TI, a sintering method with the highest generation probability is Arc-Melting; when one of combined element types is Li, and the other of the combined element types is F, Rh, Nd, Ta, Re, Ir, or Pt, a sintering method with the highest generation probability is Solid-State; when one of combined element types is Li, and the other of the combined element types is CI, Br, Tb, Ho, Lu, W, or Au, a sintering method with the highest generation probability is Liquid-State; and when one of combined element types is Li, and the other of the combined element types is Na or Ba, a sintering method with the highest generation probability is Flux.

The two-dimensional map indicates that when one of combined element types is Rb and the other of the combined element types is any one of the listed element types, a sintering method with the highest generation probability is Arc-Melting.

The element types to be trained and the types of the sintering method are merely examples and the present disclosure is not limited to such examples. Moreover, the arrangement order of the element types is one example, and the element types may be arranged, placing emphasis on easy association between the vertical axis and the horizontal axis or on the viewability of the two-dimensional map.

[Probability Deriver 105]

Probability deriver 105 obtains, from composition descriptor generator 103, a composition descriptor corresponding to a target composition formula, and derives, as a generation probability, a possibility that a target material having the target composition formula is generated using each of the five sintering methods. The sintering predictor of sintering trainer 104 is used in the derivation of the generation probability. In other words, probability deriver 105 derives, for each of one or more types of sintering methods, a possibility that a target material having the target composition formula indicated in first information is sintered using the sintering method. The possibility is derived based on a second database in second storage 302.

Specifically, probability deriver 105 inputs the composition descriptor obtained from composition descriptor generator 103 to the sintering predictor of sintering trainer 104. Probability deriver 105 then obtains, from the sintering predictor, the generation probability of each of the five types of sintering methods output from the sintering predictor. Probability deriver 105 outputs the generation probability of each of the five types of sintering methods to second information obtainer 106 and image generator 107.

When a target composition formula is BiCuSO, for example, composition descriptor generator 103 generates a composition descriptor which is a vector indicating BiCuSO. Probability deriver 105 obtains the composition descriptor from composition descriptor generator 103, and inputs the composition descriptor to the trained sintering predictor of sintering trainer 104 to derive the generation probability of each sintering method type for BiCuSO.

In each of Embodiments 1 through 5, probability deriver 105 thus derives a generation probability based on combination and composition ratio of element types included in a target composition formula indicated in first information. With this, the reliability of a generation probability to be derived can be enhanced. Specifically, probability deriver 105 inputs a composition descriptor indicating the composition formula of a target material to a sintering predictor to derive the generation probability of each of one or more types of sintering methods for the target material. The predictor has been trained using a second database to output, in response to the input of a composition descriptor indicating a composition formula, the generation probability of each of one or more types of sintering methods for a material having the composition formula. With this, even though the composition formula of a target material is not indicated in the second database, the generation probability of each of one or more types of sintering methods for an unknown target material can be derived by using a trained sintering predictor.

[Second Information Obtainer 106]

Second information obtainer 106 obtains the composition descriptor of a target composition formula from composition descriptor generator 103, and obtains the generation probability of each of the five types of sintering methods from probability deriver 105. Subsequently, based on the obtained composition descriptor and the obtained generation probability of each of the five types of sintering methods, second information obtainer 106 obtains one or more second information items necessary for image generation from a second database in second storage 302. Second information obtainer 106 then outputs the one or more second information items to image generator 107. With this, an image indicating the one or more second information items (i.e., a process-related image to be described later) is generated and then displayed by image generator 107. The second information indicates, for example, (i) the composition formula of a known material which is related to a target composition formula input by the user and whose sintering method has been predicted as being same as the sintering method of the target composition formula, (ii) literature information associated with that composition formula, and (iii) an attribute such as the location of a paragraph of the literature information. That the sintering method of a target composition formula is same as the sintering method of a known material means that the type of a sintering method corresponding to the highest generation probability is same between a target material and the known material. The second information is not limited to the above example. The second information may indicate attributes such as a crystal structure, a sintering temperature, a property value, and an application corresponding to the composition formula of the known material. Among a plurality of first synthesis information items 2a and a plurality of second synthesis information items 2b included in the second database, second information obtainer 106 obtains first synthesis information 2a and second synthesis information 2b indicating the composition formula of the known material related to the target composition formula to obtain the second information. The sintering method indicated in the obtained second information is regarded as an attribute of the known material.

When any one of one or more second information items is selected through a user's input operation to second input unit 109, second information obtainer 106 obtains, from the first database, a paragraph of dissertation data 1 corresponding to the selected second information item, and outputs the paragraph to image generator 107.

In each of Embodiments 1 through 5, second information obtainer 106 thus obtains, for each of one or more known materials related to a target composition formula indicated in first information, second information indicating the composition formula and attribute of the known material. The second information is obtained from a second database in second storage 302. The attribute of the known material indicated in the second information is at least one of the following: the crystal structure of the known material; a sintering temperature for sintering the known material; a property value indicating the property degree of the known material; literature information for identifying literature that describes the known material; and an application of the known material. In each of Embodiments 1 through 5, the literature is dissertation data 1 in a first database in first storage 301. The attribute may be the location of a paragraph, in the literature, that describes at least one of the known material or the sintering method of the known material. When one of one or more second information items indicated in a process-related image generated by image generator 107 is selected, second information obtainer 106 obtains, from the first database, the area of part of literature that describes the sintering method of the known material having the composition formula indicated in the selected second information item. The area of the part of the literature is a sentence, a phrase, or a paragraph that includes the description of the sintering method. In each of Embodiments 1 through 5, the area of the part is a paragraph, but may be a sentence or a phrase. A process-related image is also referred to as a first image.

[Image Generator 107]

Image generator 107 obtains a target composition formula from first information obtainer 102 and generates an image indicating the target composition formula. In addition, image generator 107 generates an image indicating generation probabilities obtained from probability deriver 105. In other words, image generator 107 generates an image indicating the generation probability of each of the five types of sintering methods corresponding to the composition descriptor of the target composition formula. Image generator 107 also obtains one or more second information items from second information obtainer 106 and generates an image indicating these second information items. Although the second information item according to each of Embodiments 1 through 5 indicates a composition formula, a crystal structure, a sintering temperature, a property value, literature information, and an application, the second information is not limited to indicate them. Each of the generated images is, for example, included in a process-related image and displayed on display 108.

Image generator 107 thus generates, as a process-related image indicating information regarding a generation process, an image indicating the second information items of one or more known materials and the generation probability of each of one or more types of sintering methods, and displays the image on display 108. As described above, when the area of part of literature is obtained by second information obtainer 106, image generator 107 generates, as a reference image, an image indicating the description in the area of the part of the literature, and displays the image on display 108. A reference image is also referred to as a second image. The area of the part of the literature is, for example, a paragraph, as described above.

[Display 108]

Display 108 obtains a signal from image generator 107 and displays an image in accordance with the obtained signal. In other words, display 108 displays a process-related image and a reference image as described above.

[Second Input Unit 109]

Second input unit 109 is a functional element included in input unit 110. Second input unit 109 receives an input operation from the user to, for example, select any one of one or more second information items in a process-related image displayed on display 108. Second input unit 109 then outputs a signal for identifying the selected second information item to second information obtainer 106. Second information obtainer 106 identifies, based on the signal, the second information item selected by the user among the one or more second information items, and obtains a paragraph in dissertation data 1 that describes a sintering method corresponding to the selected second information item.

Next, the details of each of elements in database creation device 200 will be described.

Figure 4:
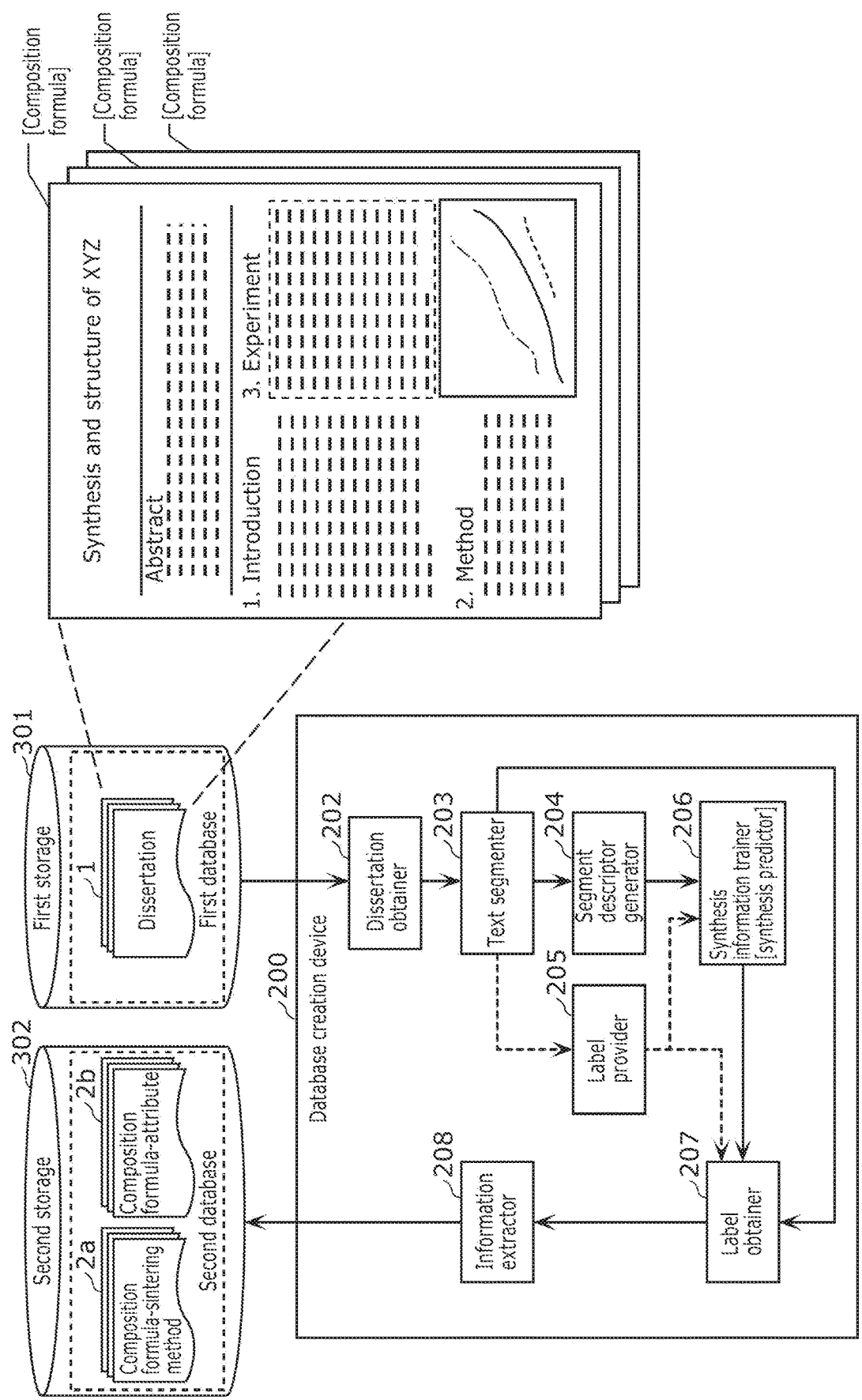
FIG. 4 is a block diagram illustrating one example of the functional configuration of a database creation device according to each of the embodiments.

FIG. 4 is a block diagram illustrating one example of the functional configuration of database creation device 200 according to each of Embodiments 1 through 5.

[Database Creation Device 200]

Database creation device 200 analyzes information in each of dissertation data items 1 from a first database collected in advance, and creates a second database including first synthesis information 2a that indicates a composition formula and a sintering method corresponding to the composition formula in association with each other. The second database includes also second synthesis information 2*b* described above. Information in the created second database is obtained by second information obtainer 106 in generation process display device 100 and used by sintering trainer 104.

Specifically, first, database creation device 200 specifies a paragraph, among all of paragraphs in dissertation data 1, that describes synthesis of a material corresponding to a composition formula associated with dissertation data 1 in advance. Materials described in dissertation data 1 are known materials. Database creation device 200 then obtains a name that is the type name of a sintering method described in the specified paragraph, and associates the name of the sintering method with the composition formula associated with dissertation data 1 to generate first synthesis information 2*a* and add first synthesis information 2*a* to the second database.

Database creation device 200 uses a pre-trained synthesis predictor to specify a paragraph describing information about material synthesis. Moreover, database creation device 200 analyzes dissertation data 1 to extract information to be used by image generator 107. For example, database creation device 200 detects a paragraph describing a sintering method in dissertation data 1, and extracts the detected paragraph.

Such database creation device 200 includes dissertation obtainer 202, text segmenter 203, segment descriptor generator 204, label provider 205, synthesis information trainer 206, label obtainer 207, and information extractor 208.

[Dissertation Obtainer 202]

Dissertation obtainer 202 obtains dissertation data 1 from a first database in storage 301 and outputs dissertation data 1 to text segmenter 203.

[Text Segmenter 203]

Text segmenter 203 extracts the text information of dissertation data 1 obtained from dissertation obtainer 202 and segments the text information into areas. Each of the areas is, for example, a paragraph. In other words, text segmenter 203 segments the text information into paragraphs to obtain the text information. In each of Embodiments 1 through 5, ScienceParse for example is used for the extraction of the text information from dissertation data 1, but the present disclosure is not limited to this example. Text segmenter 203 then outputs each of the obtained paragraphs to label obtainer 207, segment descriptor generator 204, and label provider 205.

[Segment Descriptor Generator 204]

Segment descriptor generator 204 generates a segment descriptor for each of the paragraphs obtained from text segmenter 203, and outputs the segment descriptor to synthesis information trainer 206. A segment descriptor is, for example, a vector uniquely indicating what is described in a paragraph.

[Label Provider 205]

Label provider 205 provides a label for a paragraph obtained from text segmenter 203, in accordance with an input operation by the user of database creation device 200. This label indicates whether information about material synthesis is included in the paragraph. Label provider 205 then outputs the label provided for the paragraph to synthesis information trainer 206 and label obtainer 207.

[Synthesis Information Trainer 206]

Synthesis information trainer 206 obtains a segment descriptor corresponding to each of paragraphs from segment descriptor generator 204, and obtains a label provided for each of the paragraphs from label provider 205. Synthesis information trainer 206 then conducts, for each of the paragraphs, training regarding the relationship between the segment descriptor corresponding to the paragraph and the label provided for the paragraph, to create a synthesis predictor that indicates the relationship. For example, clustering is used for such a prediction means. Clustering is a kind of training without a teacher in machine learning and is a method of grouping data based on similarity between data items in the data. Examples of the method include k-means, random forest, and neural network, but the method is not limited to these examples. In response to the input of a segment descriptor, the synthesis predictor outputs a label indicating whether a paragraph corresponding to the segment descriptor includes information about material synthesis.

After the synthesis predictor is created, synthesis information trainer 206 obtains a segment descriptor from segment descriptor generator 204 without obtaining a label from label provider 205. Upon obtaining the segment descriptor, synthesis information trainer 206 inputs the segment descriptor to the synthesis predictor to obtain a label corresponding to the segment descriptor from the synthesis predictor. Synthesis information trainer 206 outputs the label obtained from the synthesis predictor to label obtainer 207.

[Label Obtainer 207]

Label obtainer 207 obtains a paragraph from text segmenter 203 and obtains a label corresponding to the paragraph from label provider 205 or synthesis information trainer 206. Before a synthesis predictor is created, that is, before the synthesis predictor is trained, label obtainer 207 obtains the label from label provider 205. After a synthesis predictor is created, that is, after the synthesis predictor is trained, label obtainer 207 obtains the label from synthesis information trainer 206. Label obtainer 207 assigns, to the paragraph obtained from text segmenter 203, the label that is obtained from label provider 205 or synthesis information trainer 206 and corresponds to the paragraph. Label obtainer 207 then outputs, to information extractor 208, the paragraph assigned with the label.

[Information Extractor 208]

Information extractor 208 obtains a paragraph assigned with a label from label obtainer 207. Information extractor 208 then extracts information about material synthesis from the paragraph assigned with the label indicating that the information is included. The information is related to a material generation process, and indicates, for example, at least one of the name of a sintering method, a composition formula, a sintering temperature, a crystal structure, and a property value. For example, information extractor 208 searches a character string indicating the name of a sintering method in the paragraph to extract information indicating the name of a sintering method from the paragraph. Alternatively, information extractor 208 searches the unit of a sintering temperature and a numerical value placed before the unit in the paragraph, to extract information indicating the sintering temperature from the paragraph. Alternatively, information extractor 208 searches a character string indicating a crystal structure in the paragraph to extract information indicating a crystal structure from the paragraph. Alternatively, information extractor 208 searches the unit of a property value and a numerical value placed before the unit in the paragraph, to extract information indicating the property value from the paragraph.

Information extractor 208 associates the sintering method indicated in the extracted information with the composition formula associated in advance with dissertation data 1 obtained by dissertation obtainer 202, to generate first synthesis information 2*a* indicating the composition formula and the sintering method of a known material in association with each other. Information extractor 208 also associates an attribute of the known material, which is other than a sintering method, with the composition formula associated with dissertation data 1 obtained by dissertation obtainer 202, to generate second synthesis information 2b indicating the composition formula and the attribute of the known material in association with each other. This attribute may include literature information about dissertation data 1 obtained by dissertation obtainer 202 and the location of a paragraph from which the information indicating the sintering method has been extracted. The attribute may also include, for instance, a sintering temperature, a crystal structure, and a property value indicated in the information extracted by information extractor 208.

Description of Operation Common to Embodiments

Figure 5:
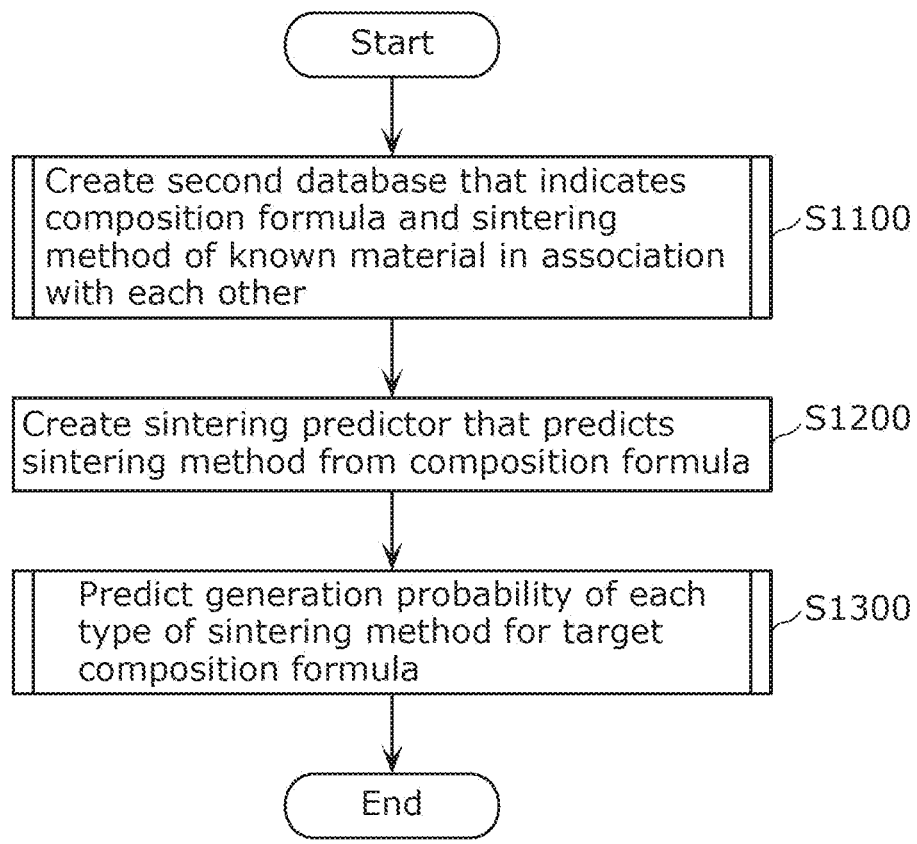
FIG. 5 is a flowchart illustrating one example of the overall flow of processing in the generation process search system according to each of the embodiments.
Figure 6:
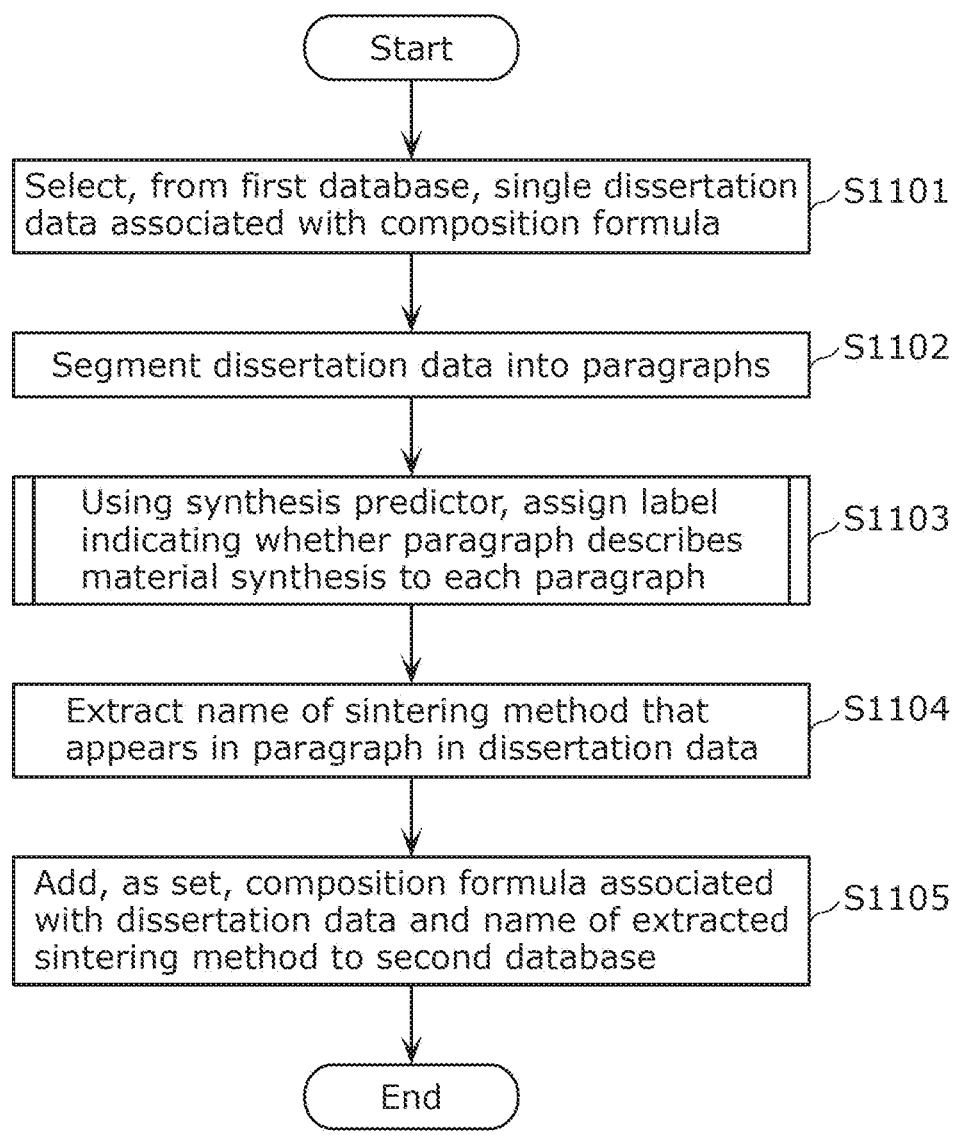
FIG. 6 is a flowchart illustrating one example of the overall flow of processing performed by the database creation device according to each of the embodiments.

Next, an operation performed by generation process search system 10, which is common to embodiments, will be described.
(Overall Processing of Generation Process Search System 10)
FIG. 5 is a flowchart illustrating one example of the overall flow of processing performed by generation process search system according to each of Embodiments 1 through 5.
(Step S1100)
Database creation device 200 creates a second database that includes: first synthesis information 2a indicating composition formula and sintering method of a known material in association with each other; and second synthesis information 2b.
(Step S1200)
Generation process display device 100 conducts training that uses first synthesis information 2a, to create a sintering predictor that predicts a sintering method from a composition formula. For example, a fully connected NeuralNetwork is used for the model of the sintering predictor.
(Step S1300)
Generation process display device 100 derives, using the sintering predictor, the generation probability of each type of a sintering method for a target composition formula. In other words, generation process display device 100 predicts a sintering method for sintering a target material having a target composition formula.
(Processing of Database Creation Device 200)
FIG. 6 is a flowchart illustrating one example of the overall flow of processing performed by database creation device 200 according to each of Embodiments 1 through 5, i.e., a flowchart illustrating the detailed flow of the process in step S1100.

In each of Embodiments 1 through 5, 1063 dissertation data items 1 are used, for example. The composition formula of a thermoelectric conversion material is associated with each of these dissertation data items 1. The association between dissertation data 1 and the composition formula is performed by manually checking a composition formula mainly discussed in that dissertation data 1 and associating the composition formula with dissertation data 1. The method of associating the composition formula with dissertation data 1 is not limited to this, and the association may be performed automatically.

A procedure for creating a second database in the entire database creation device 200 will be described using the flowchart in FIG. 6.

(Step S1101)
Dissertation obtainer 202 obtains single dissertation data 1 to be processed, from a first database including dissertation data items 1 that have already been published, and outputs that dissertation data 1 to text segmenter 203. In other words, dissertation data 1 associated with a composition formula in advance is selected.
(Step S1102)
Text segmenter 203 segments dissertation data 1 obtained from dissertation obtainer 202 into paragraphs to obtain dissertation data 1. Text segmenter 203 outputs each of the obtained paragraphs to label obtainer 207, segment descriptor generator 204, and label provider 205.
(Step S1103)
Upon obtaining a paragraph from text segmenter 203, segment descriptor generator 204 generates a segment descriptor corresponding to the paragraph. After the creation of a synthesis predictor, synthesis information trainer 206 inputs the segment descriptor to the synthesis predictor to obtain a label indicating whether information about material synthesis is included in the paragraph corresponding to the segment descriptor. Synthesis information trainer 206 then outputs the label to label obtainer 207. Before the creation of a synthesis predictor, label provider 205 outputs the label to label obtainer 207 in accordance with an input operation by the user of database creation device 200. Label obtainer 207 obtains the label output from synthesis information trainer 206 or label provider 205, i.e., the label indicating whether the paragraph describes material synthesis, and assigns the obtained label to the paragraph. Label obtainer 207 then outputs the paragraph assigned with the label to information extractor 208.
(Step S1104)
Information extractor 208 extracts information indicating, for instance, the name of a sintering method from the paragraph that describes material synthesis, i.e., the paragraph that includes information about material synthesis, among the paragraphs obtained from label obtainer 207. Names of sintering methods are registered in advance in information extractor 208. In step S1104, information extractor 208 determines whether the name of a registered sintering method is present in the paragraph that describes material synthesis. When it is determined that the name of the registered sintering method is present in the paragraph, information extractor 208 extracts the name of that sintering method. When it is determined that the names of a plurality of sintering methods are present, information extractor 208 extracts the names of all of the sintering methods. It should be noted that the information extracted by information extractor 208 indicates not only the name of a sintering method, but also an attribute, which excludes a sintering method, regarding the composition formula associated with dissertation data 1 obtained in step S1101. The attribute is, for example, literature information of that dissertation data 1, the location of a paragraph that describes the name of the sintering method, or the crystal structure, sintering temperature, property value, or application of the composition formula described in the paragraph.
(Step S1105)
Information extractor 208 also associates the name of the sintering method extracted in step S1104 with the composition formula associated with dissertation data 1 that includes the paragraph describing the name of the sintering method, and adds the name and the composition formula to the second database. In other words, first synthesis information 2a is generated and added to the second database. Information extractor 208 also associates, with the composition formula associated with dissertation data 1, an attribute, other than a sintering method, that is extracted in step S1104, and adds the attribute and the composition formula to the second database. In other words, second synthesis information 2b is generated and added to the second database.

(Pre-Processing for Training Conducted by Synthesis Information Trainer 206)

Figure 7:
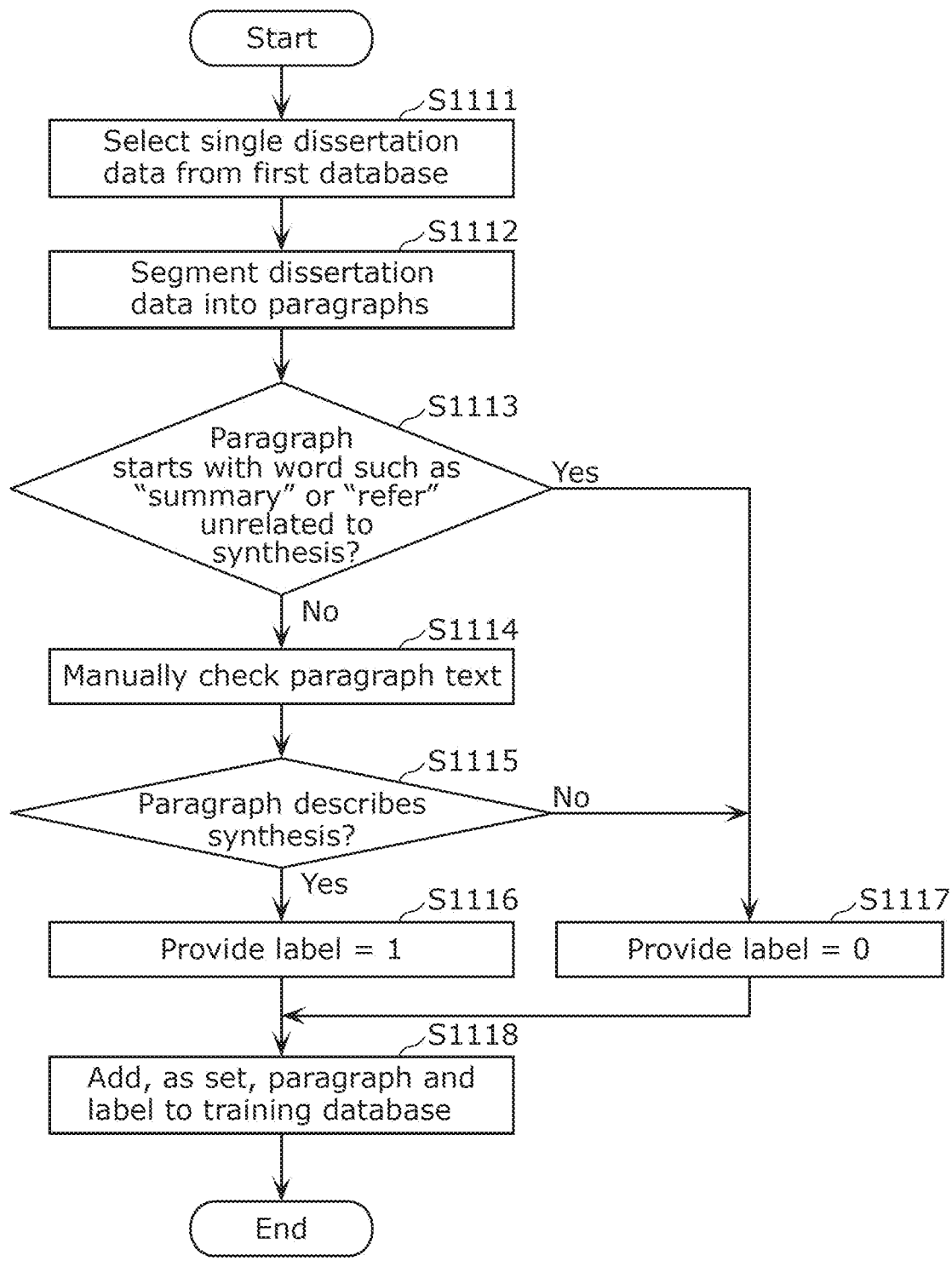
FIG. 7 is a flowchart illustrating one example of a pre-processing flow for training in a synthesis information trainer according to each of the embodiments.

FIG. 7 is a flowchart illustrating one example of the flow of pre-processing for training in synthesis information trainer 206 according to each of Embodiments 1 through 5. In other words, FIG. 7 illustrates the flow of pre-processing for training in synthesis information trainer 206, that is, some of sub-processes included in the process in step S1103 in FIG. 6.

Segment descriptor generator 204 converts, to a vector, the character string of characters included in a paragraph obtained from text segmenter 203, using, for example, Wor2Vec, to generate a segment descriptor expressed as the vector. Synthesis information trainer 206 then inputs the vector, i.e., the segment descriptor, to a trained synthesis predictor to obtain a label indicating whether the paragraph corresponding to the segment descriptor describes material synthesis. The Word2Vec model is specialized in material dissertations published by Synthesis Project. Although Word2Vec is used for conversion from a paragraph character string to a vector in each of Embodiments 1 through 5, the present disclosure is not limited to this and a different model may be used.

Machine learning is used for the training of a synthesis predictor conducted by synthesis information trainer 206. A class classification based on stochastic gradient descent is used for models of the machine learning. A training database is used for the training of the synthesis predictor. The training database includes each of paragraphs of 100 dissertation data items 1, and each of the paragraphs is provided with a label indicating whether the paragraph describes material synthesis. The flowchart illustrated in FIG. 7 is a flowchart for manually creating such a training database.

(Step S1111)

Dissertation obtainer 202 obtains single dissertation data 1 from a first database and outputs that dissertation data 1 to text segmenter 203. In other words, dissertation data 1 is selected. In training in synthesis information trainer 206 according to each of Embodiments 1 through 5, part of dissertation data 1 included in the first database is used, but the present disclosure is not limited to this and dissertation data included in a database other than the first database may be used. In each of Embodiments 1 through 5, 100 dissertation data items 1 are randomly selected from the first database for training in synthesis information trainer 206, and the processes in the flowchart in FIG. 7 are repeatedly performed for each of 100 dissertation data items 1.

(Step S1112)

Text segmenter 203 segments dissertation data 1 obtained from dissertation obtainer 202 into paragraphs to obtain dissertation data 1. Text segmenter 203 outputs each of the obtained paragraphs to label obtainer 207, segment descriptor generator 204, and label provider 205.

(Step S1113)

Upon obtaining a paragraph from text segmenter 203, label provider 205 performs mechanical pre-screening on the paragraph. When the paragraph starts with a word unrelated to material synthesis such as "summary" or "refer" (Yes in step S1113), for example, label provider 205 performs the process in S1118 after the process in step S1117. When the paragraph does not start with a word unrelated to material synthesis (No in step S1113), label provider 205 performs the process in step S1114.

(Step S1114)

In step S1114, whether the paragraph determined as not starting with a word unrelated to material synthesis includes information about material synthesis is checked manually. In other words, label provider 205 receives an input operation from the user of database creation device 200, and determines, in accordance with the input operation, whether the paragraph includes information about material synthesis.

(Step S1115)

When the paragraph includes information about material synthesis (Yes in step S1114), label provider 205 performs the process in step S1116, and when the paragraph does not include such information (No in step S1114), performs the process in step S1117.

(Step S1116)

Label provider 205 provides, for the paragraph checked as including the information in step S1114, label=1, i.e., a label indicating that information about material synthesis is included in the paragraph.

(Step S1117)

Label provider 205 provides label=0, i.e., a label indicating that information about material synthesis is not included in the paragraph, for the paragraph checked as not including the information in step S1114 or the paragraph that starts with a word unrelated to material synthesis.

(Step S1118)

Synthesis information trainer 206 adds, to the training database, the label provided by label provider 205 and the segment descriptor of the paragraph corresponding to that label. In other words, the label and the segment descriptor of the paragraph are associated with each other to be added to the training database. By repeating the processes in steps S1111 through S1118, for example, 100 times, the training database is created.

Before training is conducted by synthesis information trainer 206, database creation device 200 generates first synthesis information 2a and second synthesis information 2b while creating a training database as described above and also conducting training by synthesis information trainer 206 with the use of the training database. After training is conducted by synthesis information trainer 206, i.e., after a synthesis predictor is created, database creation device 200 instead of label provider 205 provides a label for each of paragraphs using the synthesis predictor, and generates first synthesis information 2a and second synthesis information 2b.

Embodiment 1

An image to be displayed by generation process display device 100 according to Embodiment 1 will be described. FIG. 8A through FIG. 8E are each a diagram illustrating one example of a display by generation process display device 100 according to Embodiment 1.

FIG. 8A is a diagram illustrating one example of a process-related image according to Embodiment 1. As illustrated in FIG. 8A, image generator 107 generates process-related image P1 and displays process-related image P1 on display 108. This process-related image P1 includes target composition area d1, known material area d2, and generation probability area d3. A target composition formula indicated in first information obtained by first information obtainer 102 is displayed in target composition area d1. One or more second information items obtained by second information obtainer 106 are displayed in known material area d2. The generation probability of each of five types of sintering methods for sintering a target material having the target composition formula is displayed in generation probability area d3. In other words, the composition formula of the target material input by the user and the generation probability of each of the types of the sintering methods related to the composition formula are displayed in process-related image P1.

More specifically, a target composition formula "BiCuSO" input by the user is displayed as one example in target composition area d1. Although the atomic number ratio of the target composition formula is Bi:Cu:S:O=1:1:1:1, the present disclosure is not limited to this example. For example, the atomic number ratio may be Ag:Si=3:1 as in $Ag_3Si$. Although it can be said that BiCuSO and $Ag_3Si$ are each a composition formula presenting a matrix which is compositional elements that occupy most of the portion in the volume of an alloy, the present disclosure is not limited to this example. For example, the target composition formula may be a real composition formula including a dopant type as in $Bi_{0.9}Mg_{0.1}CuSO$. A real composition formula is also referred to as the composition formula of a real composition.

In generation probability area d3, the generation probability of each type of a sintering method related to the target composition formula "BiCuSO" is displayed in table d31 and pie graph d32. Sintering method types according to each of Embodiments 1 through 5 are five types of Ball-Milling, Solid-State, Liquid-State, Flux, and Arc-Melting, but the sintering method types according to the present disclosure are not limited to these types. The sintering method types to be displayed are based on first synthesis information 2a.

For example, a sub area with a tab is displayed for each type of the sintering method in known material area d2. In the sub area, second information of each of one or more known materials, which are related to a target material and are sintered using the sintering method of a type corresponding to the sub area, is displayed. The second information indicates the composition formula and attributes of the known material, and the attributes are a sintering method and literature information in the example in FIG. 8A.

Image generator 107 according to the present embodiment thus generates process-related image P1 indicating, for each type of a sintering method, second information of each of one or more known materials generated using the sintering method. This enables the user to easily find out, in process-related image P1, second information items of one or more known materials sintered using the sintering method whose generation probability for a target material is the highest. In other words, even when a plurality of second information items are displayed, the user can easily find out second information that is useful regarding the sintering of the target material among the plurality of second information items.

In the example in FIG. 8A, a sub area with the tab of the sintering method type "Ball-Milling" is displayed first. The sintering method type "Ball-Milling" is the type of a sintering method, among the five sintering methods, that corresponds to the highest generation probability among five generation probabilities derived for the target composition formula "BiCuSO". In other words, image generator 107 specifies the sintering method type corresponding to the highest generation probability among the five generation probabilities derived for the target composition formula, and displays first a sub area with the tab indicating the specified sintering method type. Moreover, image generator 107 may arrange five tabs in the descending order of the generation probabilities. This enables the user to visually easily grasp sintering methods related to a target material.

In known material area d2, the composition formula and attribute of each of one or more known materials related to the target material are displayed as second information. Each of the one or more known materials related to the target material is a material similar to the target material and close to the target material in terms of a distance between vectors. In other words, each of the one or more known materials related to the target material is a material having a composition descriptor similar to the composition descriptor of the target material. For example, the composition formulae of one or more known materials, each having a distance of at most a threshold between the composition descriptor of the known material and the composition descriptor of the target material, are displayed in known material area d2 in the ascending order of the distance. The composition formulae of a predetermined number of known materials may be displayed in known material area d2 in the ascending order of the distance.

Image generator 107 according to the present embodiment thus arranges second information of each of one or more known materials in an order according to the composition formula indicated in the second information, and generates process-related image P1 indicating one or more second information items arranged in the order. For example, second information indicating the composition formula of a known material that is closer or more similar to the composition formula of a target material is arranged with higher priority. This enables the user to easily find out desired second information from those second information items.

In FIG. 8A, the composition formula "BiCuSeO" and the composition formula "BiCuTeO", which are related to the target composition formula "BiCuSO", of known materials whose generation probabilities using the Ball-Milling are high are displayed as examples. Among the composition formulae of these known materials, element types Se and Te different from the element types of the target composition formula are displayed with emphasis in bold.

Even when the composition formula of a known material related to a target composition formula is a real composition formula including a dopant type, the composition formula may be displayed as the composition formula of a mother substance in known material area d2 for viewability. The composition formula of a mother substance is a composition formula, such as BiCuSeO, which does not include any dopant type. The composition formula of a real composition may be displayed in addition to the composition formula of a mother substance, or only the composition formula of a real composition may be displayed. The composition formula of a real composition is a composition formula, such as $Bi_{1-x}Mg_xCuSeO$, $Bi_{1-x}Ca_xCuSeO$, $Bi_{1-x}Sr_xCuSeO$, or $Bi_{1-x}Ba_xCuSeO$, which includes a dopant type. In this case, the dopant type is Mg, Ca, Sr, or Ba, and each of the composition formulae is a composition formula that includes the dopant type whose ratio is in the range of $0<x\leq0.15$.

The attribute of a known material displayed in known material area d2 includes, for example, literature information of dissertation data 1 that is the source of the composition formula of the known material. The literature information that is the source of the composition formula is obtained from second synthesis information 2b in the second database. Alternatively, the literature information may be obtained from a different database via network 401 such as the Internet. Second synthesis information 2b indicates literature information, which is an attribute, in association with a single composition formula, but may indicate literature information in association with a plurality of composition formulae. In this case, second synthesis information 2b may indicate a primary composition formula among the plurality of composition formulae.

Figure 8B:
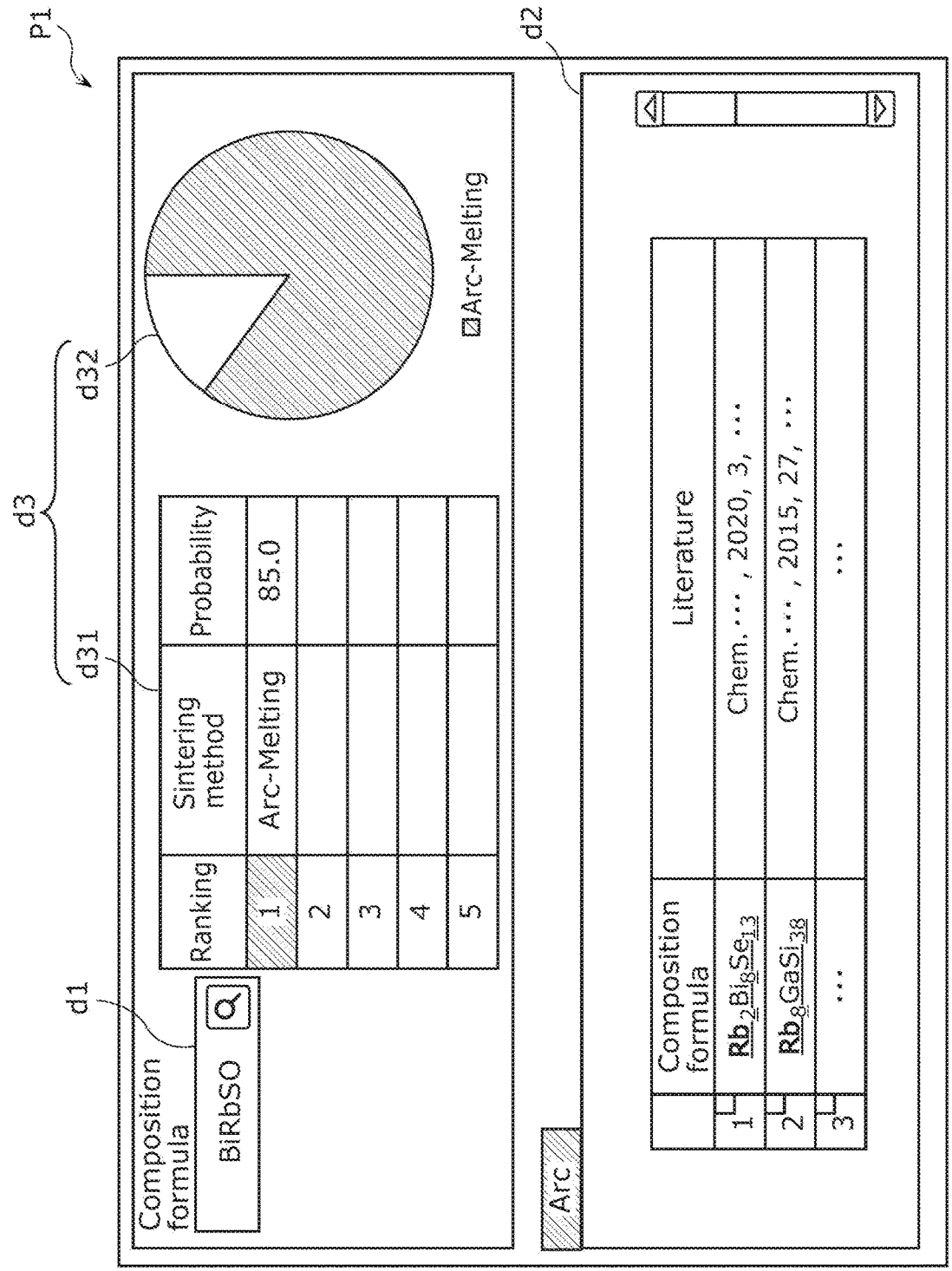
FIG. 8B is a diagram illustrating another example of the process-related image according to Embodiment 1.

FIG. 8B is a diagram illustrating another example of process-related image P1 according to Embodiment 1. In process-related image P1 illustrated in FIG. 8B, the composition formula of a target material input by the user and the generation probability of a sintering method related to the composition formula are displayed, as in process-related image P1 illustrated in FIG. 8A.

More specifically, a target composition formula "BiRbSO" input by the user is displayed, as one example, in target composition area d1.

In generation probability area d3, the generation probability of the sintering method related to the target composition formula "BiRbSO" is displayed in table d31 and pie chart d32. When a target composition formula is "BiRbSO", only one type of sintering method Arc-Melting among the five sintering methods is displayed in generation probability area d3. Moreover, only the generation probability "85.0%" of the sintering method Arc-Melting among the generation probabilities of the five sintering methods is displayed in generation probability area d3. In other words, when any one of the generation probabilities of the five sintering methods indicates, for example, at least 80%, image generator 107 includes, in generation probability area d3, only the generation probability indicating at least 80% and the name of a sintering method corresponding to the generation probability. Image generator 107 thus neither includes, in generation probability area d3, the other four generation probabilities other than the generation probability indicating at least 80% nor the names of the sintering methods corresponding to the four generation probabilities. It should be understood that the generation probability 80% is one example of a threshold and the threshold may be higher or lower than 80%.

Such a generation probability is based on the result of training in sintering trainer 104 as described with reference to FIG. 3. In other words, the following is trained by sintering trainer 104: when one element type included in a target composition formula composed of two element types is Rb, a sintering method whose generation probability is the highest among the five sintering methods is Arc-Melting whatever the other element type of the two element types may be.

In known material area d2, only a sub area with a tab indicating Arc-Melting is displayed. In the sub area, the composition formula and attribute of each of one or more known materials related to the target composition formula "BiRbSO" are displayed. The composition formulae are each the composition formula of a material that contains Rb that is most likely to be sintered using the sintering method Arc-Melting. The attribute is literature information that is the source of the composition formula of the known material.

When a predetermined condition is satisfied, image generator 107 according to the present embodiment thus generates process-related image P1 indicating the generation probability of each of M types of sintering methods and not indicating the generation probabilities of the other remaining sintering methods among N types of sintering methods. N is an integer of 3 or greater and M is a predetermined integer of at least 1 and less than N. In the example in FIG. 8B, the M types of sintering methods are one type of sintering method, and is specifically Arc-Melting. The predetermined condition is a condition that the generation probability of each of the N types of sintering methods is obtained by probability deriver 105 and the sum of the generation probabilities of the M types of sintering methods whose generation probabilities are higher than the generation probabilities of the other remaining sintering methods is at least a threshold. For example, when N=5 and M=2, and the sum of two highest generation probabilities, i.e., the highest generation probability and the second highest generation probability, is at least a threshold (e.g., 90%), image generator 107 generates process-related image P1 indicating the two highest generation probabilities. In other words, image generator 107 generates process-related image P1 indicating the two highest generation probabilities and the names of the sintering methods corresponding to the two highest generation probabilities and not indicating the other remaining three generation probabilities and the names of the sintering methods corresponding to the three generation probabilities.

With this, when the generation probability of one type of sintering method among a plurality of sintering methods is at least a threshold 80%, for example, only the generation probability of that one type of sintering method is displayed and the generation probabilities of the other remaining sintering methods are not displayed. Accordingly, the user can easily find a sintering method that is the most probable method for a target material. When the sum of, for example, two highest generation probabilities among the generation probabilities of three or more types of sintering methods is at least a threshold 90%, only the two highest generation probabilities are displayed and the other remaining generation probabilities are not displayed. Accordingly, a generation probability having no chance of sintering a target material can be omitted from process-related image P1, and unnecessary provision of information for the user can be inhibited.

Image generator 107 may display only the element type Rb with more emphasis than the other element types in the composition formula of each of one or more known materials displayed in known material area d2. Since it has been clarified, through training, that the generation probability of the sintering method Arc-Melting is the highest when it comes to a material having a composition formula including Rb, image generator 107 displays the element type Rb with emphasis. For example, when any one of the generation probabilities of the five sintering methods indicates at least a threshold, for example, image generator 107 specifies the type of a sintering method corresponding to the generation probability indicating at least the threshold. In the above example, the threshold is 80%. Image generator 107 may emphasize only an element type, in the composition formula of a known material, that is different from element types in a target composition formula.

Figure 8C:
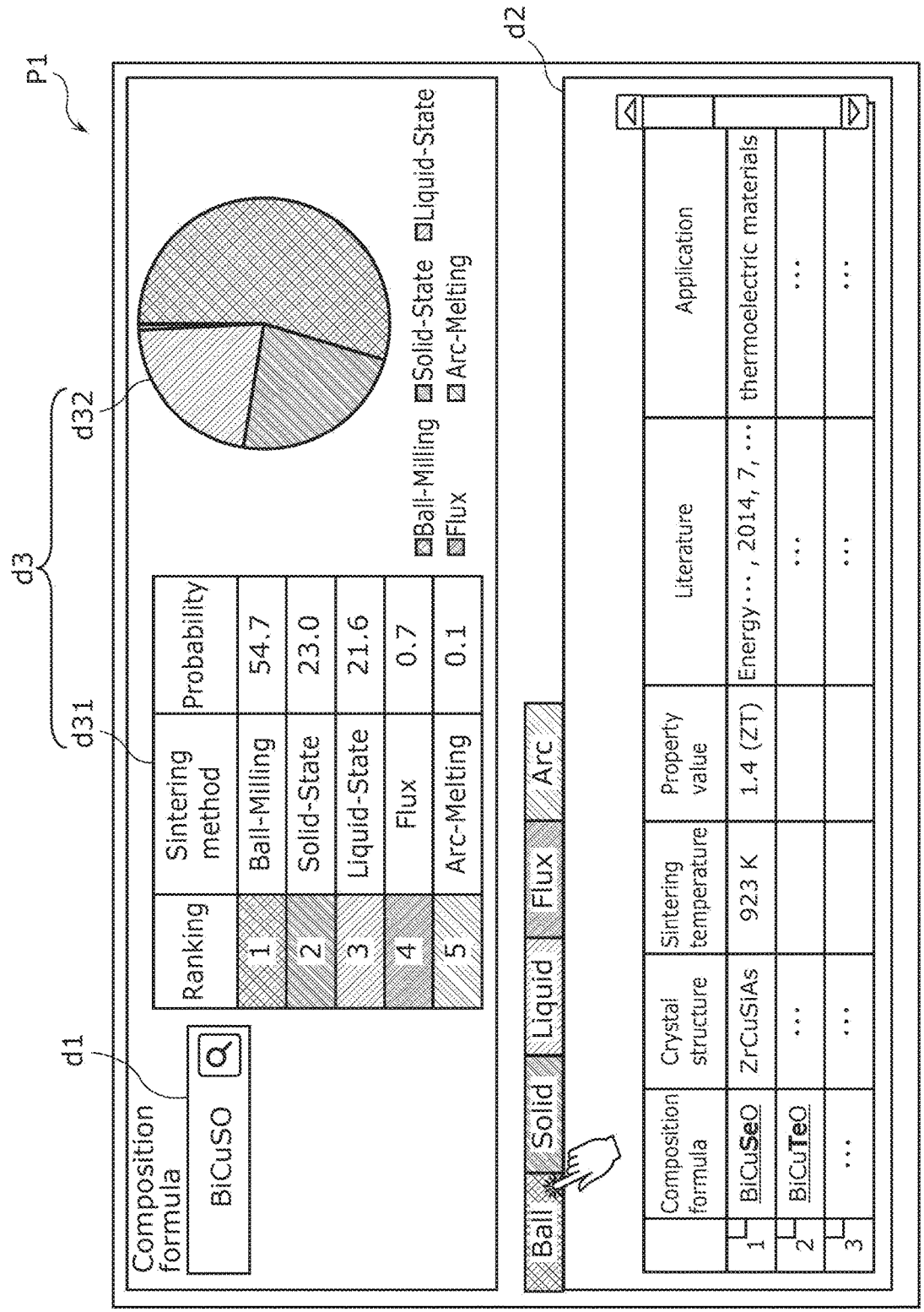
FIG. 8C is a diagram illustrating yet another example of the process-related image according to Embodiment 1.

FIG. 8C is a diagram illustrating another example of process-related image P1 according to Embodiment 1. In known material area d2 in process-related image P1 illustrated in FIG. 8C, not only literature information illustrated in FIG. 8A, but also a crystal structure, a sintering method, a property value, and an application corresponding to the composition formula of a known material are displayed as attributes of the known material. Known material area d2 displayed in FIG. 8C is one example and the present disclosure is not limited to this. Second information displayed in known material area d2 may be customized by the user.

Image generator 107 according to the present embodiment may arrange second information of each of one or more known materials in an order corresponding to an attribute indicated in the second information, and generate process-related image P1 indicating one or more second information items arranged in the order. When the attribute is the sintering temperature of a known material, for example, second information indicating a higher sintering temperature is arranged with higher priority. This enables the user to easily find out desired second information from those second information items.

FIG. 8D is a diagram illustrating an example of a reference image according to Embodiment 1. When process-related image P1 illustrated in FIG. 8C is displayed, for example, the user performs an input operation to second input unit 109 to select second information indicating the composition formula "BiCuSeO" in known material area d2. As a result, second input unit 109 outputs a signal in accordance with the input operation, to second information obtainer 106. Second information obtainer 106 obtains the signal from second input unit 109 and specifies "BiCuSeO" which is the composition formula in the second information identified by the signal. Second information obtainer 106 also searches second synthesis information 2b indicating the specified composition formula "BiCuSeO" and specifies literature information and the location of a paragraph that are indicated as attributes in second synthesis information 2b. Second information obtainer 106 searches also, in a first database in first storage 301, dissertation data 1 including the specified literature information, extracts the paragraph at the specified location from that dissertation data 1, and outputs the paragraph to image generator 107. Image generator 107 superimposes, on process-related image P1, reference image P2 indicating the paragraph obtained from second information obtainer 106 to display reference image P2 on display 108.

FIG. 8D illustrates an example of the display of reference image P2 indicating a paragraph that describes a generation process in dissertation data 1 corresponding to the composition formula "BiCuSeO" when the composition formula "BiCuSeO" is selected by the user. Image generator 107 may emphasize more, than other character strings, the character string of the composition formula "BiCuSeO" and the character string of the sintering method "Ball-Milling" in the paragraph. For example, image generator 107 obtains the composition formula "BiCuSeO" specified by second information obtainer 106 from second information obtainer 106 and searches, in the paragraph, the character string of the composition formula "BiCuSeO". Image generator 107 also searches, in the paragraph, the character string of the sintering method "Ball-Milling" corresponding to the sub area indicating the composition formula "BiCuSeO". Image generator 107 then emphasizes the searched character strings of the composition formula "BiCuSeO" and the sintering method "Ball-Milling".

Image generator 107 according to the present embodiment thus generates reference image P2 in which a word indicating a sintering method presented as an attribute in selected second information is emphasized more than the other remaining words in the area of part of literature such as dissertation data 1. Since a word indicating a sintering method is thus displayed with emphasis, the user can easily find out the word indicating a sintering method in the area of part of dissertation data 1. In addition, the user can search the vicinity of the word and easily find out a description regarding the sintering method.

In the present embodiment, the user can check, at a glance, a generation process described in dissertation data 1 that describes a sintering method whose generation probability was predicted as the highest regarding a selected composition formula "BiCuSeO". In other words, in the present embodiment, firstly, since the paragraph indicated in reference image P2 is a paragraph of dissertation data 1 that describes a sintering method whose generation probability was predicted as the highest, it is possible to display, to the user, a generation process that is very likely to achieve a target material. Secondly, since it is no longer necessary for the user themselves to read or search to search a part describing a generation process in the description of dissertation data 1, it is possible to achieve efficiency in a work per se required for the search of a generation process.

Figure 8E:
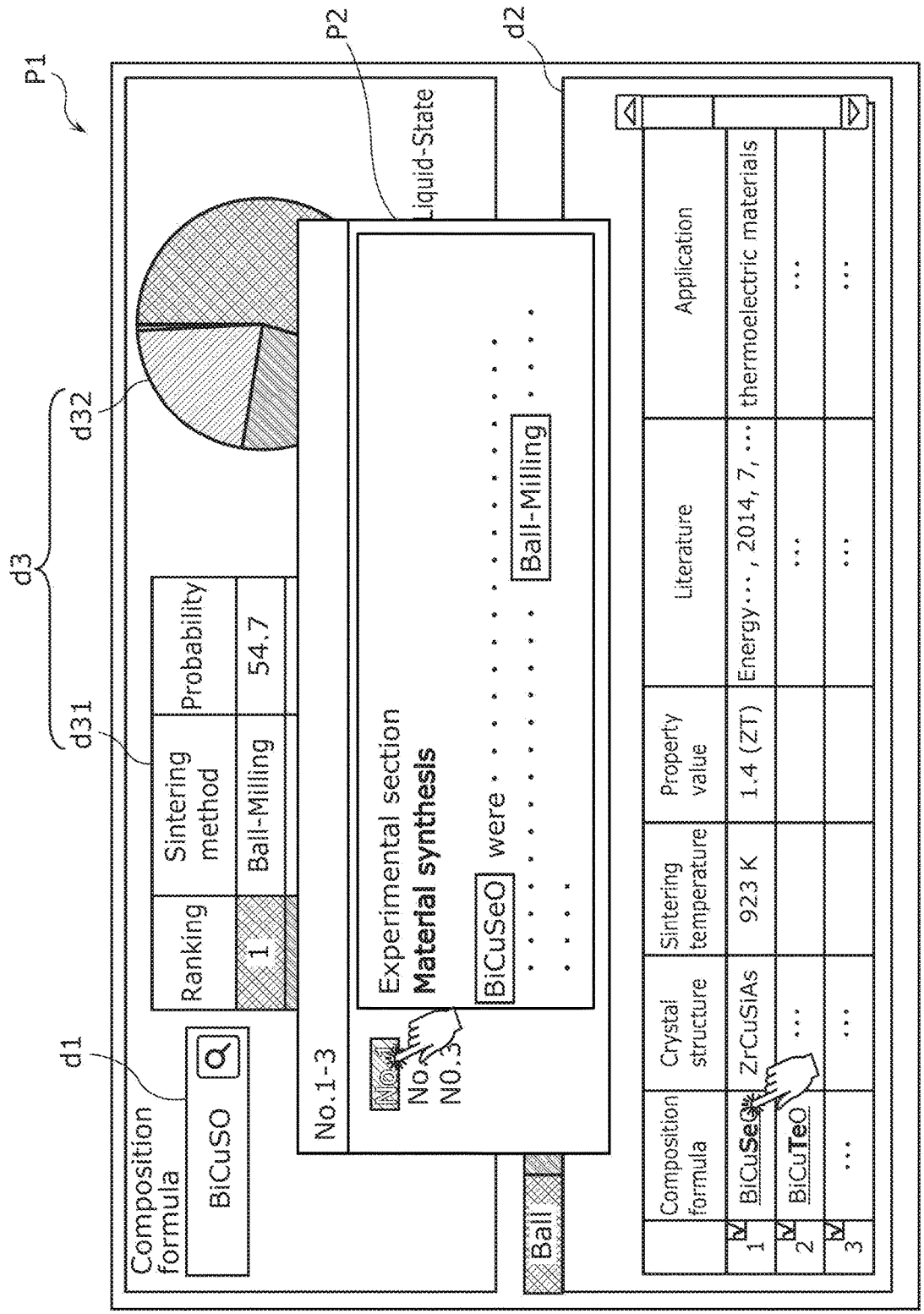
FIG. 8E is a diagram illustrating another example of the reference image according to Embodiment 1.

FIG. 8E is a diagram illustrating another example of reference image P2 according to Embodiment 1. When process-related image P1 illustrated in FIG. 8C is displayed, for example, the user performs an input operation to second input unit 109 to select a plurality of composition formulae in known material area d2. In other words, a plurality of second information items are selected. As a result, second input unit 109 outputs, to second information obtainer 106, a signal in accordance with the input operation. Second information obtainer 106 obtains the signal from second input unit 109, and specifies the plurality of composition formulae selected by the user and indicated by the signal. For each of the specified composition formulae, second image obtainer 106 also searches second synthesis information 2b indicating the composition formula, and specifies literature information and the location of a paragraph that are indicated as attributes in second synthesis information 2b. For each of the plurality of composition formulae selected by the user, second information obtainer 106 also searches, in a first database in first storage 301, dissertation data 1 including the specified literature information, extracts the paragraph at the specified location in that dissertation data 1, and outputs the paragraph to image generator 107. Second information obtainer 106 performs the output of the paragraph to image generator 107 for each of the composition formulae selected by the user. As a result, image generator 107 generates reference image P2 indicating each of the paragraphs obtained from second information obtainer 106 in the form of a list or a tab, and superimposes reference image P2 on process-related image P1 to display reference image P2 on display 108.

FIG. 8E illustrates an example of the display of reference image P2 indicating, in the form of a tab, a paragraph corresponding to each of three composition formulae when the three composition formulae are selected by the user. The display in the form of a tab is one example and the paragraph may be displayed in other form or paragraphs may be displayed in the form of a list. This enables easy comparison between generation processes. For example, a plurality of paragraphs in dissertation data 1 that describes a sintering method whose generation probability was predicted as the highest are selected and the selected paragraphs are displayed in the form of a list. Easy comparison between the generation processes described in the selected paragraphs makes it easy even for the user who is a researcher with poor knowledge and experience to study a generation process that is very likely to achieve a target material in using a sintering method whose generation probability was predicted as the highest. If the user is a researcher with good knowledge and experience, the user can make use of their knowledges and experiences to compare between generation processes and study a generation process that enhances more the possibility of achieving a target material.

(Overall Processing of Generation Process Display Device 100 According to Embodiment 1)

Figure 9:
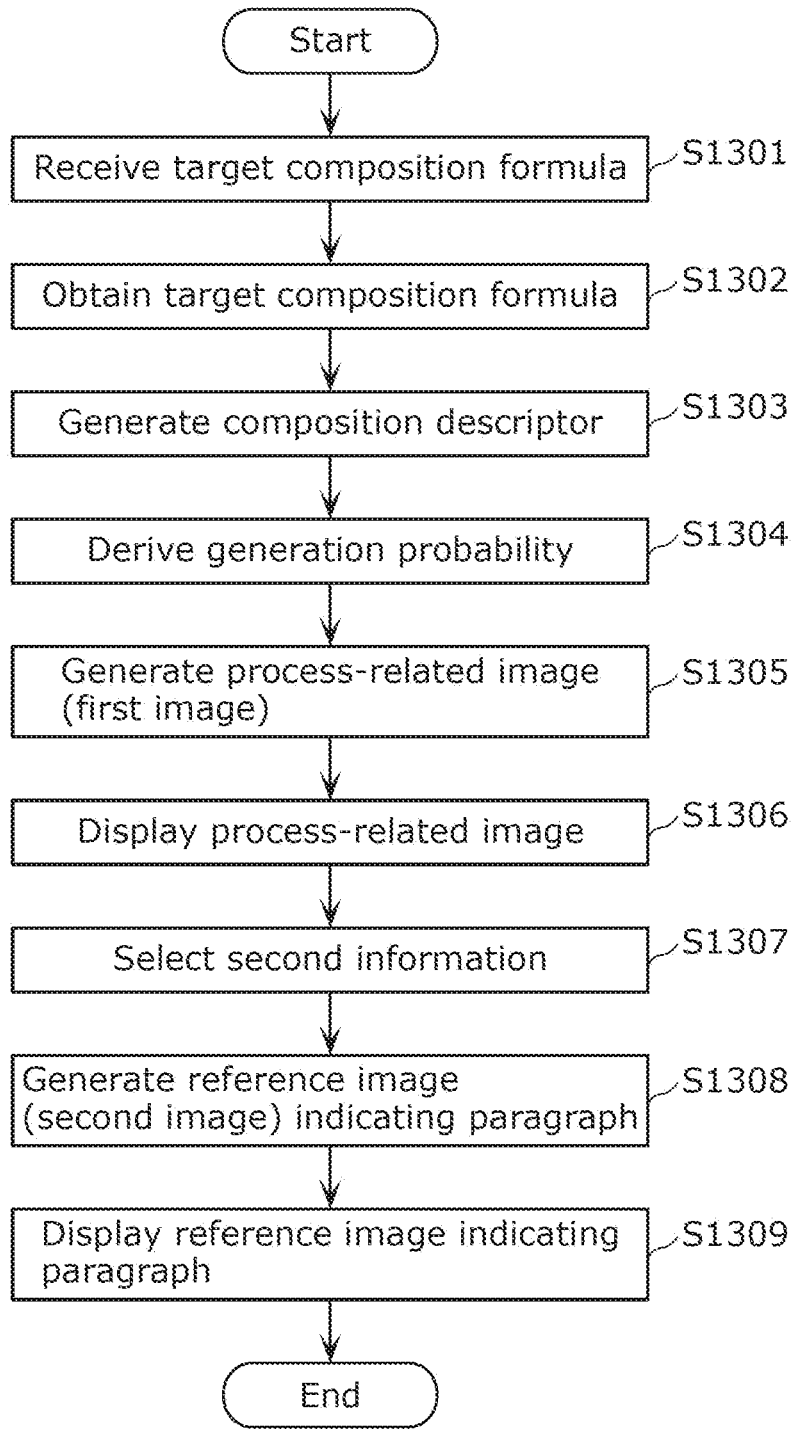
FIG. 9 is a flowchart illustrating one example of the overall flow of processing performed by a generation process display device according to Embodiment 1.

FIG. 9 is a flowchart illustrating one example of the overall 100 according to Embodiment 1 of the present disclosure. In other words, FIG. 9 is a flowchart illustrating the detailed flow of processes in step S1300 in FIG. 5.

(Step S1301)

First input unit 101 receives, through an input operation by the user, a target composition formula to be displayed, and outputs the target composition formula to first information obtainer 102.

(Step S1302)

First information obtainer 102 obtains the target composition formula from first input unit 101, and outputs the target composition formula to composition descriptor generator 103.

(Step S1303)

Composition descriptor generator 103 generates a composition descriptor corresponding to the target composition formula obtained from first information obtainer 102, and outputs the composition descriptor to probability deriver 105 and second information obtainer 106.

(Step S1304)

Sintering trainer 104 inputs the composition descriptor obtained from composition descriptor generator 103 via probability deriver 105 to a trained sintering predictor, to obtain the generation probability of each type of a sintering method corresponding to the composition descriptor, and outputs the generation probability to probability deriver 105. When the second database is updated, sintering trainer 104 may conduct retraining of the sintering predictor based on the difference between the second database after the update and the second database before the update. Probability deriver 105 then obtains the generation probability of each type of the sintering method from sintering trainer 104 to derive the generation probability of each type of a sintering method for a target composition formula. Probability deriver 105 outputs the derived generation probability to image generator 107.

(Step S1305)

Image generator 107 generates process-related image P1 indicating the target composition formula input by the user and obtained from first information obtainer 102. This process-related image P1 includes the generation probability, which is obtained from probability deriver 105, of each type of the sintering method for the target composition formula. This process-related image P1 also includes second information of each of one or more known materials related to a target material. The second information indicates, for example, the composition formula and attribute of the known material. The attribute is, for instance, a crystal structure, a sintering temperature, a sintering method, a property value, literature information, the location of a paragraph, or an application.

(Step S1306)

Image generator 107 displays process-related image P1 generated in step S1305 on display 108.

(Step S1307)

Second information obtainer 106 selects second information in accordance with an input operation to second input unit 109 by the user from among one or more second information items included in process-related image P1.

(Step S1308)

Based on the composition formula indicated in the selected second information, second information obtainer 106 obtains, from the first database, a paragraph corresponding to the composition formula, and outputs the paragraph to image generator 107. Upon obtaining the paragraph from second information obtainer 106, image generator 107 generates reference image P2 indicating the paragraph.

(Step S1309)

Image generator 107 displays the generated reference image P2 on display 108.

As described above, generation process display device 100 according to the present embodiment includes: first information obtainer 102 that obtains first information indicating the composition formula of a target material; second information obtainer 106 that obtains, from a database regarding materials, second information of each of one or more known materials related to the composition formula indicated in the first information, where the second information indicates the composition formula and attribute of the known material; probability deriver 105 that based on the database, derives, for each of one or more types of sintering methods, a possibility that the target material having the composition formula indicated in the first information is sintered using the sintering method, where the possibility is derived as a generation probability; image generator 107 that generates, as process-related image P1 indicating information regarding a generation process, an image indicating second information items of the one or more known materials and the generation probability of each of the one or more types of sintering methods, and displays process-related image P1 on display 108. When one of the second information items of the one or more known materials indicated in process-related image P1 is selected, second information obtainer 106 obtains, from the database, the area of part of literature that describes the sintering method of the known material having the composition formula indicated in the selected second information item. Image generator 107 generates, as reference image P2, an image indicating the description in the area of the part of the literature, and displays reference image P2 on display 108. The database is, for example, at least one of a first database in first storage 301 or a second database in second storage 302. The literature is, for example, dissertation data 1.

With this, the generation probability of each type of a sintering method related to a target material is displayed. In other words, a possibility that the target material is generated through sintering is displayed as a generation probability for each type of the sintering method used for the sintering. In addition, for each of one or more known materials related to the target material, the composition formula and attribute of the known material as well as the area of part of literature that describes the sintering method of the known material are displayed. This enables, in the generation of the target material, the user to firstly grasp the generation possibility of each type of the sintering method, subsequently select a sintering method, and also set experimental conditions. For example, when the generation probability of each of plural types of sintering methods is indicated in process-related image P1, the user can determine that a target material can be sintered using a sintering method of a type corresponding to the highest generation probability. Unless the user owns a sintering device that can implement the sintering method of the type corresponding to the highest generation probability, for example, the user can check a generation probability corresponding to a sintering method implementable by a sintering device owned by the user. Moreover, the user can attempt to burn a target material even with the use of a sintering method of a type corresponding to the lowest generation probability if the generation probability is, for example, at least 50%. It is also possible to indicate, in process-related image P1, the composition formula and attribute of each of one or more known materials related to the target material, each having a composition formula similar to the composition formula of the target material, as the composition formula and attribute of each of the one or more known materials related to the target material, for example. The attribute may be related to sintering, synthesis, or generation of the known material. This enables the user to easily grasp what kind of sintering is performed on a known material similar to a target material. Accordingly, it is possible to more appropriately support the search of a generation process for a target material.

Embodiment 2

An image to be displayed by generation process display device 100 according to Embodiment 2 will be described. Generation process display device 100 according to Embodiment 2 displays a map indicating one or more second information items, in response to an input operation by the user. Generation process display device 100 also switches between the display modes of the map. FIG. 10A through 10E are each a diagram illustrating one example of a display by generation process display device 100 according to Embodiment 2.

Figure 10B:
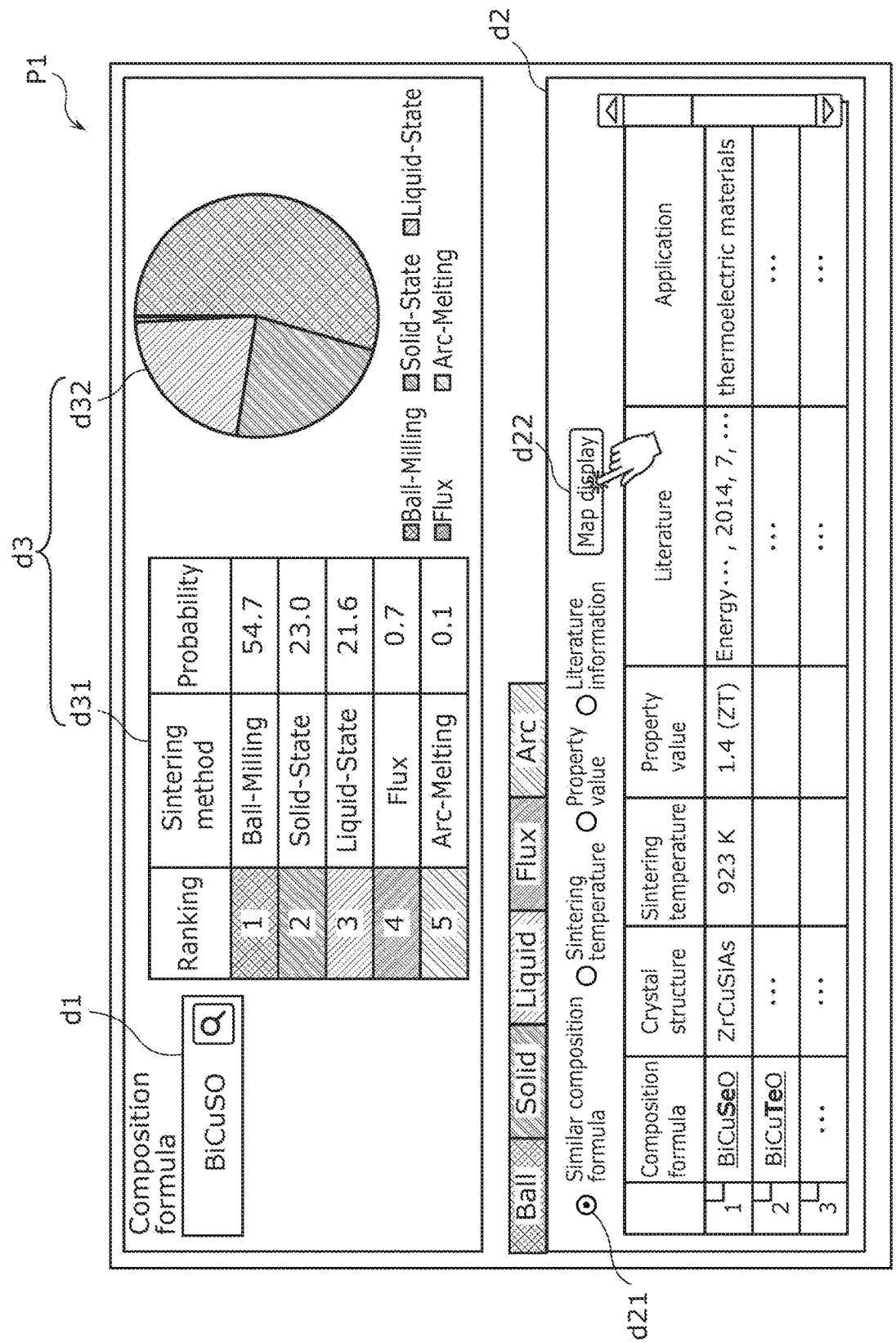
FIG. 10B is a diagram illustrating another example of the process-related image according to Embodiment 2.

As illustrated in FIG. 10A or FIG. 10B, image generator 107 according to the present embodiment generates process-related image P1 resulting from including, into process-related image P1 illustrated in FIG. 8C according to Embodiment 1, also map display button d22, and radio button d21 for each of similar composition formula, sintering temperature, property value, and literature information.

FIG. 10A is a diagram illustrating one example of process-related image P1 when radio button d21 for similar composition formula is selected. In this case, unless one or more composition formulae in known material area d2, i.e., a composition formula indicated in each of one or more second information items, are arranged in the descending order of similarity to a target composition formula, the display order of the one or more composition formulae may be switched so that the composition formulae are arranged in the descending order of the similarity. The similarity indicates a higher value as the aforementioned distance between the vector of the composition descriptor of a target composition formula and the vector of the composition descriptor of a similar composition formula gets shorter.

FIG. 10B is a diagram illustrating one example of process-related image P1 when map display button d22 is also selected after radio button d21 for similar composition formula is selected in FIG. 10A.

Figure 10C:
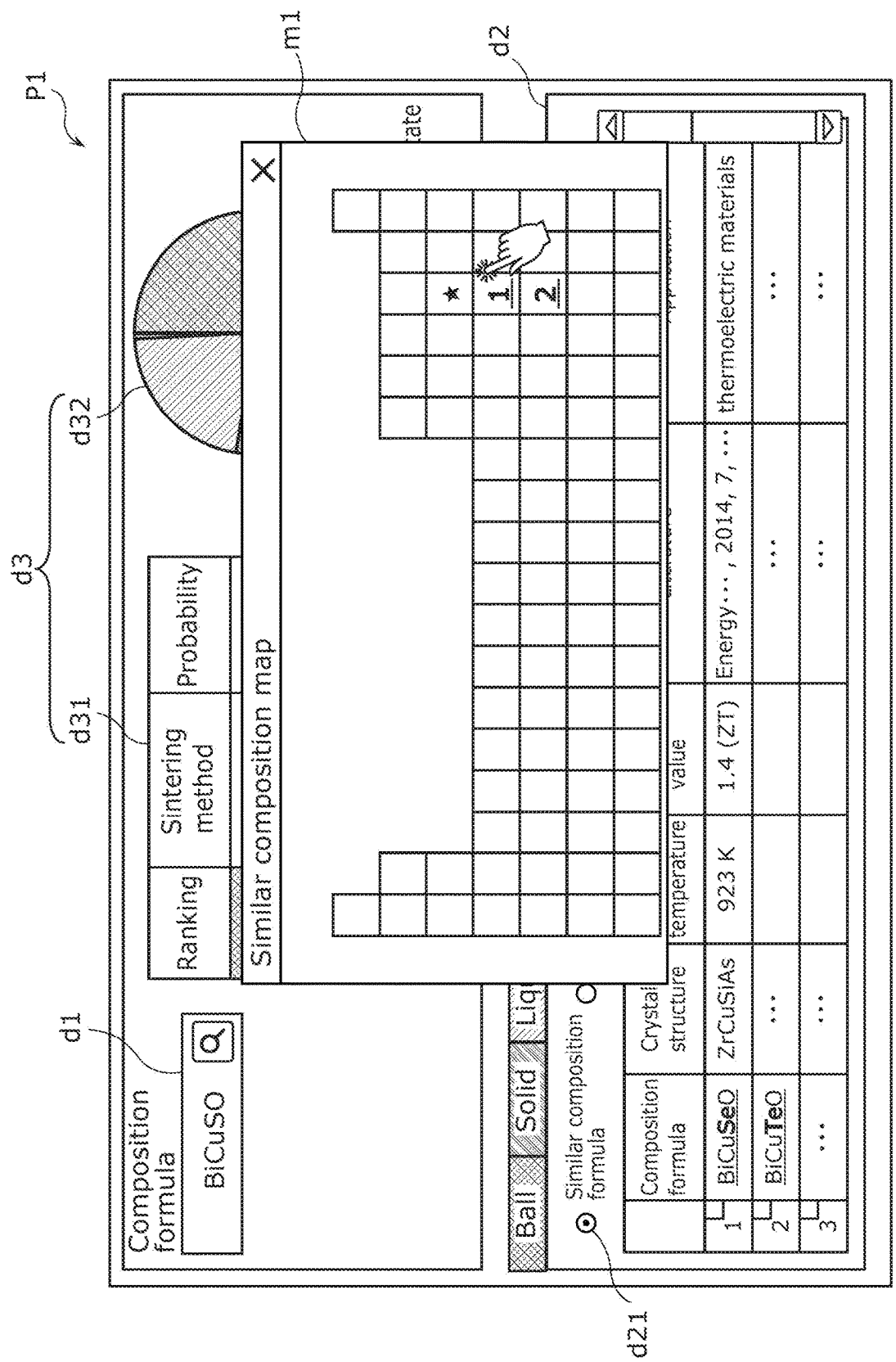
FIG. 10C is a diagram illustrating an example of a map according to Embodiment 2.

FIG. 10C is a diagram illustrating one example of a map displayed after map display button d22 in FIG. 1013 is selected. As illustrated in FIG. 10C, image generator 107 displays similar composition map m1 superimposed on process-related image P1. Similar composition map m1 indicates the relationship between the composition formula of each of one or more known materials and a target composition formula. Similar composition map m1 is, for example, the periodic table of elements. Specifically, similar composition map m1 shows, on the periodic table of elements, an element, which is not included in the target composition formula, in the composition formula of each of one or more known materials related to a target material. This makes it easier for the user to visually understand the relationship between a target composition formula and a similar composition formula. When an element on similar composition map m1 is selected in response to an input operation to second input unit 109 by the user, second information obtainer 106 obtains, from the first database, a paragraph corresponding to a composition formula including the selected element, and outputs the paragraph to image generator 107. Upon obtaining the paragraph from second information obtainer 106, image generator 107 generates and displays reference image P2 indicating the paragraph.

Figure 10D:
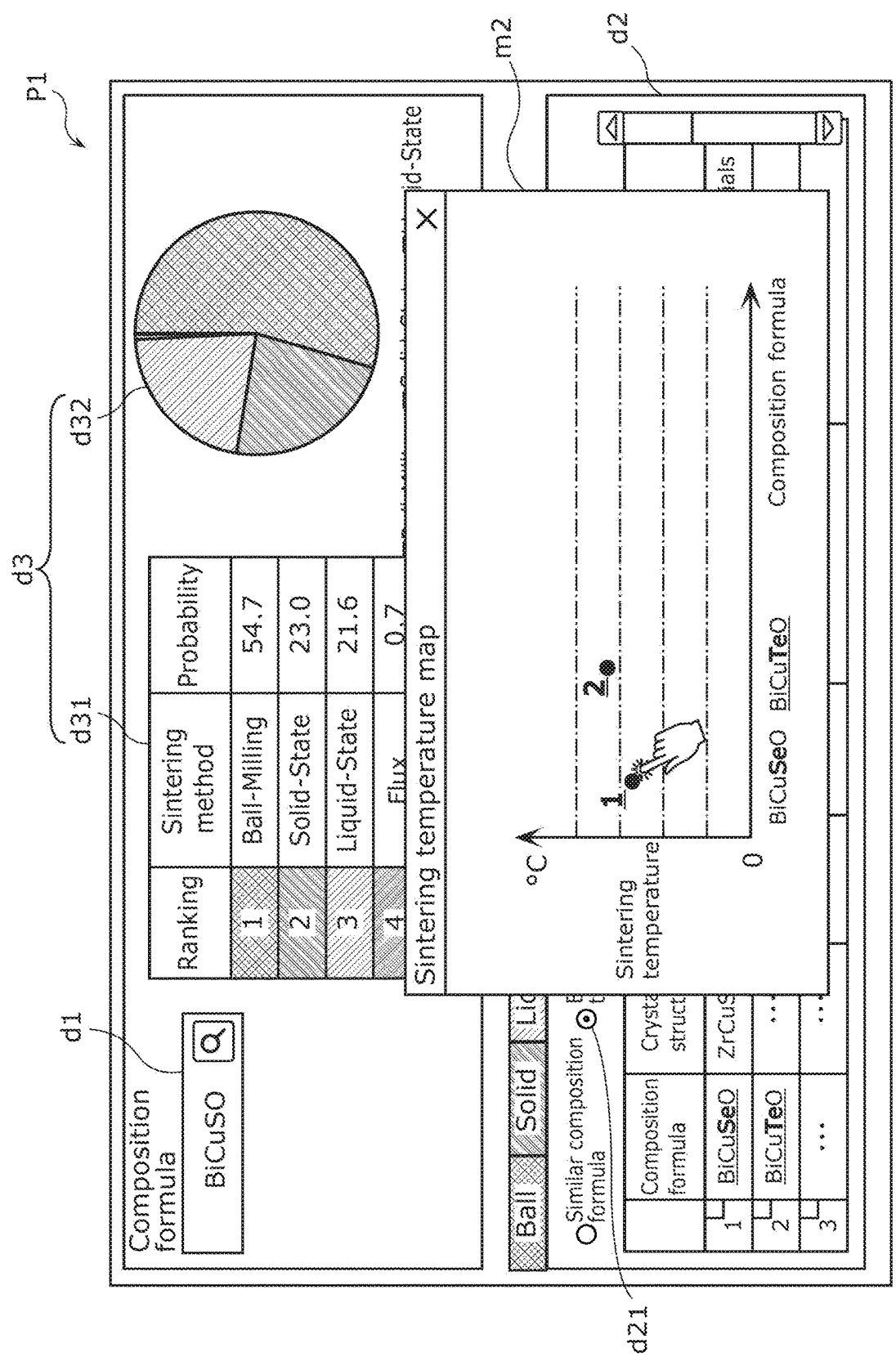
FIG. 10D is a diagram illustrating another example of the map according to Embodiment 2.

FIG. 10D is a diagram illustrating one example of a map displayed after radio button d21 for sintering temperature is selected and map display button d22 is selected. Image generator 107 displays sintering temperature map m2 superimposed on process-related image P1. Sintering temperature map m2 indicates the relationship of sintering temperatures of one or more known materials related to a target material. Sintering temperature map m2 is, for example, a two-dimensional map with the horizontal axis indicating a plurality of composition formulae and the vertical axis indicating a sintering temperature. Along the horizontal axis, the composition formulae of the one or more known materials are arranged in order, for example, with higher priority given to a composition formula closer to a target composition formula. Subsequently, a dot corresponding to each of the one or more known materials is placed at a position corresponding to the composition formula and sintering temperature of the known material on sintering temperature map m2. This makes it easier for the user to visually understand the relationship between a sintering temperature and a similar composition formula. In other words, when the user predicts the range of a sintering temperature that is very likely to achieve a target material, it is easy to find a known material whose sintering temperature is in the predicted sintering temperature range. When a composition formula or a dot indicating the sintering temperature of the composition formula on sintering temperature map m2 is selected in response to an input operation to second input unit 109 by the user, second information obtainer 106 obtains a paragraph corresponding to the selected composition formula or dot from the first database. Second information obtainer 106 then outputs the paragraph to image generator 107. Upon obtaining the paragraph from second information obtainer 106, image generator 107 generates and displays reference image P2 indicating the paragraph.

Figure 10E:
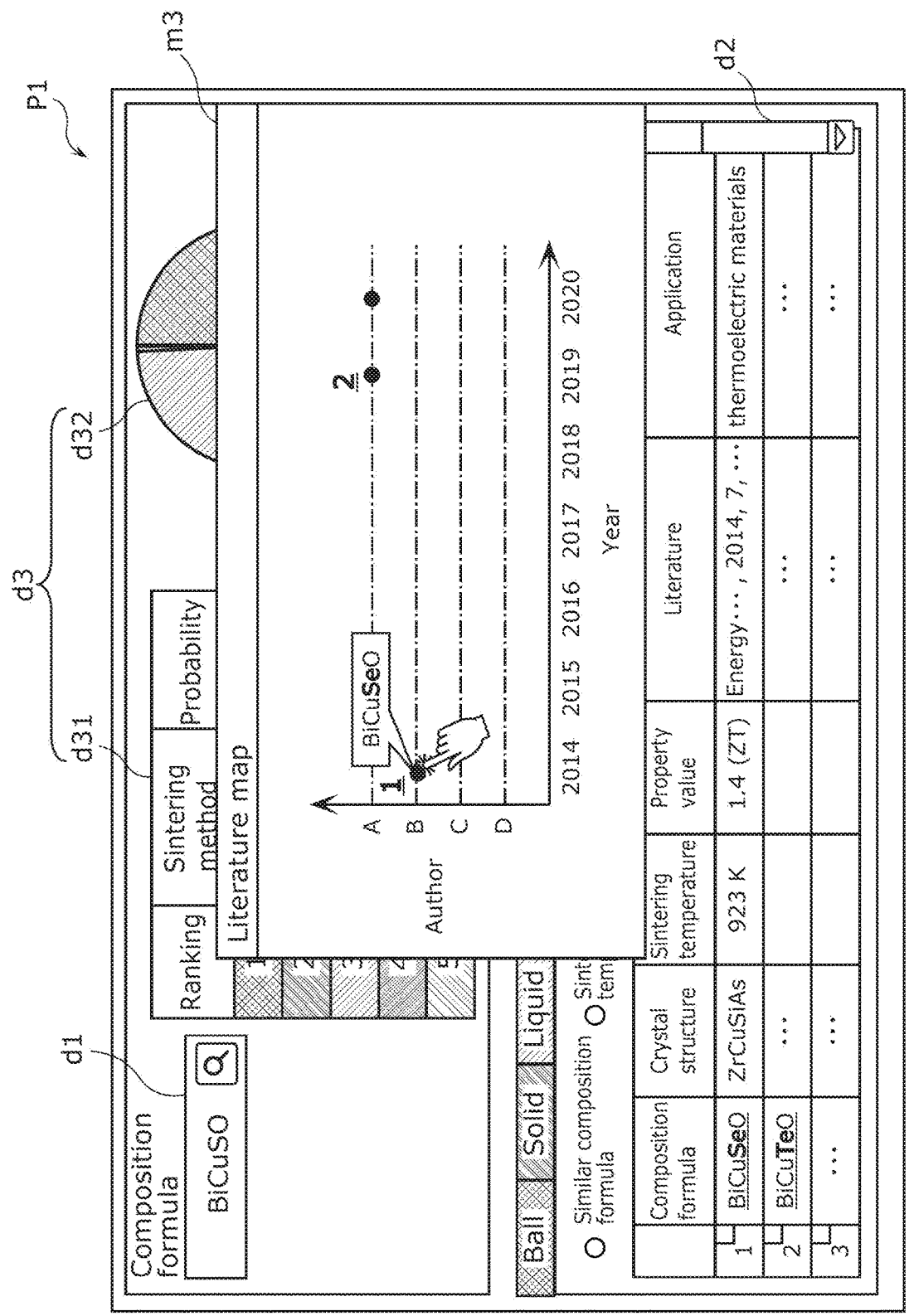
FIG. 10E is a diagram illustrating yet another example of the map according to Embodiment 2.

FIG. 10E is a diagram illustrating one example of a map displayed after radio button d21 for literature information is selected and map display button d22 is selected. Image generator 107 displays literature map m3 superimposed on process-related image P1. Literature map m3 indicates the relationship of dissertation data items 1 corresponding to a plurality of known materials. For example, the horizontal axis of literature map m3 indicates the publication year of dissertation data 1 and the vertical axis of literature map m3 indicates the name of the author of dissertation data 1. The publication year and the author's name of dissertation data 1 are presented as literature information in second information. For example, the user may be aware of a researcher who has been studying a known material for many years. Even when the number of such researchers is plural, it is easy to grasp the relationship between the presence or absence of the dissertation of each of the researchers the user is aware of and the publication year of the dissertation. When a dot corresponding to the publication year and author's name on literature map m3 is selected in response to an input operation to second input unit 109 by the user, second information obtainer 106 identifies dissertation data 1 corresponding to the selected dot in the first database. Second information obtainer 106 then outputs a paragraph of the specified dissertation data 1 that includes the description of a sintering method to image generator 107. Upon obtaining the paragraph from second information obtainer 106, image generator 107 generates and displays reference image P2 indicating the paragraph.

Image generator 107 according to the present embodiment thus generates, for example, similar composition map m1 as a map presenting the relationship of composition formulae indicated in second information items of one or more known materials, to display the map on display 108. Image generator 107 also generates, for example, sintering temperature map m2 as a map presenting the relationship between a composition formula and an attribute that are indicated in second information of each of the one or more known materials, to display the map on display 108. With this, even when multiple second information items are displayed in a list, the second information items are displayed on the map according to radio button d21 after the selection of radio button d21 and map display button d22. Accordingly, the user can easily find out desired second information from those second information items. As a result, the user can easily select the desired second information and easily view reference image P2 corresponding to the selected second information.

(Overall Processing of Generation Process Display Device 100 According to Embodiment 2)

Figure 11:
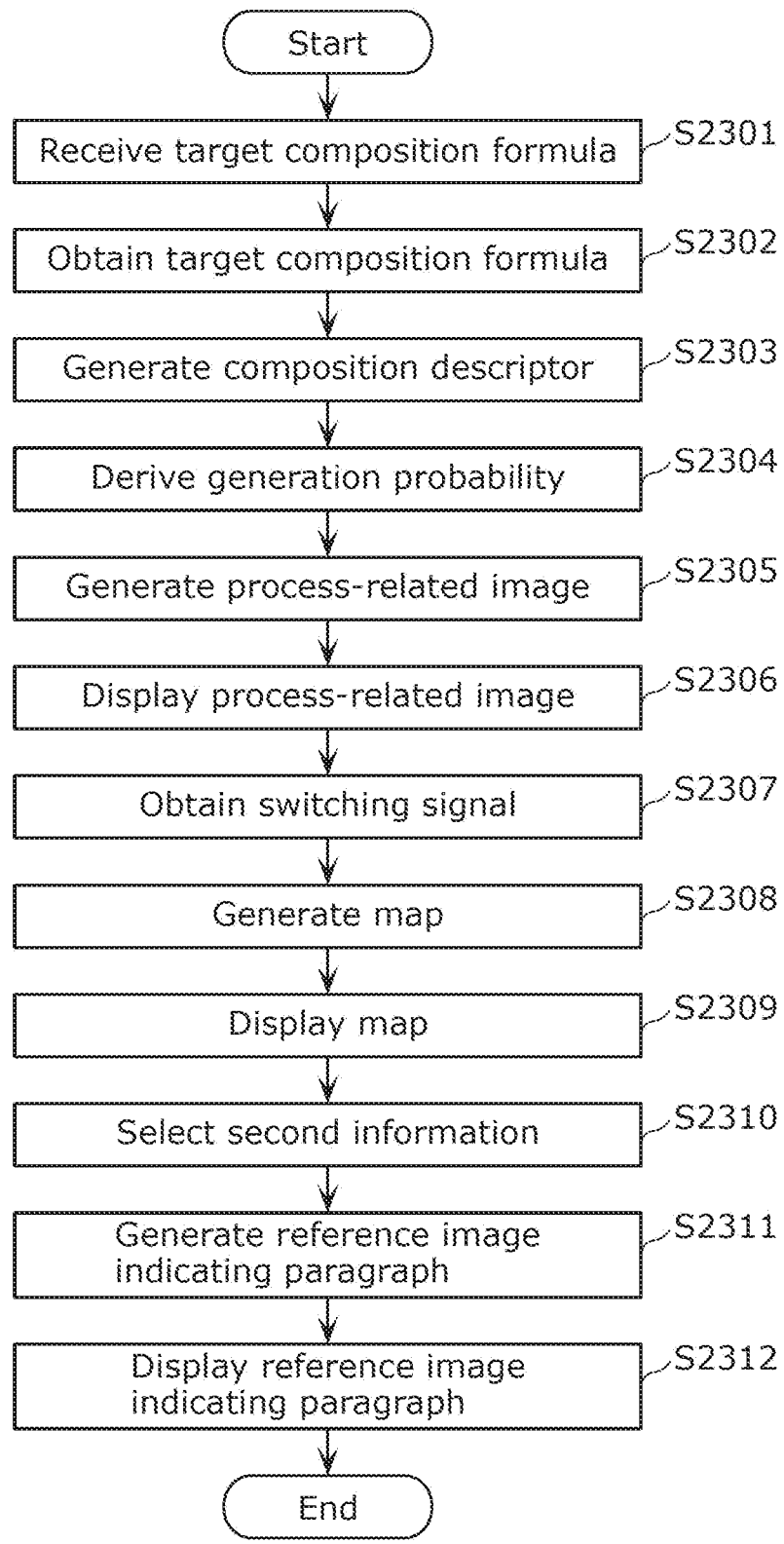
FIG. 11 is a flowchart illustrating one example of the overall flow of processing performed by a generation process display device according to Embodiment 2.

FIG. 11 is a flowchart illustrating one example of the overall flow of processing performed by generation process display device 100 according to Embodiment 2 of the present disclosure. Since processes from steps S2301 to S2306 included in the flowchart are same as the processes from steps S1301 to S1306 in FIG. 9, description thereof is omitted. Likewise, since processes from steps S2310 to S2312 are same as the processes from steps S1307 to S1309 in FIG. 9, description thereof is omitted.

(Step S2307)

Second information obtainer 106 obtains a switching signal from second input unit 109 in response to an input operation by the user. Second information obtainer 106 then outputs, to image generator 107, information corresponding to the obtained switching signal among the second information items of the one or more known materials presented in known material area d2. A switching signal indicates radio button d21 and map display button d22 selected by the user. The information corresponding to the switching signal is, for example, a composition formula, a sintering temperature, or literature information in the second information of each of the one or more known materials.

(Step S2308)

Image generator 107 generates a map indicating the information that corresponds to the switching signal obtained from second information obtainer 106 and that is included in the second information of each of the one or more known materials.

(Step S2309)

Image generator 107 displays the map generated in step S2308 on display 108.

The second information selected in step S2310 may be second information presented in known material area d2 or second information corresponding to an indicated object such as a dot on a map.

Embodiment 3

Figure 12A:
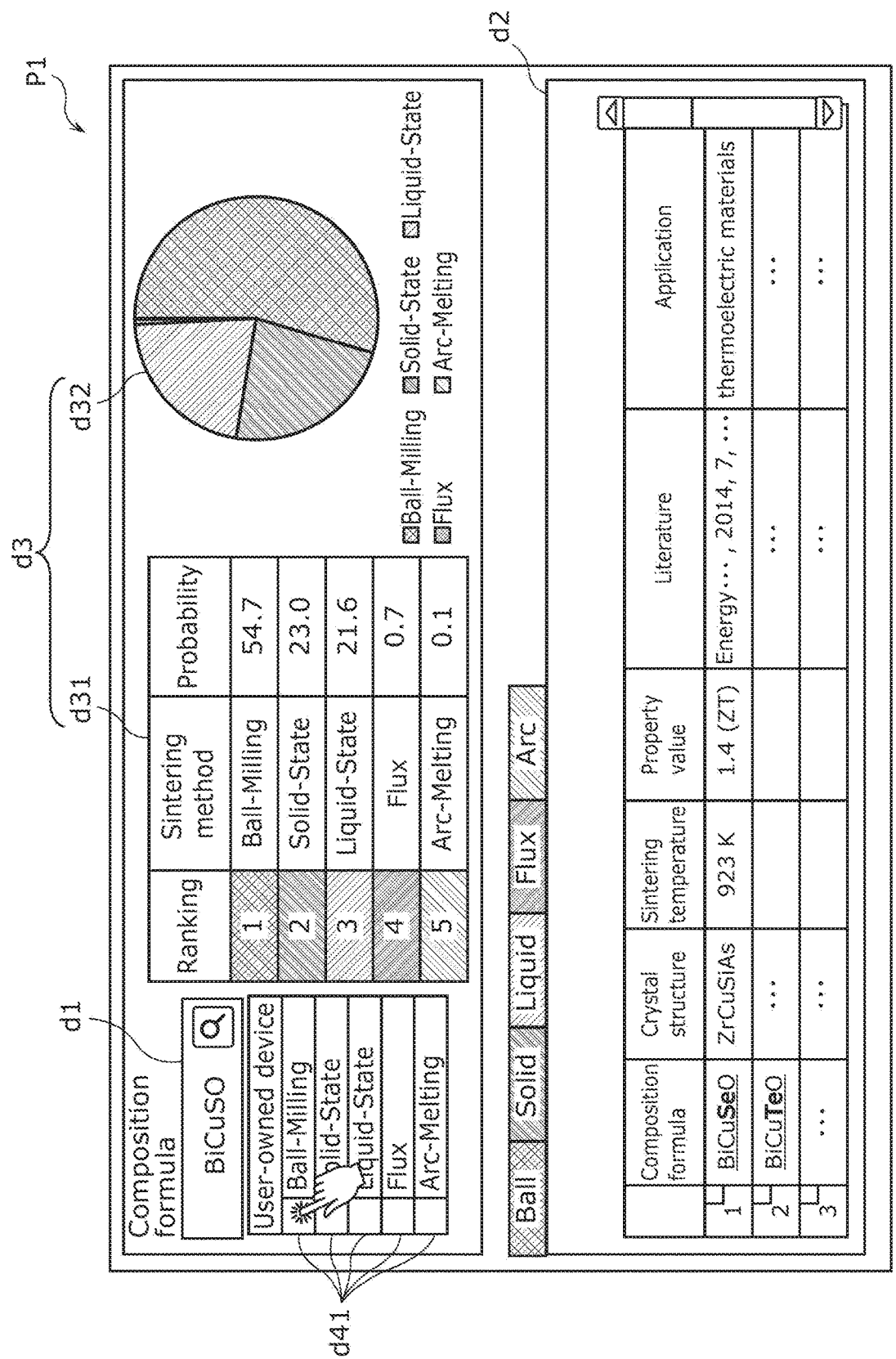
FIG. 12A is a diagram illustrating an example of a process-related image according to Embodiment 3.
Figure 12B:
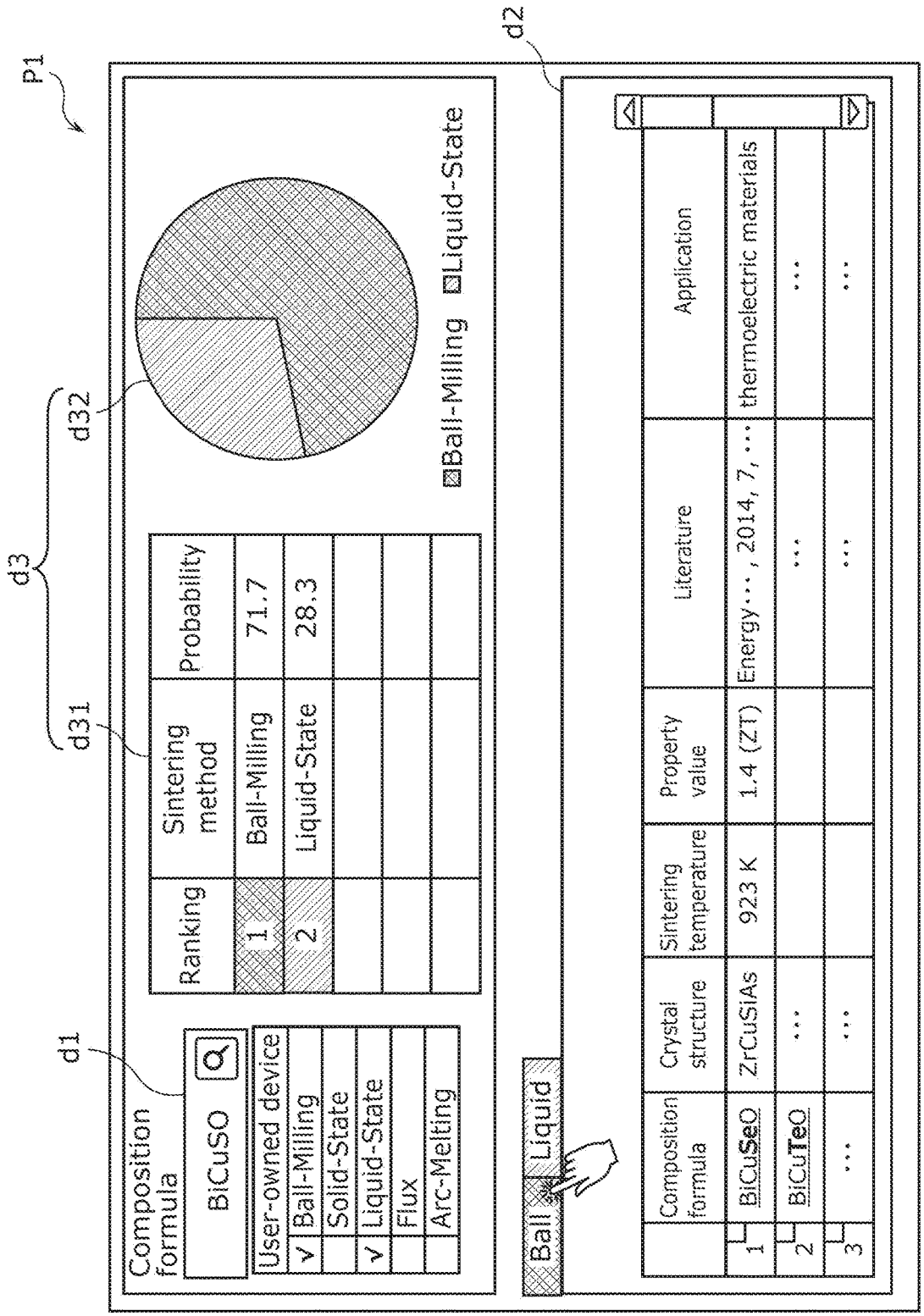
FIG. 12B is a diagram illustrating an example of a process-related image after update according to Embodiment 3.

An image displayed by generation process display device 100 according to Embodiment 3 will be described. Generation process display device 100 according to Embodiment 3 updates the generation probability of each of plural types of sintering methods based on a user-owned device. FIG. 12A and FIG. 12B are each a diagram illustrating one example of a display by generation process display device 100 according to Embodiment 3.

As illustrated in FIG. 12A, image generator 107 displays process-related image P1 resulting from including, into process-related image P1 in FIG. 8C according to Embodiment 1, method selection buttons d41 corresponding to five types of sintering methods. Specifically, in the example in FIG. 12A, method selection buttons d41 corresponding to the five types of sintering methods that are Ball-Milling, Solid-State, Liquid-State, Flux, and Arc-Melting are displayed. These method selection buttons d41 are buttons for notifying generation process display device 100 that a sintering method implementable by a sintering device owned by the user of generation process display device 100 is a sintering method corresponding to method selection button d41. A sintering device owned by the user is also referred to as a user-owned device. The user selects one or more method selection buttons d41 through an input operation to second input unit 109 by the user. As a result, second information obtainer 106 obtains, from second input unit 109, a signal in accordance with the input operation, and specifies the selected one or more method selection buttons d41 based on the signal. In other words, second information obtainer 106 specifies sintering methods corresponding to the one or more selected method selection buttons d41, and notifies image generator 107 of the specified sintering methods. Upon receiving the notification of the one or more types of sintering methods, image generator 107 updates the generation probability of each of the five types of sintering methods in accordance with the notified one or more types of sintering methods.

As illustrated in FIG. 12B, when method selection button d41 of each of Ball-milling and Liquid-State is selected, image generator 107 updates each of the generation probabilities in generation probability area d3 in process-related image P1. In other words, image generator 107 updates the generation probability of each of Ball-Milling and Liquid-State, and removes the generation probability of each of Solid-State, Flux, and Arc-Melting that are the other sintering methods. For example, image generator 107 multiplies the generation probability of each of Solid-State, Flux, and Arc-Melting with a weight "0" to update these generation probabilities to "0" and removes Solid-State, Flux, and Arc-Melting from generation probability area d3. Image generator 107 also updates the generation probabilities of Ball-Milling and Liquid-State while maintaining the ratio between these generation probabilities so that the sum of the generation probabilities is 100. When the generation probability of Ball-Milling is a and the generation probability of Liquid-State is b, for example, image generator 107 updates generation probability a by $a \times \{100/(a+b)\}$. In other words, image generator 107 multiplies generation probability a with a weight "$100/(a+b)$" to update generation probability a. Likewise, image generator 107 updates generation probability b by $b \times \{100/(a+b)\}$. In other words, image generator 107 multiplies generation probability b with the weight "$100/(a+b)$" to update generation probability b. The generation probability of each of Ball-Milling and Liquid-State thus updated is displayed in generation probability area d3 in process-related image P1.

When one or more method selection buttons d41 are selected, image generator 107 may update information indicated in known material area d2. For example, method selection button d41 for each of Ball-Milling and Liquid-State is selected, as described above. In this case, image generator 107 may keep only second information regarding each of Ball-Milling and Liquid-State among the second information items of one or more known materials indicated in known material area d2, and remove the remaining second information items from known material area d2.

(Overall Processing of Generation Process Display Device 100 According to Embodiment 3)

Figure 13:
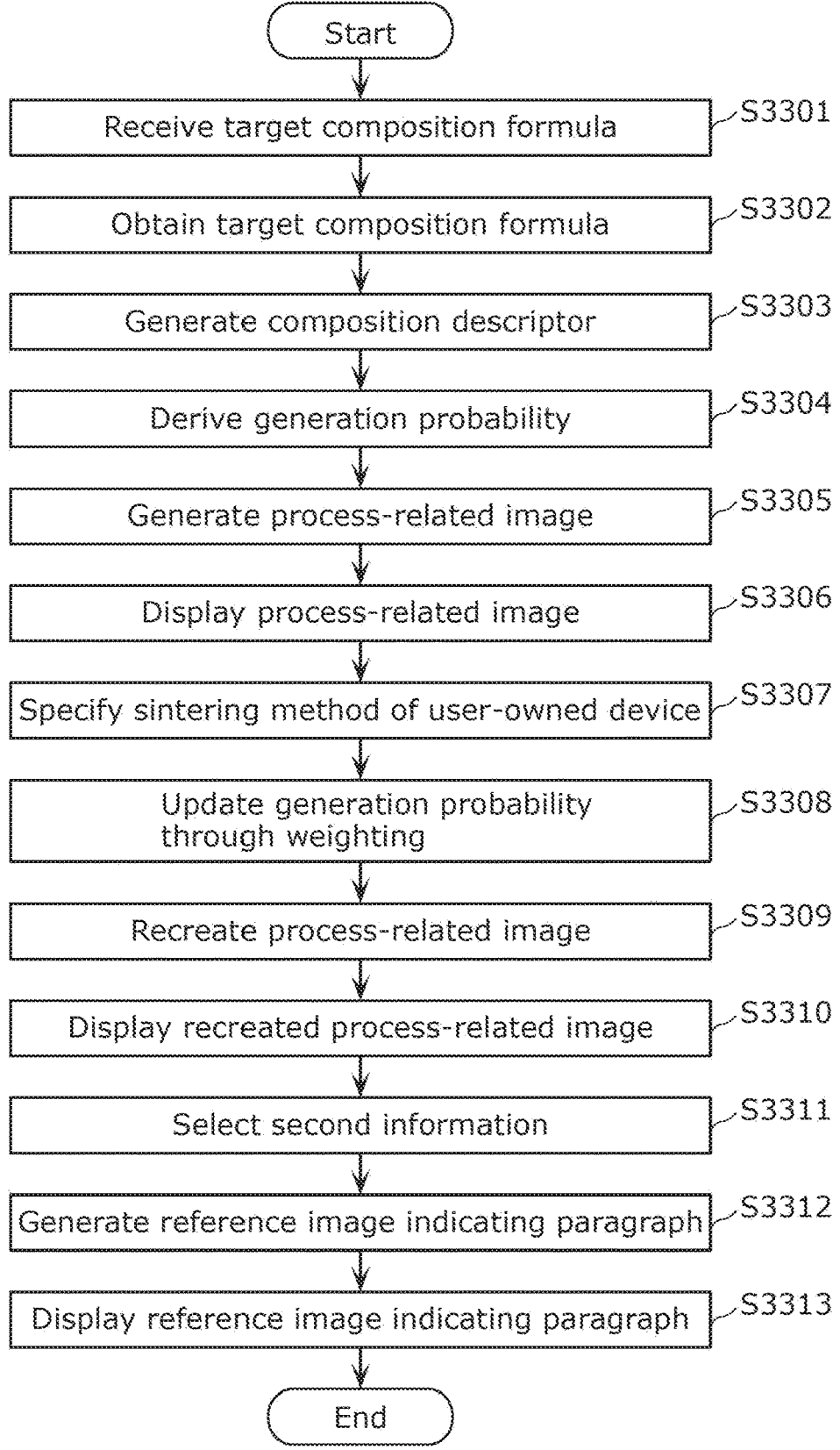
FIG. 13 is a flowchart illustrating one example of the overall flow of processing performed by a generation process display device according to Embodiment 3.

FIG. 13 is a flowchart illustrating one example of the overall flow of processing performed by generation process display device 100 according to Embodiment 3 of the present disclosure. Since processes from steps S3301 to S3306 included in this flowchart are same as the processes from S1301 to S1306 in FIG. 9, description thereof is omitted. Likewise, since processes from steps S3311 to S3313 are same as the processes from steps S1307 to S1309 in FIG. 9, description thereof is omitted.

(Step S3307)

Second information obtainer 106 specifies one or more types of sintering methods implementable by a user-owned device based on a signal obtained from second input unit 109. Second information obtainer 106 also notifies image generator 107 of the one or more types of sintering methods implementable by the user-owned device.

(Step S3308)

Image generator 107 updates the generation probability of each of five types of sintering methods based on the one or more types of sintering methods that are implementable by the user-owned device and notified by second information obtainer 106.

(Step S3309)

Image generator 107 recreates process-related image P1 based on the updated generation probabilities. In the recreated process-related image P1, the updated generation probabilities of the one or more types of sintering methods implementable by the user-owned device are indicated and the generation probabilities of the other sintering methods are not indicated. In process-related image P1 thus recreated, information indicated in known material area d2 may be also updated. In other words, image generator 107 may keep only second information items indicating the one or more types of sintering methods implementable by the user-owned device and remove the remaining second information items. Second information indicates, for example, a composition formula, a crystal structure, a sintering temperature, a sintering method, a property value, literature information, an application, etc.

(Step S3310)

Image generator 107 displays the recreated process-related image P1 on display 108.

Image generator 107 according to the present embodiment thus specifies the types of sintering methods implementable by a sintering device owned by the user and assigns different weights between the generation probabilities of the sintering methods of the specified types and the generation probabilities of the other remaining sintering methods among the generation probabilities of one or more types of sintering methods, to update the generation probability of each of the one or more types of sintering methods indicated in process-related image P1. This can increase the generation probabilities of sintering methods implementable by a sintering device owned by the user and decrease the generation probabilities of sintering methods implementable only by a sintering device not owned by the user. Accordingly, not only a possibility for chemical sintering of a material but also a possibility for sintering that takes user's environment related to the sintering into consideration can be derived as a generation probability. As a result, it is possible to inhibit displaying a high generation probability for a sintering method implementable only by a sintering device not owned by the user, i.e., a sintering method with a low sintering possibility in terms of user's environment.

In the above example, a weight greater than 1 is assigned to the generation probabilities of sintering methods implementable by a sintering device owned by the user, while a weight of 0 is assigned to the generation probabilities of the other remaining sintering methods. A weight greater than 0, however, may be assigned to the generation probabilities of the other remaining sintering methods. With this, even though the user does not own a sintering device and the user is in an environment that allows the user to readily use the sintering device, the generation probability of a sintering method implementable by that sintering device is inhibited from being derived as 0, so that an appropriate generation probability can be derived in accordance with the environment.

Figure 14:
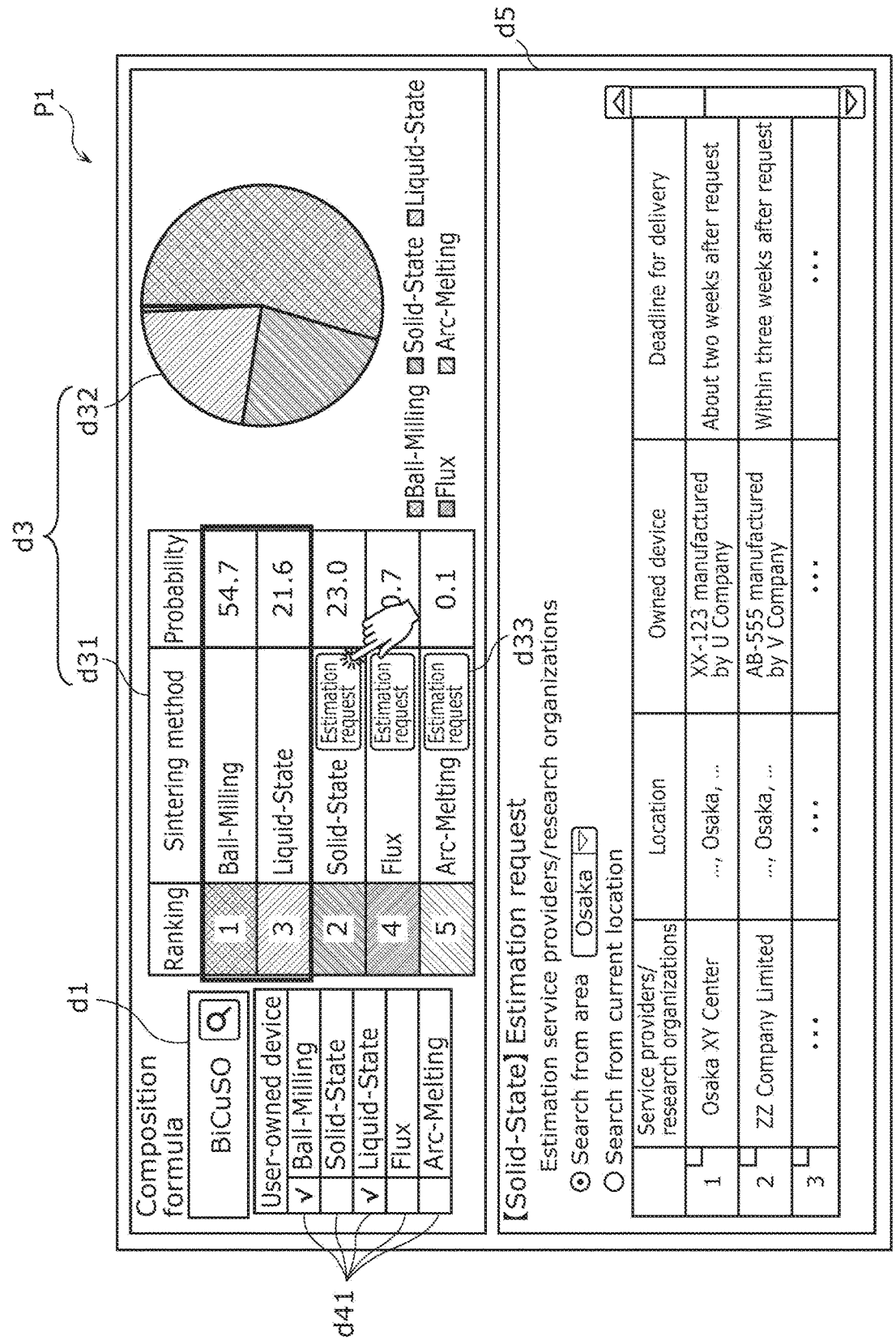
FIG. 14 is a diagram illustrating another example of the process-related image according to Embodiment 3.

FIG. 14 is a diagram illustrating another example of process-related image P1 after method selection buttons d41 in FIG. 12A are selected. For example, method selection button d41 for each of Ball-Milling and Liquid-State is selected, as in the above example. In this case, image generator 107 displays estimation request buttons d33 for replacing known material area d2 with estimation request area d5 in process-related image P1, without updating the generation probability of each of the five types of sintering methods, as illustrated in FIG. 14. This estimation request button d33 is associated with a sintering method in table d31 that is not implementable by a user-owned device.

When estimation request button d33 is selected through an input operation to second input unit 109 by the user, second input unit 109 outputs a signal indicating the selected estimation request button d33 to second information obtainer 106. Upon obtaining the signal, second information obtainer 106 specifies, based on the signal, a sintering method associated with the selected estimation request button d33, and obtains estimation request data related to an estimation request regarding a sintering device that can implement the sintering method. Estimation request data may be stored in first storage 301, second storage 302, the internal memory of generation process display device 100, or a server or a storage connected to network 401. Second information obtainer 106 then outputs the estimation request data to image generator 107. Upon obtaining the estimation request data from second information obtainer 106, image generator 107 replaces known material area d2 in process-related image P1 with estimation request area d5 presenting the estimation request data. Image generator 107 then displays process-related image P1 including estimation request area d5 on display 108.

In other words, in the example in FIG. 14, the generation probability of each type of a sintering method is derived and displayed, as in Embodiment 1, and estimation request button d33 is displayed for a sintering method corresponding to method selection button d41 that has not been selected. When estimation request button d33 is selected, estimation request data for requesting the estimation of a sintering device that can implement a sintering method associated with the selected estimation request button d33 is displayed in estimation request area d5 that is an estimation request window.

Second information obtainer 106 according to the present embodiment thus obtains estimated information regarding the estimation of a sintering device that can implement any one of the other remaining sintering methods excluding one or more sintering methods of the types specified in step S3307 among the one or more types of sintering methods. Image generator 107 then displays an image indicating the estimated information on display 108. Estimated information is, for example, estimation request data as described above, and an image indicating the estimated information is displayed in estimation request area d5 in process-related image P1. This enables the user to easily request, based on displayed estimated information, the estimation of a sintering device not owned by the user.

Embodiment 4

An image displayed by generation process display device 100 according to Embodiment 4 will be described. Generation process display device 100 according to Embodiment 4 updates information in known material area d2 based on required time prediction. FIG. and 15B are each a diagram illustrating one example of a display by generation process display device 100 according to Embodiment 4.

Figure 15A:
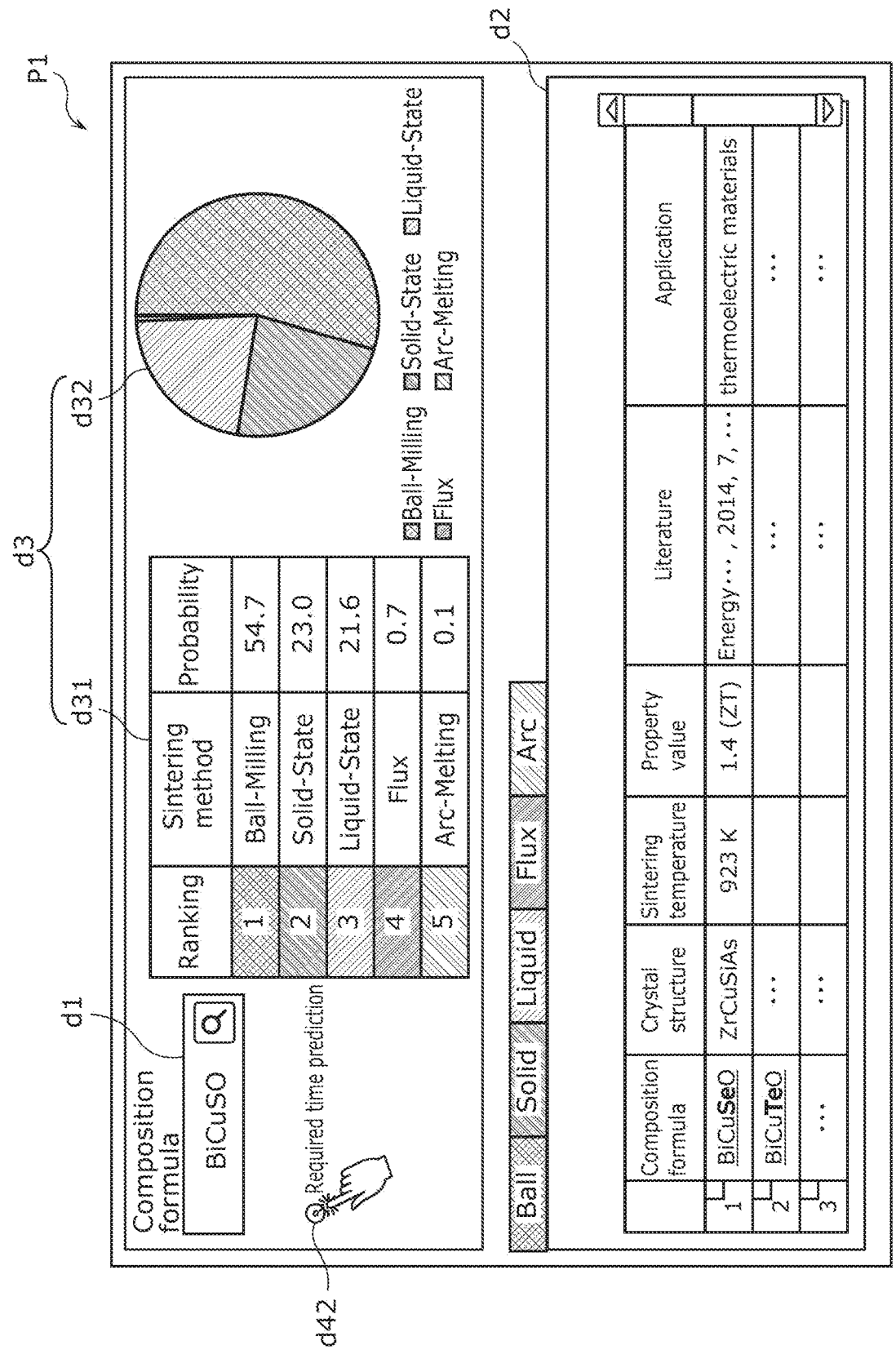
FIG. 15A is a diagram illustrating an example of a process-related image according to Embodiment 4.

As illustrated in FIG. 15A, image generator 107 displays process-related image P1 resulting from including required time prediction button d42 into process-related image P1 in FIG. 8C according to Embodiment 1.

Figure 15B:
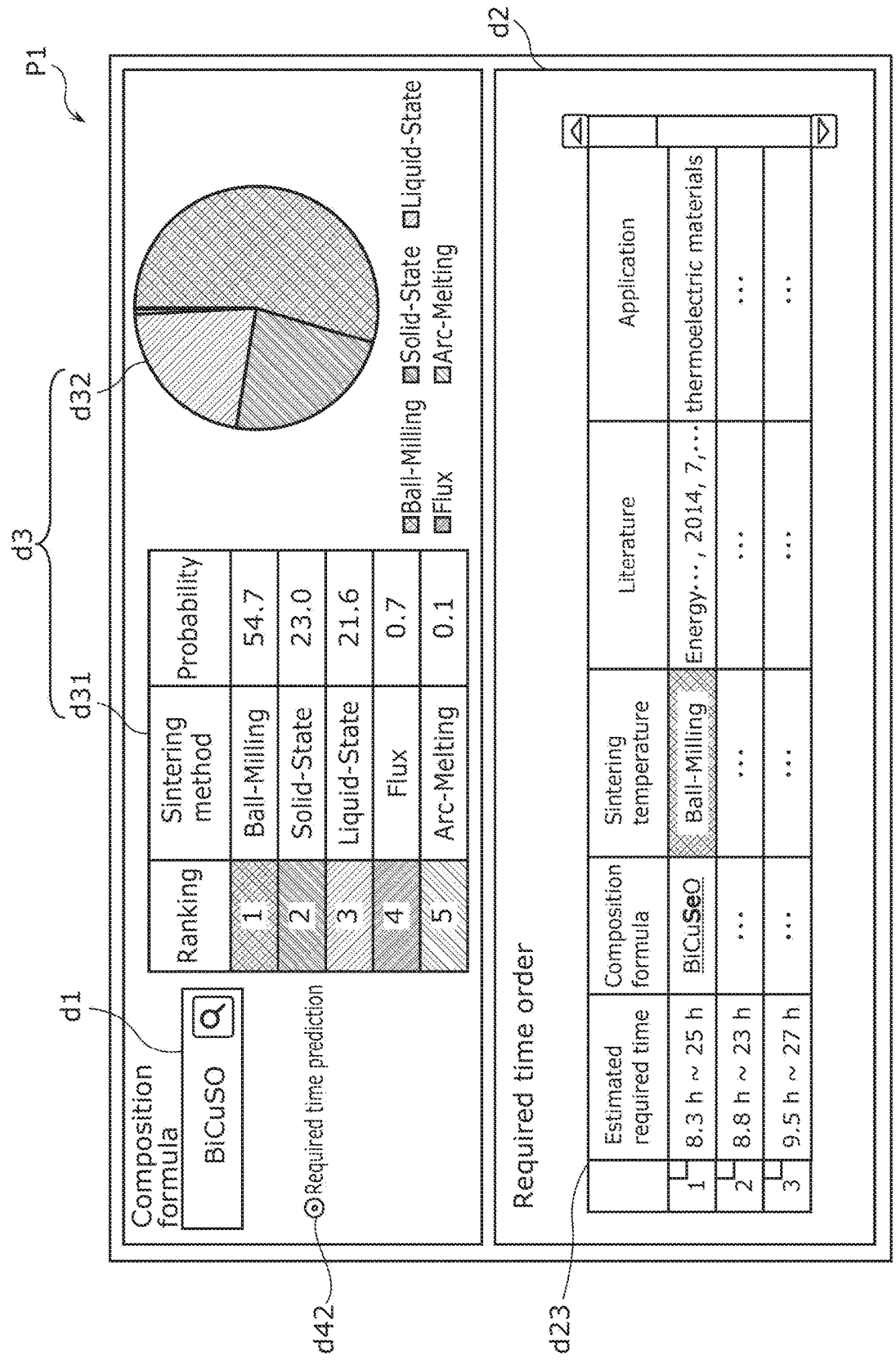
FIG. 15B is a diagram illustrating an example of a process-related image after update according to Embodiment 4.

When required time prediction button d42 is selected, as illustrated in FIG. 15A, image generator 107 updates known material area d2 so that estimated required time d23 of each of one or more known materials is included in known material area d2, as illustrated in FIG. 15B. Estimated required time d23 is, for example, a time estimated as being required for material sintering, synthesis, or generation.

When process-related image P1 illustrated in FIG. 15A is displayed, for example, second information obtainer 106 obtains second information from first synthesis information 2a and second synthesis information 2b of each of one or more known materials related to a target material. The second information indicates, for instance, a composition formula, a sintering method, literature information, and an application, excluding an estimated required time. Second information obtainer 106 then outputs the second information obtained for each of the one or more known materials to image generator 107. Image generator 107 generates process-related image P1 that includes required time prediction button d42 and known material area d2 indicating the second information obtained for each of the one or more known materials, and displays the generated process-related image P1 on display 108.

Subsequently, the user performs an input operation to second input unit 109 to select required time prediction button d42. As a result, second information obtainer 106 obtains, from second input unit 109, a signal in accordance with the input operation, and based on the signal, determines that required time prediction button d42 is selected. Consequently, second information obtainer 106 obtains information indicating an estimated required time from second synthesis information 2b of each of the one or more known materials related to the target material, and outputs the information to image generator 107.

Upon obtaining the information indicating the estimated required time of each of the one or more known materials from second information obtainer 106, image generator 107 updates known material area d2 in process-related image P1, as illustrated in FIG. 15B. In other words, known material area d2 as illustrated in FIG. 15A, which indicates, for each type of the sintering method, attributes such as the composition formula and crystal structure of each of the one or more known materials, is updated to known material area d2 as illustrated in FIG. 15B. In known material area d2 illustrated in FIG. 15B, the estimated required time of each of the one or more known materials is presented as part of the attributes of the known material. In known material area d2 illustrated in FIG. the composition formula and attributes of each of the one or more known materials are not classified for each type of the sintering method, and are presented in the ascending order of the estimated required time of the known material. The attributes of the known material are, for instance, the estimated required time, sintering method, literature information, and application of the known material. In other words, the composition formula and attributes of the known material are arranged in an order starting from a known material with the shortest estimated required time. When there are many sets each including the composition formula and attributes of a known material in known material area d2, a set for each of the one or more known materials may be arranged in the ascending order of the estimated required time of the known material.

In the present embodiment, when required time prediction button d42 is selected, second information obtainer 106 obtains information indicating an estimated required time, but second information obtainer 106 may obtain the information indicating an estimated required time in advance. In this case, second information obtainer 106 obtains the information indicating an estimated required time and outputs the information to image generator 107 before required time prediction button d42 is selected, i.e., when process-related image P1 in FIG. 15A is displayed. When required time prediction button d42 is selected, image generator 107 updates known material area d2, as illustrated in FIG. 15B, based on the information indicating an estimated required time, which was obtained in advance. Image generator 107 displays process-related image P1 including the updated known material area d2 on display 108.

(Overall Processing of Generation Process Display Device 100 According to Embodiment 4)

Figure 16:
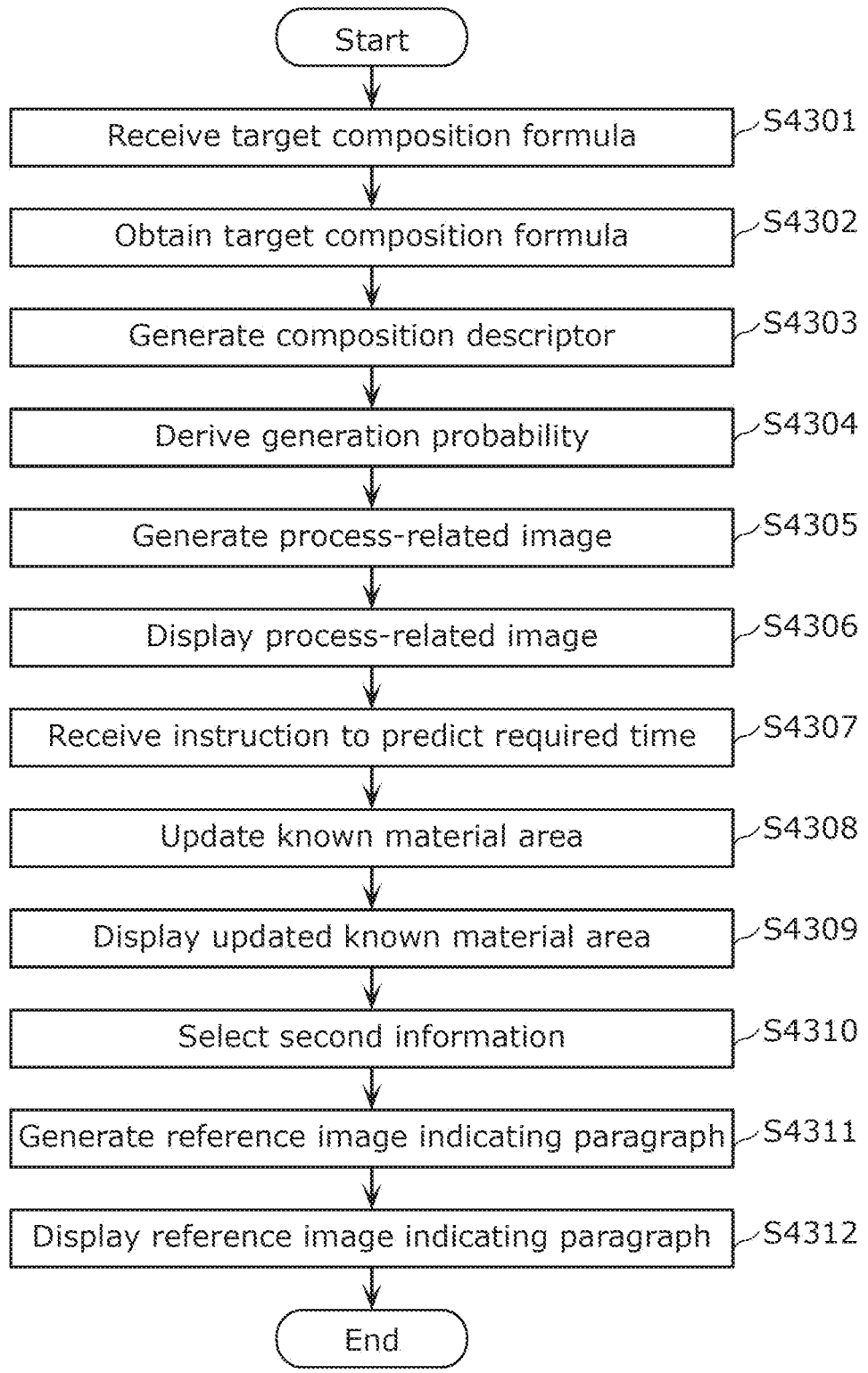
FIG. 16 is a flowchart illustrating one example of the overall flow of processing performed by a generation process display device according to Embodiment 4.

FIG. 16 is a flowchart illustrating one example of the overall flow of processing performed by generation process display device 100 according to Embodiment 4 of the present disclosure. Since processes from steps S4301 to S4306 included in this flowchart are same as the processes from step S1301 to S1306 in FIG. 9, description thereof is omitted. Likewise, since processes from steps S4310 to S4312 are same as the processes from steps S1307 to S1309 in FIG. 9, description thereof is omitted.

(Step S4307)

Based on a signal obtained from second input unit 109, second information obtainer 106 determines that required time prediction button d42 is selected. In other words, second information obtainer 106 receives an instruction to predict a required time. As a result, second information obtainer 106 obtains, from second synthesis information 2b in second storage 302, information indicating an estimated required time associated with the composition formula of each of the one or more known materials related to the target material, and outputs the information to image generator 107.

(Step S4308)

Image generator 107 updates known material area d2 in process-related image P1 based on the information indicating the estimated required time obtained from second information obtainer 106. Accordingly, the updated known material area d2 presents the estimated required time of each of the one or more known materials in association with the composition formula of the known material.

(Step S4309)

Image generator 107 displays process-related image P1 that includes the updated known material area d2 on display 108.

In the present embodiment, attributes indicated in second information of each of one or more known materials thus includes an estimated required time that is a time required for sintering the known material. Image generator 107 arranges the second information of each of the one or more known materials in an order according to the estimated required time indicated in the second information, and generates process-related image P1 indicating one or more second information items arranged in the order. Since the estimated required time of each of the one or more known materials is thus displayed, the user can predict a time required for sintering a target material based on these estimated required times. Moreover, since the estimated required times are arranged in order and displayed, the user can easily grasp the largest value, the smallest value, or the dispersion of the estimated required time, thereby more appropriately predicting the time required for sintering a target material. If the attributes of each of the one or more known materials include a sintering method, the user can easily determine which sintering method can reduce the time required for sintering a target material. For example, when the user attempts to use, for the sintering of the target material, a sintering method with the highest generation probability among the sintering methods presented in process-related image P1, and the estimated required time of the sintering method is long, the user can determine to use a sintering method with the second highest generation probability for the sintering of the target material. In other words, the user can select a sintering method for a target material with consideration given to a time required for sintering.

Embodiment 5

Figure 17A:
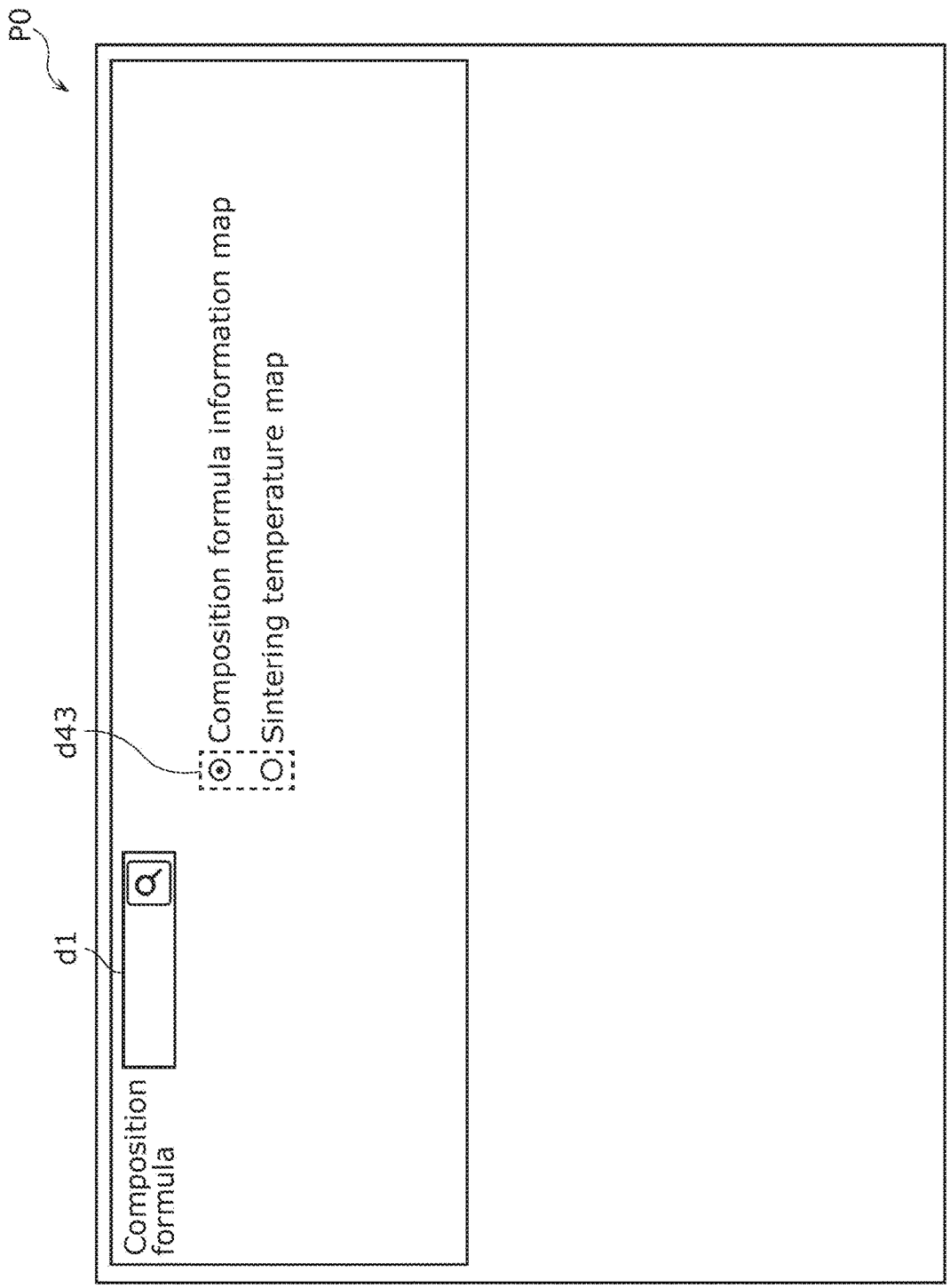
FIG. 17A is a diagram illustrating one example of an initial image according to Embodiment 5.
Figure 17C:
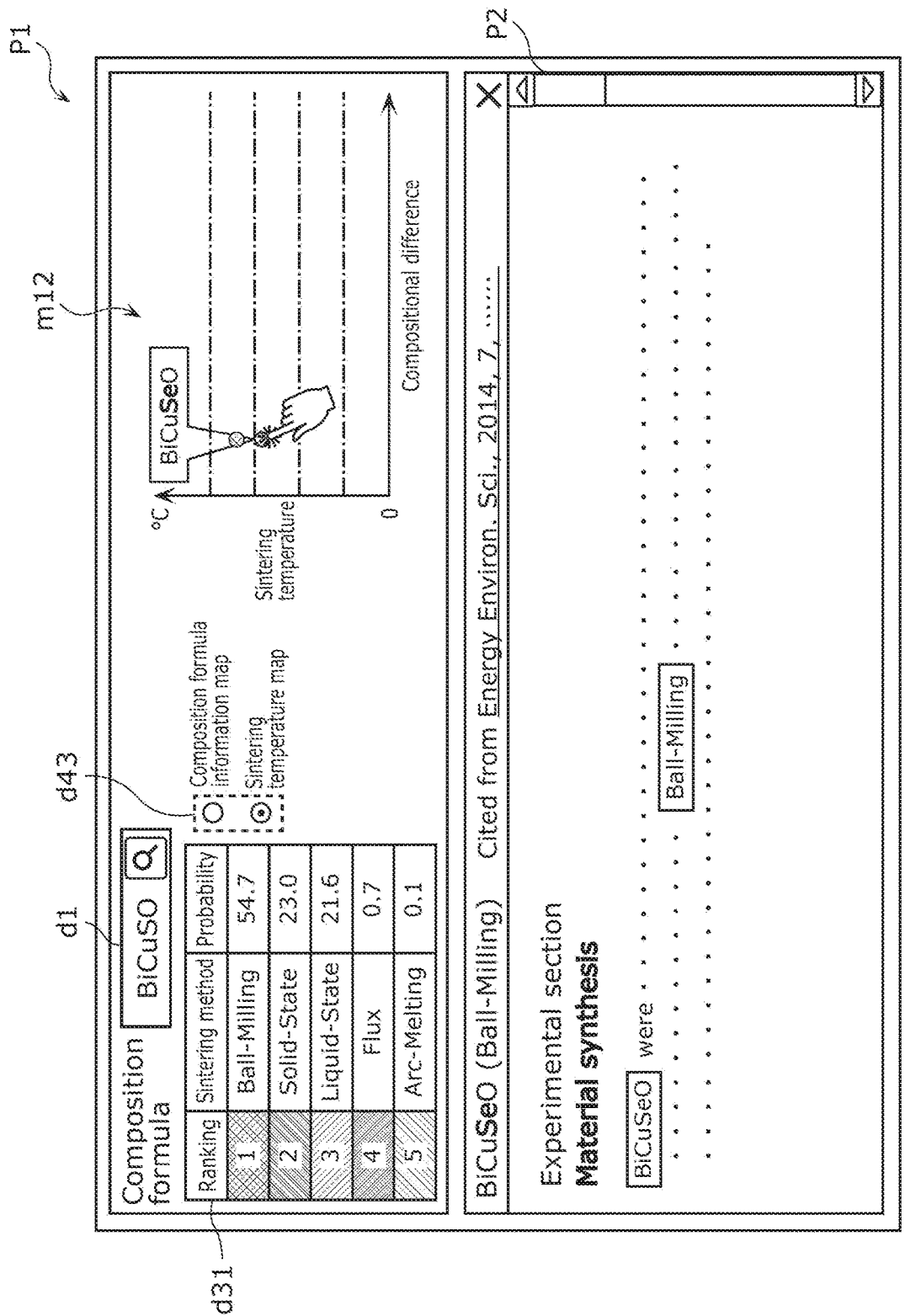
FIG. 17C is a diagram illustrating another example of the process-related image according to Embodiment 5.

An image displayed by generation process display device 100 according to Embodiment 5 will be described. Generation process display device 100 according to Embodiment 5 generates process-related image P1 including a map instead of known material area d2. When a dot corresponding to the composition formula of a known material on the map is selected, generation process display device 100 displays, in process-related image P1, reference image P2 corresponding to the composition formula. FIG. 17A, FIG. 17B, and FIG. 17C are each a diagram illustrating one example of a display by generation process display device 100 according to Embodiment 5.

As illustrated in FIG. 17A, image generator 107 generates initial image P0 that includes a plurality of map selection buttons d43 for selecting the type of a map. Initial image P0 includes, for example, target composition area d1 that is empty for receiving the input of a target composition formula, map selection button d43 for selecting a composition formula information map, and map selection button d43 for selecting a sintering temperature map.

The user performs an input operation to first input unit 101 to input a target composition formula to target composition area d1, and also selects one of two map selection buttons d43. First information obtainer 102 obtains, as first information, a signal indicating the target composition formula in accordance with the input operation, and obtains also a map selection signal indicating the type of a map corresponding to map selection button d43 selected in response to the input operation.

The map selection signal indicates, for example, a composition formula information map as a map type. In this case, image generator 107 obtains, from first information obtainer 102, the first information and the map selection signal indicating a composition formula information map, and generates process-related image P1 illustrated in FIG. 17B to display process-related image P1 on display 108. This process-related image P1 illustrated in FIG. 17B includes composition formula information map m11 instead of known material area d2. The vertical axis of composition formula information map m11 indicates a compositional difference, and the horizontal axis of composition formula information map m11 indicates a composition formula. The compositional difference is the difference between a composition descriptor corresponding to a target composition formula and a composition descriptor corresponding to the composition formula of a known material, and is the distance between the vectors of these composition descriptors. The composition formulae of one or more known materials related to a target material are arranged along the horizontal axis of composition formula information map m11 in accordance with the result of principal component analysis. On composition formula information map m11, a dot corresponding to each of the one or more known materials related to the target material is arranged at a location corresponding to the compositional difference and composition formula of the known material.

When the map selection signal indicates a sintering temperature map, image generator 107 displays process-related image P1 so as to include sintering temperature map m12 instead of known material area d2, as illustrated in FIG. 17C. The vertical axis of sintering temperature map m12 indicates a sintering temperature and the horizontal axis of sintering temperature map m12 indicates a compositional difference. On sintering temperature map m12, a dot corresponding to each of the one or more known materials related to the target material is arranged at a location corresponding to the sintering temperature and compositional difference of the known material.

The user performs an input operation to second input unit 109 to select a dot on composition formula information map m11 or sintering temperature map m12. Second information obtainer 106 obtains, from second input unit 109, a signal in accordance with the input operation, and specifies the selected dot based on the signal. Second information obtainer 106 also obtains, from the first database, a paragraph that describes, for instance, the sintering method of the composition formula of the known material corresponding to the specified dot. Second information obtainer 106 then outputs the paragraph to image generator 107. Upon obtaining the paragraph from second information obtainer 106, image generator 107 generates reference image P2 indicating the paragraph, to include reference image P2 in process-related image P1. Image generator 107 displays process-related image P1 including that reference image P2 on display 108.

(Overall Processing of Generation Process Display Device 100 According to Embodiment 5)

Figure 18:
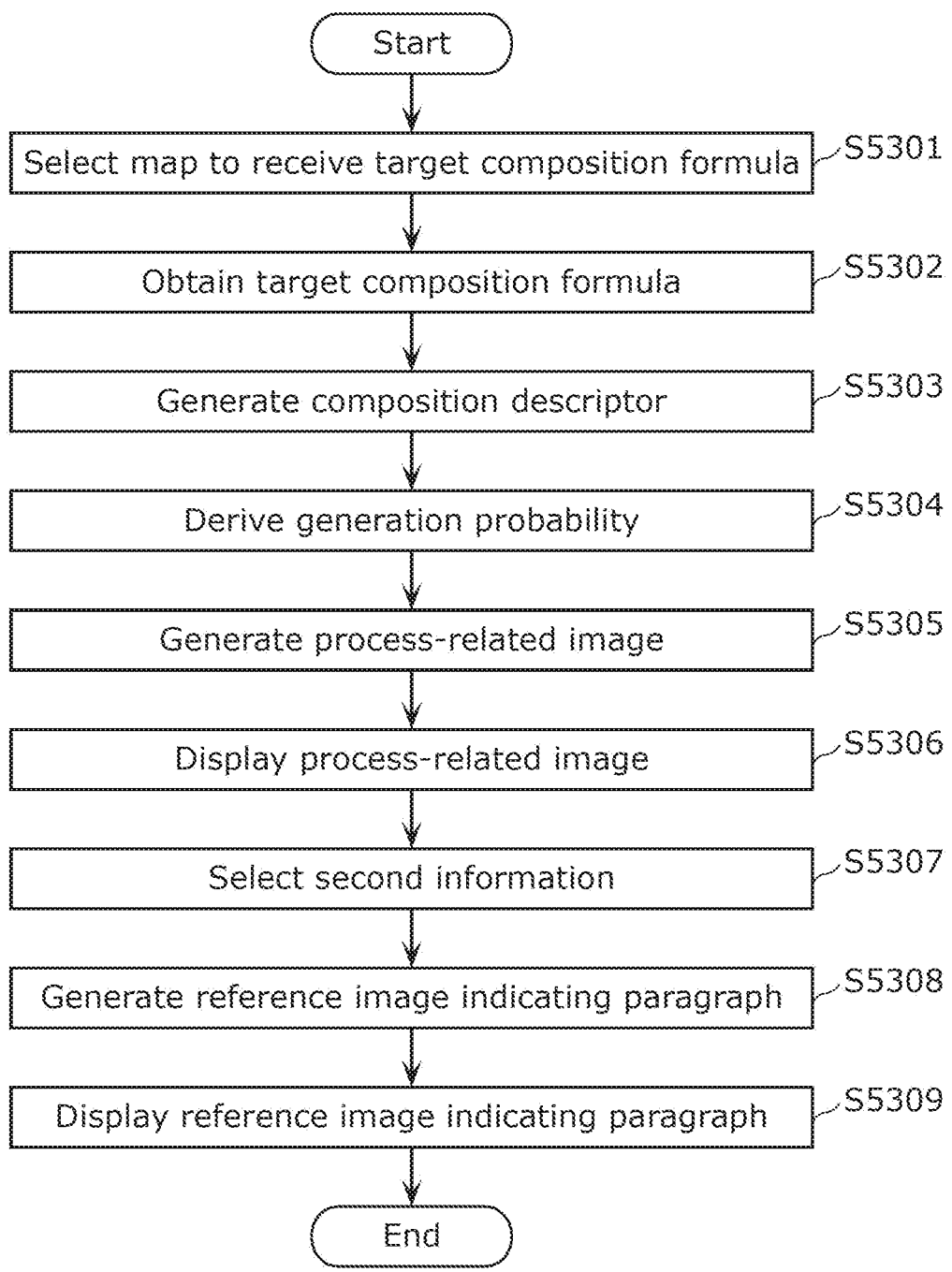
FIG. 18 is a flowchart illustrating one example of the overall flow of processing performed by a generation process display device according to Embodiment 5.

FIG. 18 is a flowchart illustrating one example of the overall flow of processing performed by generation process display device 100 according to Embodiment 5 of the present disclosure. Since processes from steps S5302 to S5304 included in this flowchart are same as the processes from steps S1302 to S1304 in FIG. 9, description thereof is omitted. Likewise, processes from steps S5306 to S5309 are same as the processes in steps S1306 to S1309 in FIG. 9, description thereof is omitted.

(Step S5301)

After an input operation by the user, first input unit 101 outputs the following to first information obtainer 102: first information which is a signal indicating a target composition formula to be displayed; and a map selection signal indicating a map type. First information obtainer 102 outputs the first information and the map selection signal to image generator 107.

(Step S5305)

Image generator 107 generates a map based on second information of each of one or more known materials related to a target material and the map selection signal obtained from first information obtainer 102. In other words, image generator 107 arranges the second information in a display format according to the map type indicated by the map selection signal, to generate a map. The map is, for example, composition formula information map m11 or sintering temperature map m12 described above. Image generator 107 then generates process-related image P1 including the map.

Second information selected in step S5307 is equivalent to a dot corresponding to the composition formula of a known material on the map described above.

In the present embodiment, as in Embodiment 2, image generator 107 thus generates composition formula information map m11 presenting the relationship of composition formulae indicated in the second information items of one or more known materials or sintering temperature map m12 presenting the relationship between a composition formula and attributes indicated in the second information of each of the one or more known materials, to display the map on display 108. With this, multiple second information items are displayed as a map instead of in a list, and the user can therefore easily find out desired second information from those second information items. As a result, the user can easily select the desired second information and easily view reference image P2 corresponding to the selected second information.

Although the generation process display device according to one or more aspects of the present disclosure has been described based on each of Embodiments 1 through 5, the present disclosure is not limited to these embodiments. Embodiments achieved by applying various modifications conceived by persons skilled in the art to the embodiments may be also included in the present disclosure, so long as they do not depart from the spirit of the present disclosure. In addition, embodiments achieved by combining elements from different embodiments may be also included in the present disclosure.

In each of the embodiments described above, generation process display device 100 displays, for instance, process-related image P1 and reference image P2 on display 108, but may output information included in these images without displaying the images. In this case, generation process display device 100 may be also referred to as a generation process output device.

In other words, the generation process output device outputs information regarding a generation process for a material, and includes: first information obtainer 102 that obtains first information indicating the composition formula of a target material; second information obtainer 106 that obtains, from a database regarding materials, second information of each of one or more known materials related to the composition formula indicated in the first information, where the second information indicates the composition formula and attribute of the known material; probability deriver 105 that, based on the database, derives, for each of one or more types of sintering methods, a possibility that the target material having the composition formula indicated in the first information is sintered using the sintering method, where the possibility is derived as a generation probability; and an outputter that outputs, as information regarding the generation process, the second information of each of the one or more known materials and the generation probability of each of the one or more types of sintering methods. When one of the output second information items of the one or more known materials is selected, second information obtainer 106 obtains, from the database, the area of part of literature that describes the sintering method of the known material having the composition formula indicated in the selected second information item. The outputter outputs information indicating the description in the area of the part of the literature. The outputter is, for example, a functional element included in image generator 107. Such a generation process output device cannot display, for instance, information regarding a generation process directly on display 108, but is capable of causing other device connected to network 401 to display an image indicating such information by outputting the information to, for example, network 401. As a result, the same advantageous effects as produced by generation process display device 100 described above can be produced.

Second information obtainer 106 in the generation process output device need not obtain the aforementioned area of part of literature from a database. In addition, the outputter need not output information indicating the description in the area of the part of the literature. Even in such a case, the same advantageous effects as produced by generation process display device 100 described above can be produced for information regarding a generation process and excluding information indicated in reference image P2.

In each of the embodiments described above, probability deriver 105 inputs the composition descriptor of a target composition formula to a sintering predictor to derive the generation probability of each of five types of sintering methods for a target material. Probability deriver 105 uses a single sintering predictor, but may use a plurality of sintering predictors. For example, each of five sintering predictors outputs the generation probability of one type of sintering method associated in advance with the sintering predictor. In this case, probability deriver 105 inputs the composition descriptor of the target composition formula to each of the five sintering predictors to derive the generation probability of each of the five types of the sintering methods for the target material.

In each of the embodiments described above, a sintering predictor outputs the generation probability of each of five sintering methods in response to the input of the composition descriptor of a target composition formula composed of element types of at most 72 or 86 types. Nevertheless, the sintering predictor may output a generation probability in response to the input of the composition descriptor of a composition formula composed of two types of element types. In this case, probability deriver 105 inputs, for each pair of two element types included in a target composition formula, a composition descriptor corresponding to the pair to derive the generation probability of each of the five sintering methods for the pair. Probability deriver 105 then calculates the generation probability of the sintering method for the target composition formula using the generation probability of the sintering method derived for each pair. When a target composition formula is "BiCuSO", for example, pairs each composed of two types of element types included in the target composition formula are "BiCu", "BiS", "BiO", "CuS", "CuO", and "SO". Probability deriver 105 inputs, for each of these pairs, a composition descriptor corresponding to the pair to the sintering predictor to derive the generation probability of each of the five sintering methods for the pair. Probability deriver 105 then derives the generation probability of a predetermined sintering method for the target composition formula "BiCuSO", using the generation probability of the predetermined sintering method for "BiCu", the generation probability of the predetermined sintering method for "BiS", the generation probability of the predetermined sintering method for "BiO", the generation probability of the predetermined sintering method for "CuS", the generation probability of the predetermined sintering method for "CuO", and the generation probability of the predetermined sintering method for "SO". The average or weighted addition of the generation probabilities derived for the pairs may be used in the calculation of the generation probability of the predetermined sintering method for the target composition formula.

In each of the embodiments described above, the generation probability of each of the five types of sintering methods are derived and displayed, but the number of the sintering method types is not limited to five, and may be at least one and less than five, or may be six or more. In addition, the sintering method types are not limited to Ball-Milling, Solid-State, Liquid-State, Flux, and Arc-Melting, and may be any other type. Furthermore, the names of the sintering methods such as Ball-Milling, Solid-State, Liquid-State, Flux, and Arc-Melting are examples, and the names of the sintering methods according to the present disclosure are not limited to these names. For example, Ball-Milling may be Ball-Mill.

A first database according to each of the above embodiments includes a plurality of dissertation data items 1 as literatures, but each of the literatures is not limited to dissertation data 1 indicating a dissertation and may be a magazine, a book, or data indicating an experiment report.

In each of the embodiments described above, first synthesis information 2a and second synthesis information 2b are separate from each other, but may be integrated into one.

The attributes indicated in second synthesis information 2b according to each of the embodiments described above include the location of a paragraph in dissertation data 1, but may include the paragraph per se. In this case, second information obtainer 106 can obtain the paragraph from second synthesis information 2b without using dissertation data 1 in the first database.

In each of the embodiments described above, second information items of a plurality of known materials are displayed, but the number of the second information items may be one.

Summary of Embodiments 1 Through 5

It can be said that generation process display device 100 according to each of Embodiments 1 through 5 is a generation process display device or a generation process output device as described below.

A generation process display device is a generation process display device that displays information regarding a material generation process, and includes: a first information obtainer that obtains first information indicating the composition formula of a target material; a second information obtainer that obtains, from a database regarding materials, second information of each of one or more known materials related to the composition formula indicated in the first information, where the second information indicates the composition formula and attribute of the known material; a probability deriver that based on the database, derives, for each of one or more types of sintering methods, a possibility that the target material having the composition formula indicated in the first information is sintered using the sintering method, where the possibility is derived as a generation probability; and an image generator that generates a first image indicating the second information of each of the one or more known materials and the generation probability of each of the one or more types of sintering methods to display the first image on a display. When one of the second information items of the one or more known materials indicated in the first image is selected, the second information obtainer also obtains, from the database, the area of part of literature that describes the sintering method of the known material having the composition formula indicated in the selected second information item, and the image generator also generates, as a second image, an image indicating the description in the area of the part of the literature to display the second image on the display. The first image is also referred to as a process-related image and the second image is also referred to as a reference image.

With this, the generation probability of each type of a sintering method for a target material is displayed. In other words, a possibility that the target material is generated through sintering is displayed as the generation probability of each type of a sintering method used for the sintering. In addition, for each of one or more known materials related to the target material, the composition formula and attribute of the known material as well as the area of part of literature that describes the sintering method of the known material are displayed. This enables, in the generation of the target material, the user to firstly grasp the generation possibility of each type of the sintering method, subsequently select a sintering method, and also set experimental conditions. In other words, even though the user is a researcher with poor knowledge and experience, they can easily select a sintering method and set experimental conditions. If the user is a researcher with good knowledge and experience, they make the use of their knowledges and experiences to select a more accurate sintering method and set experimental conditions. When the generation probability of each of plural types of sintering methods is indicated in a first image (i.e., a process-related image), for example, the user can determine that a target material can be sintered using the sintering method of a type corresponding to the highest generation probability. Unless the user owns a sintering device that can implement the sintering method of the type corresponding to the highest generation probability, for example, the user can check a generation probability corresponding to a sintering method implementable by a sintering device owned by the user. The user can determine to attempt the sintering of the target material even with the use of the sintering method of a type corresponding to the lowest generation probability if the generation probability is, for example, at least 30%. It is also possible to indicate, in the first image, the composition formula and attribute of each of one or more known materials related to the target material each having a composition formula similar to the composition formula of the target material, as the composition formula and attribute of each of the one or more known materials related to the target material, for example. The attribute may be related to sintering, synthesis, or generation of the known material. This enables the user to easily grasp what kind of sintering is performed on a known material similar to the target material. Accordingly, it is possible to more appropriately support the search of a generation process for the target material. In concept, material sintering is lower than material synthesis and material synthesis is lower than material generation. Sintering may be therefore also referred to as synthesis or generation.

The probability deriver may derive the generation probability based on the combination or composition ratio of element types included in the composition formula indicated in the first information.

This can enhance the reliability of the generation probability to be derived.

The database may indicate, for each of a plurality of materials, the composition formula, sintering method, and attribute of the material in association with each other.

With this, it is possible to appropriately perform both the obtainment of second information and the derivation of a generation probability.

The probability deriver may input a descriptor indicating the composition descriptor of the target material to a sintering predictor to derive the generation probability of each of the one or more types of sintering methods for the target material, where the sintering predictor is trained using the database to output, in response to the input of a descriptor indicating a composition formula, the generation probability of each of the one or more types of sintering methods for a material having the composition formula. The sintering predictor is, for example, a neural network.

With this, even though the composition formula of a target material is not indicated in a database, the generation probability of each of one or more types of sintering methods for an unknown target material can be derived by using a trained sintering predictor.

When the generation probability of each of N types of sintering methods is derived by the probability deriver and the sum of the generation probabilities of M types of sintering methods is at least a threshold, where N is an integer of 3 or greater, M is a predetermined integer of at least 1 and less than N, and the M types of sintering methods each have a higher generation probability than the other remaining sintering methods among the N types of sintering methods, the image generator may generate the first image indicating the generation probability of each of the M types of sintering methods and not indicating the generation probabilities of the other remaining sintering methods among the N types of sintering methods. The M types of sintering methods may be, for example, one type of sintering method.

With this, when the generation probability of one type of sintering method among a plurality of sintering methods is at least a threshold 80%, for example, only the generation probability of that one type of sintering method is displayed and the generation probabilities of the other remaining sintering methods are not displayed. Accordingly, the user can easily find a sintering method that is the most probable method for a target material. When the sum of, for example, two highest generation probabilities among the generation probabilities of three or more types of sintering methods is at least a threshold 90%, only the two highest generation probabilities are displayed and the other remaining generation probabilities are not displayed. The two highest generation probabilities are two generation probabilities higher than any other generation probability. Accordingly, a generation probability having no chance of sintering a target material can be omitted from a first image, and unnecessary provision of information for the user can be inhibited.

Each of the one or more types of sintering methods may be a different one of Ball-Milling, Solid-State, Liquid-State, Flux, and Arc-Melting.

With this, it is possible to derive and display the generation probability of each of primary five types of sintering methods used for material sintering. The names of the sintering methods that are Ball-Milling, Solid-State, Liquid-State, Flux, and Arc-Melting are examples, and the names of the sintering methods according to the present disclosure are not limited to these names. For example, Ball-Milling may be Ball-Mill.

The area of the part of the literature may be a sentence, a phrase, or a paragraph that includes the description of the sintering method.

With this, it is possible to display the area of part of literature in a narrow range or in a broad range.

The image generator may generate the second image in which a word indicating a sintering method presented as the attribute in the selected second information may be emphasized more than the other remaining words in the area of the part of the literature.

With this, since a word indicating a sintering method is displayed with emphasis, the user can easily find out the word indicating a sintering method from the area of part of literature. In addition, the user can search the vicinity of the word and easily find out a description regarding the sintering method.

The image generator may generate, for each type of the sintering method, the first image indicating the second information of each of the one or more known materials generated using the sintering method.

This enables the user to easily find out, from a first image, second information of each of one or more known materials sintered using a sintering method with the highest generation probability for a target material, for example. In other words, even when multiple second information items are displayed, the user can easily find out second information useful regarding the sintering of the target material.

The image generator may also generate (i) a map presenting the relationship of composition formulae indicated in second information items of the one or more known materials or (ii) a map presenting the relationship between a composition formula and an attribute that are indicated in the second information of each of the one or more known materials, to display the map on the display.

With this, even when multiple second information items are displayed, the user can easily find out desired second information from these second information items since the second information items are displayed on the map. As a result, the user can easily select the desired second information item and easily view a second image (i.e., a reference image) corresponding to the selected second information item.

The attribute of the known material indicated in the second information may be at least one of the following: the crystal structure of the known material; a sintering temperature for sintering the known material; a property value indicating the property degree of the known material; literature information for identifying literature that describes the known material; and an application of the known material.

This enables the user to know the attributes of a known material, and the user can therefore easily predict, for instance, the sintering conditions of a target material based on the attributes.

The image generator may arrange the second information of each of the one or more known materials in an order according to the composition formula or the attribute indicated in the second information, and generate the first image indicating one or more second information items arranged in the order.

With this, a plurality of second information items are arranged, for example, in a composition formula order that is an order according to a composition formula indicated in each of the plurality of second information items or in an attribute order that is an order according to an attribute indicated in each of the plurality of second information items. In the composition formula order, second information indicating the composition formula of a known material that is closer or more similar to the composition formula of a target material is arranged with higher priority, for example. When the attribute is the sintering temperature of a known material, second information indicating a higher sintering temperature is arranged with higher priority in the attribute order. This enables the user to easily find out desired second information from those second information items.

The image generator may further: specify the type of a sintering method implementable by a sintering device owned by the user; and assign mutually different weights between (i) the generation probability of the sintering method of the specified type, and (ii) the generation probabilities of the other remaining sintering methods among the generation probabilities of the one or more types of sintering methods, to update the generation probability, which is indicated in the first image, of each of the one or more sintering methods.

This can increase the generation probability of a sintering method implementable by a sintering device owned by the user and decrease the generation probability of a sintering method implementable only by a sintering method not owned by the user. Accordingly, not only a possibility for chemical sintering of a material but also a possibility for sintering that takes user's environment related to the sintering into consideration can be derived as a generation probability. As a result, it is possible to inhibit displaying a high generation probability for a sintering method implementable only by a sintering device not owned by the user, i.e., a sintering method with a low sintering possibility in terms of user's environment.

The second information obtainer may also obtain estimated information regarding the estimation of a sintering device that can perform sintering using one or more of the other remaining sintering methods excluding the sintering method of the specified type among the one or more types of sintering methods. The image generator may also display an image indicating the estimated information on the display.

This enables the user to easily request the estimation of a sintering device not owned by the user, in accordance with displayed estimated information.

The attribute indicated in the second information of each of the one or more known materials may include an estimated required time which is a time required for sintering the known material. The image generator may arrange the second information of each of the one or more known materials in an order according to the estimated required time indicated in the second information, and generate the first image indicating one or more second information items arranged in the order.

With this, since the estimated required time of each of one or more known materials is displayed, the user can predict a time required for sintering a target material, based on the estimated required times. Since the estimated required times are arranged in order and displayed, the user can easily grasp the largest value, the smallest value, or the dispersion of the estimated required time, thereby more appropriately predicting the time required for sintering a target material. If the attribute of each of the one or more known materials includes a sintering method, the user can easily determine which sintering method can reduce the time required for sintering a target material. For example, when the user attempts to use, for the sintering of a target material, a sintering method with the highest generation probability presented in the first image and the estimated required time of that sintering method is long, the user can determine to use a sintering method with the second highest generation probability for the sintering of the target material. In other words, the user can select a sintering method for the target material with consideration given to a time required for sintering.

A generation process output device outputs information regarding a generation process for a material and includes: a first information obtainer that obtains first information indicating the composition formula of a target material; a second information obtainer that obtains, from a database regarding materials, second information of each of one or more known materials related to the composition formula indicated in the first information, where the second information indicates the composition formula and attribute of the known material; a probability deriver that based on the database, derives, for each of one or more types of sintering methods, a possibility that the target material having the composition formula indicated in the first information is sintered using the sintering method, where the possibility is derived as a generation probability; and an outputter that outputs, as the information regarding the generation process, the second information of each of the one or more known materials and the generation probability of each of the one or more types of sintering methods. When one of the output second information items of the one or more known materials is selected, the second information obtainer obtains, from the database, also the area of part of literature that describes the sintering method of the known material having the composition formula indicated in the selected second information item, and the outputter outputs also information indicating the description in the area of the part of the literature.

With this, the generation process output device cannot display, for instance, information regarding a generation process directly on a display, but is capable of outputting the information to, for example, a network to cause other device connected to the network to display an image indicating the information. As a result, the same advantageous effects as produced by the generation process display device described above can be produced.

The generation process output device outputs information regarding a generation process of a material, and includes: a first information obtainer that obtains first information indicating the composition formula of a target material; a second information obtainer that obtains, from a database regarding materials, second information of each of one or more known materials related to the composition formula indicated in the first information, where the second information indicates the composition formula and attribute of the known material; a probability deriver that based on the database, derives, for each of one or more types of sintering methods, a possibility that the target material having the composition formula indicated in the first information is sintered using the sintering method, where the possibility is derived as a generation probability; and an outputter that outputs, as the information regarding the generation process, the second information of each of the one or more known materials and the generation probability of each of the one or more types of sintering methods.

With this, the generation process output device cannot display, for instance, information regarding a generation process directly on a display, but is capable of outputting the information to, for example, a network to cause other device connected to the network to display an image indicating the information. As a result, the same advantageous effects as produced by the generation process display device described above can be produced for the information regarding a generation process.

Embodiment 6

Material development for developing a mixed material generated by mixing an organic material and an inorganic material (hereinafter also referred to as an organic-inorganic mixed material) still very much rely on knowledges and experiences of researchers, as in material development for developing an inorganic material. An organic-inorganic material produces special effects by achieving both desired effects of an organic material and desired effects of an inorganic material. For the generation of an organic-inorganic material that produces such effects, it is necessary to select an appropriate generation process.

In view of this, in the present embodiment, generation parameters, each indicating a degree that each of plural types of generation processes is required for a target material generation that uses a plurality of raw materials, are derived. In generating a target material from a plurality of raw materials, the target material is also referred to as a complex material or a mixed material. In the generation of the target material, a single raw material may be used instead of a plurality of raw materials.

In each of Embodiments 1 through 5, the generation probabilities of sintering methods are derived. In the present embodiment, however, generation processes are not limited to sintering methods. In the present embodiment, generation probabilities are used as one example of generation parameters, as in each of Embodiments 1 through 5, but the generation parameters may be a ranking indicated in, for example, FIG. 8A. Such ranking relatively indicates a degree that each of plural types of generation processes is required.

In each of Embodiments 1 through 5, first information indicates the composition formula of a target material, and second information indicates: the composition formula of a known material related to the target material; and an attribute associated with the composition formula. In the present embodiment, however, first information indicates the names of one or more raw materials for generating a target material. The names are information for identifying raw materials and may be, for example, the composition formulae of the raw materials. It can be also said that the first information indicates one or more raw materials by the names of the one or more raw materials. The second information according to the present embodiment indicates: the names of one or more raw materials for generating a known material which are related to one or more raw materials of the target material (hereinafter also referred to as related raw materials); and attributes associated with the one or more related raw materials. It can be also said that the second information indicates one or more related raw materials by the names of the one or more related raw materials.

Among elements described in the present embodiment, the same elements as those in each of Embodiments 1 through 5 are assigned with like reference signs, and detailed description thereof is omitted. Among terms used in the present embodiment, identical definition and meaning are applied to the same terms as those used in each of Embodiments 1 through 5 unless otherwise specified.

[Generation Process Search System 10a]

Figure 19:
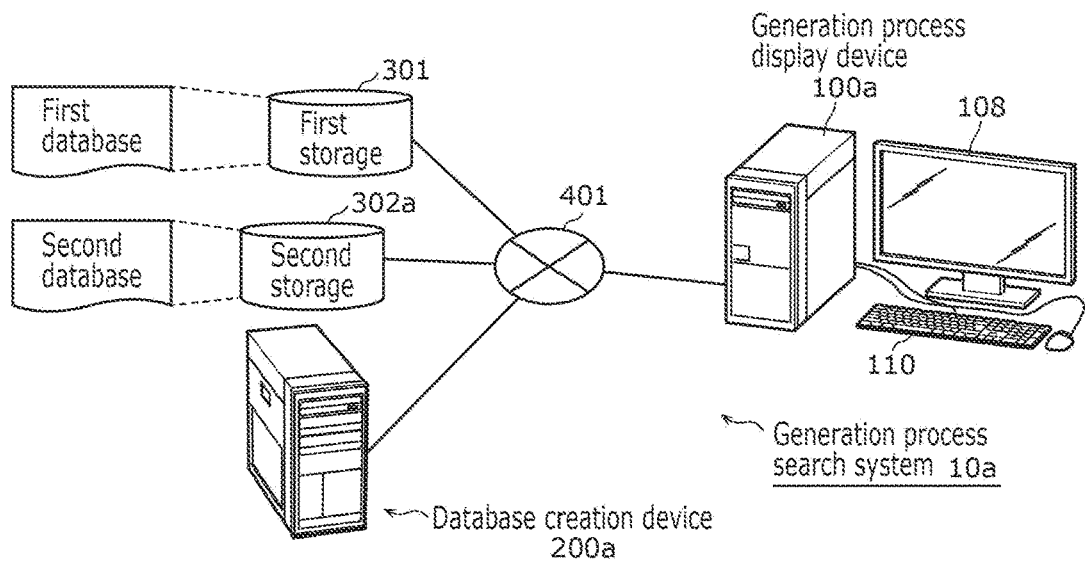
FIG. 19 is a diagram illustrating one example of the configuration of a generation process search system according to Embodiment 6.

FIG. 19 is a diagram illustrating one example of the configuration of generation process search system 10a according to the present embodiment.

Generation process search system 10a includes generation process display device 100a, display 108, input unit 109, database creation device 200a, first storage 301, and second storage 302a. Generation process display device 100a, database creation device 200a, first storage 301, and second storage 302a, for example, are connected to each other via network 401 such as the Internet.

Generation process display device 100a is configured as a computer such as a personal computer or a server and displays, on display 108, information regarding a generation process that is a process for generating a target material. Generation process display device 100a displays an image indicating the information regarding the generation process on display 108, but may output the information without displaying the image. In this case, generation process display device 100a may be referred to as a generation process output device. The image is also referred to as a first image or a process-related image.

Display 108 displays an image indicating the information regarding the generation process in accordance with a signal output from generation process display device 100a.

Input unit 110 receives an input operation from the user of generation process display device 100a, and outputs a signal in accordance with the input operation, to generation process display device 100a. In the present embodiment, display 108 and input unit 110 are configured separately, but may be configured integrally like a touch panel. In the present embodiment, generation process display device 100a neither includes display 108 nor input unit 110, but may include them.

Database creation device 200a is configured as a computer such as a personal computer or a server, and creates a second database used by generation process display device 100a. Database creation device 200a reads a first database stored in first storage 301 from first storage 301 via network 401, and creates the second database using the first database. Database creation device 200a stores the created second database into second storage 302a via network 401.

First storage 301 is a recording medium for storing a first database, as in each of Embodiments 1 through 5. Second storage 302a is a recording medium for storing a second database. The first database and the second database are each a database regarding materials. The details of the second database will be described later. These recording media are each any one of, for example, a hard disk drive, RAM, ROM, or a semiconductor memory. Such recording media may be either volatile or non-volatile.

In the example illustrated in FIG. 19, first storage 301 and second storage 302a are disposed outside database creation device 200a, but may be included in database creation device 200a. First storage 301 and second storage 302a may be directly connected to database creation device 200a without network 401 therebetween. The first database and the second database are stored in mutually different recording media, but may be stored in the same recording medium. A pair of the first database and the second database may be regarded as a single database.

Figure 20:
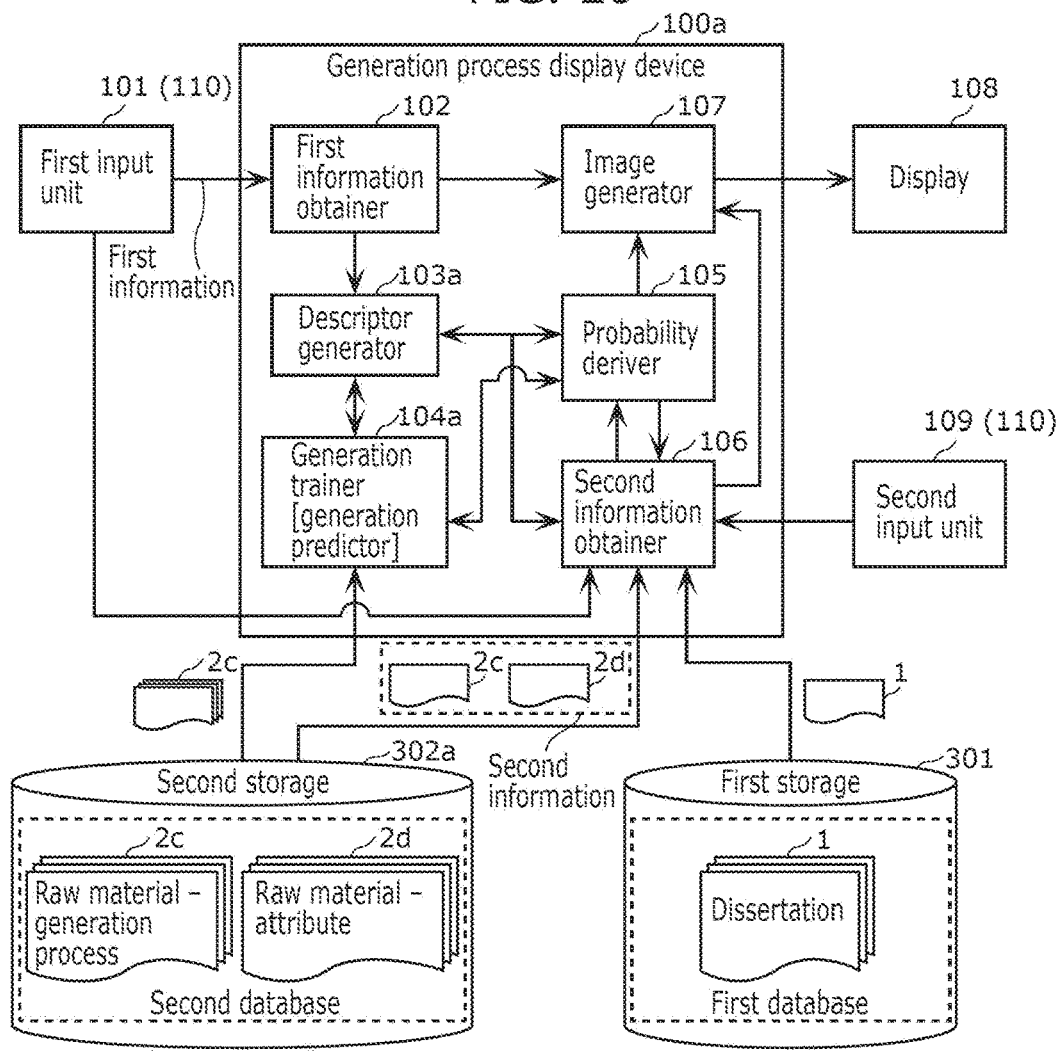
FIG. 20 is a block diagram illustrating one example of the functional configuration of a generation process display device according to Embodiment 6.

FIG. 20 is a block diagram illustrating one example of the functional configuration of generation process display device 100a according to the present embodiment.

Generation process display device 100a uses a first database stored in first storage 301 and a second database stored in second storage 302a. The first database includes a plurality of dissertation data items 1. Each of the plurality of dissertation data items 1 is associated with the material name of a primary material (i.e., a known material) described in dissertation data item 1. The material name may be the composition formula of a known material. Alternatively, the material name may be the names or composition formulae of one or more raw materials for generating a known material. The second database includes a plurality of first generation information items 2c and a plurality of second generation information items 2d. Each of the plurality of first generation information items 2c indicates, in association with each other, (i) the names of one or more raw materials for generating the known material whose material name is associated with dissertation data item 1, and (ii) the name of a generation process for generating the known material from the one or more raw materials. First generation information 2c may indicate the names of a plurality of generation processes. Each of second generation information items 2d indicates, in association with each other, (i) the names of one or more raw materials for generating the known material of a material name associated with dissertation data item 1, and (ii) the attribute of the known material described in dissertation data item 1. The attribute of the known material may be literature information of dissertation data item 1 that indicates a generation process for generating the known material from the one or more raw materials or the location of a paragraph that describes the generation of the known material in that dissertation data item 1. The attribute of the known material may be the crystal structure, property value, application, or process condition of the known material. A process condition is a condition used for the generation process of a known material and is, for instance, a temperature or a time. The attribute of the known material may include all or part of the items listed above. Thus, the second database according to the present embodiment indicates, for each of a plurality of known materials, the names, generation processes, and attributes of one or more raw materials for generating the known material, in association with each other. With this, it is possible to appropriately perform both the obtainment of second information and the derivation of a generation probability, as will be described later.

[Generation Process Display Device 100a]

Generation process display device 100a displays information regarding a material generation process. When the user inputs first information indicating the names of one or more raw materials, generation process display device 100a displays the generation probability of each type of a generation process for a target material generated using the one or more raw materials. The generation probability of each type of the generation process for the target material is a degree that each of predetermined types of generation processes is required for the generation of the target material. The generation probability is expressed, for example, in percentage. The higher the generation probability of a generation process for a target material is, the greater the degree that the generation process is required for the generation of the target material is.

Generation process display device 100a is connected to display 108, and first input unit 101 and second input unit 109 included in input unit 110. Generation process display device 100a includes first information obtainer 102, descriptor generator 103a, generation trainer 104a, probability deriver 105, second information obtainer 106, and image generator 107. In the present embodiment, generation process display device 100a includes none of first input unit 101, second input unit 109, and display 108, but may include at least one of them.

[First Input Unit 101]

First input unit 101 is a functional element included in input unit 110. Upon receiving an input operation from the user, first input unit 101 outputs, to first information obtainer 102, a signal that indicates the names of one or more raw materials and is in accordance with the input operation, for example.

[First Information Obtainer 102]

First information obtainer 102 receives a signal from first input unit 101. In other words, first information obtainer 102 obtains first information that is a signal indicating the names of one or more raw materials. First information obtainer 102 outputs the first information to descriptor generator 103a and image generator 107.

[Descriptor Generator 103a]

Descriptor generator 103a obtains first information from first information obtainer 102, and generates a descriptor corresponding to each of the names of one or more raw materials indicated in the first information. The descriptor is, for example, a vector uniquely indicating a raw material. The descriptor may be same as a descriptor generated by composition descriptor generator 103 according to each of Embodiments 1 through 5.

When a raw material is an organic molecular material such as a resin, descriptor generator 103a may generate the descriptor of the organic molecular material as described below. In other words, descriptor generator 103a obtains first information from first information obtainer 102 and generates a descriptor corresponding to the organic molecular material indicated in the first information. The descriptor is, for example, a vector uniquely indicating an organic molecular material. Specifically, descriptor generator 103a uses, as a descriptor, a parameter indicating the number of hetero atoms or the number of amid bonds in the organic molecular material, i.e., a parameter calculated using, for instance, the component elements and structure of the organic molecular material. In order to generate such a descriptor of the organic molecular material, descriptor generator 103a firstly describes the character string of the organic molecule material. For the description of the character string, a description method named a simplified molecular input line entry system (SMILES) is used, for example. SMILES presents the two-dimensional structure of an organic molecule in the form of a character string, and polyvinyl alcohol (i.e., PVA) is described as C(=C)O, for example. Descriptor generator 103a subsequently quantifies this character string to generate a numerical vector composed by arranging numerical values such as the number of hetero atoms and the number of amid bonds in the organic molecular material. The numerical vector is a descriptor used for input in machine learning. A public program such as RDkit or mordred is used for the generation of the numerical vector. When the number of types of candidates for the organic molecular material indicated in the first information is less, the descriptor of the organic molecular material may be generated as One Hot Vector. When the number of candidates for the organic molecular material is only two, i.e., polyvinyl alcohol and cellulose, a vector [0, 1] is generated as the descriptor of the polyvinyl alcohol and a vector [1, 0] may be generated as the descriptor of the cellulose. Descriptor generator 103a outputs these descriptors to probability deriver 105 and second information obtainer 106.

[Generation Trainer 104a]

Generation trainer 104a conducts training about the relationship between one or more raw materials and generation processes with reference to a second database in second storage 302a to create a generation predictor indicating the relationship. Generation trainer 104a uses, as training data, a plurality of first generation information items 2c included in the second database, for example. Each of the plurality of first generation information items 2c indicates, in association with each other, the names of one or more raw materials and the name of a generation process for generating a known material from the one or more raw materials. Generation trainer 104a outputs the names of the one or more raw materials indicated in first generation information 2c to descriptor generator 103a, and obtains, from descriptor generator 103a, a descriptor corresponding to each of the names of the one or more raw materials. Generation trainer 104a then conducts, for each of the plurality of first generation information items 2c, training that uses, as training data, one or more descriptors corresponding to the names of the one or more raw materials indicated in first generation information 2c and the name of the generation process indicated in first generation information 2c. With this, generation trainer 104a creates a generation predictor that outputs, in response to the input of the descriptors of one or more raw materials, the generation probability of each of plural types of generation processes for generating a material from the one or more raw materials. The generation probability of each of the plural types of generation processes indicates a degree that the generation process is required for a target material generation that uses one or more raw materials corresponding to the one or more descriptors that have been input.

The plural types of generation processes are, for example, seven types of generation processes, and include agitation, mixing, ultrasonic processing, freezing, melting, freeze drying, and impurity removal. The plural types of generation processes are not limited to these examples.

Upon obtaining, from probability deriver 105, one or more descriptors corresponding to one or more raw materials for generating a target material, generation trainer 104a inputs the one or more descriptors to a generation predictor to obtain, from the generation predictor, the generation probability of each of the plural types of generation processes for the target material. Generation trainer 104a then outputs these generation probabilities to probability deriver 105.

When update of a plurality of first generation information items 2c included in the second database is performed, generation trainer 104a may conduct retraining of the generation predictor based on the difference between first generation information items 2c after the update and first generation information items 2c before the update.

[Probability Deriver 105]

Probability deriver 105 obtains, from descriptor generator 103a, one or more descriptors corresponding to one or more raw materials for generating a target material, and derives, as a generation probability, a degree that each of plural types of generation processes is required for the generation of the target material. The generation predictor of generation trainer 104a is used for the derivation of the generation probability. In other words, based on a second database in second storage 302a, probability deriver 105 derives, for each of the plural types of generation processes, a degree that the generation process is required for the target material generation that uses one or more raw materials indicated in first information. Probability deriver 105 derives the degree as a generation probability.

Specifically, probability deriver 105 inputs one or more descriptors obtained from descriptor generator 103a to the generation predictor of generation trainer 104a. Probability deriver 105 then obtains, from the generation predictor, the generation probability of each of the plural types of generation processes output from the generation predictor. Probability deriver 105 outputs the generation probability of each of the plural types of generation processes to second information obtainer 106 and image generator 107.

[Second Information Obtainer 106]

Second information obtainer 106 obtains the descriptor of each of one or more raw materials for generating a target material from descriptor generator 103a. Subsequently, based on the obtained one or more descriptors, second information obtainer 106 obtains, from a second database in second storage 302a, one or more second information items necessary for image generation. Second information obtainer 106 then outputs the one or more second information items to image generator 107. With this, an image (i.e., a process-related image) indicating the one or more second information items is generated and then displayed by image generator 107.

Second information obtained by second information obtainer 106 indicates the names of one or more related raw materials related to one or more raw materials indicated in first information and the attributes of a known material generated from the one or more related raw materials. The attributes are, for instance, literature information and the location of a paragraph. For example, second information obtainer 106 obtains first generation information item 2c and second generation information item 2d indicating one or more related raw materials, among a plurality of first generation information items 2c and a plurality of second generation information items 2d included in the second database, to obtain the second information. A generation process indicated in first generation information 2c in the obtained second information may be regarded as an attribute of the known material.

When any one of one or more second information items is selected through a user's input operation to second input unit 109, second information obtainer 106 may obtain, from the first database, a paragraph of dissertation data 1 which corresponds to the selected second information item, and output the paragraph to image generator 107.

[Image Generator 107]

Image generator 107 obtains first information from first information obtainer 102 and generates an image indicating the first information. In addition, image generator 107 generates an image indicating generation probabilities obtained from probability deriver 105. In other words, image generator 107 generates an image indicating the generation probability of each of seven types of generation processes for generating a target material from one or more raw materials indicated in the first information. Image generator 107 also obtains one or more second information items from second information obtainer 106 and generates an image indicating these second information items. Each of the generated images is, for example, included in a process-related image and displayed on display 108.

Image generator 107 thus generates, as a process-related image indicating information regarding a generation process, an image indicating one or more second information items and the generation probability of each of plural types of generation processes, and displays the image on display 108. When the area of part of literature is obtained by second information obtainer 106, image generator 107 may generate, as a reference image, an image indicating the description in the area of the part of the literature and display the image on display 108, as described above. A reference image is also referred to as a second image. The area of the part of the literature is, for example, a paragraph, as described above. It can be also said that this image generator 107 is an outputter that outputs information regarding a generation process.

Figure 21:
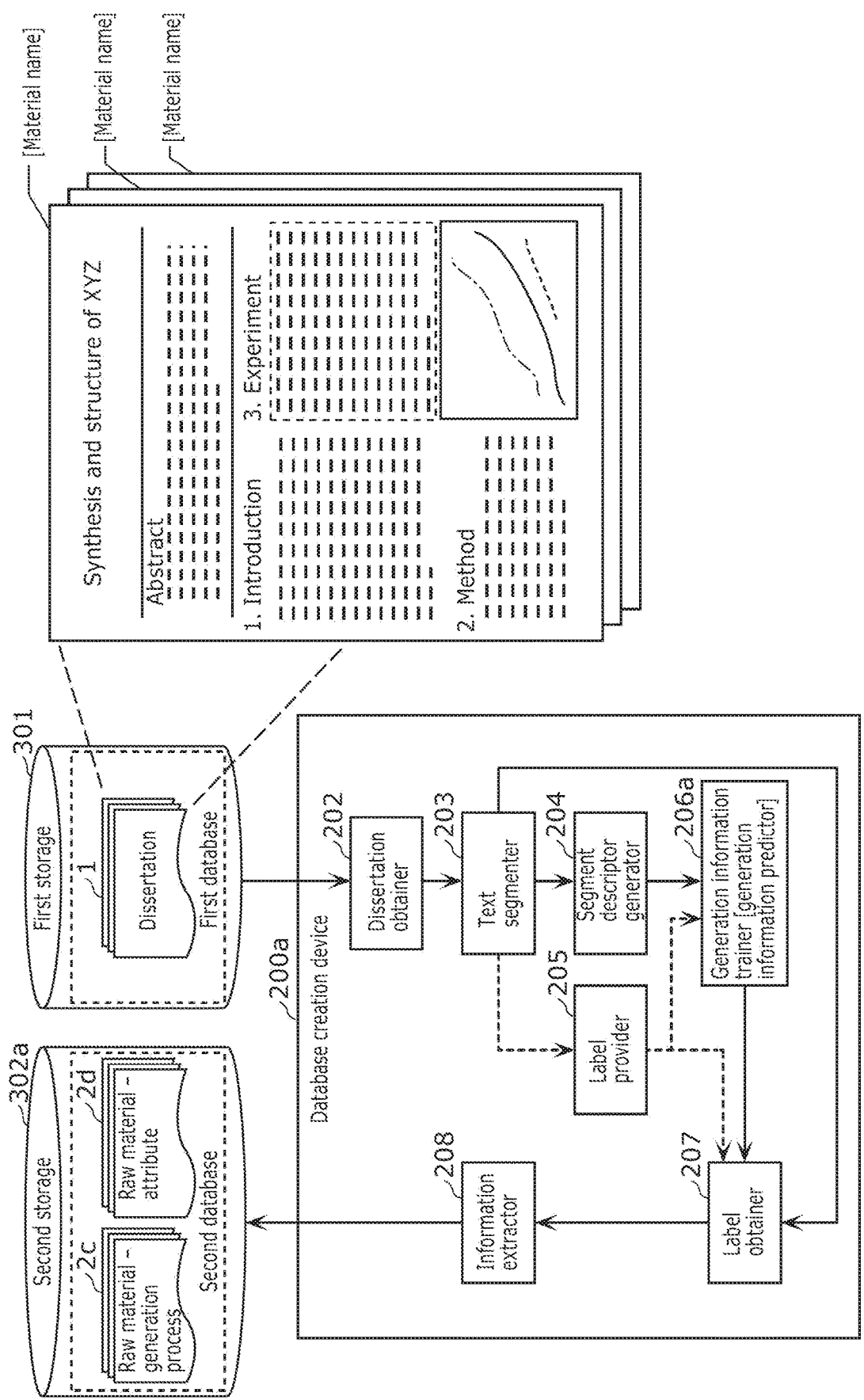
FIG. 21 is a block diagram illustrating one example of the functional configuration of a database creation device according to Embodiment 6.

FIG. 21 is a block diagram illustrating one example of the functional configuration of database creation device 200a according to the present embodiment.

[Database Creation Device 200a]

Database creation device 200a analyzes information in each of dissertation data items 1 from a first database collected in advance, and creates a second database including first generation information 2c that indicates, in association with each other, (i) the names of one or more raw materials and (ii) a generation process corresponding to the one or more raw materials. The second database includes also second generation information 2d as described above. Information in the created second database is obtained by second information obtainer 106 and used by generation trainer 104a in generation process display device 100a.

Specifically, first, database creation device 200a specifies, for dissertation data 1 associated with a material name in advance, a paragraph, among all of the paragraphs of dissertation data 1, which describes information regarding the generation of a known material corresponding to the material name, which uses one or more raw materials. Database creation device 200a then obtains the name of a generation process and the names of the one or more raw materials in the specified paragraph, and associates the name of the generation process and the names of the one or more raw materials to generate first generation information 2c and add first generation information 2c to the second database. When the names of one or more raw materials are associated with dissertation data 1 as material names, database creation device 200a may generate first generation information 2c using the names of the one or more raw materials associated with dissertation data item 1. In other words, database creation device 200a obtains the name of the generation process in the specified paragraph, and associates the name of the generation process with the names of the one or more raw materials associated with dissertation data 1 to generate first generation information 2c.

In order to specify a paragraph that describes information regarding the generation of a known material among all of paragraphs, database creation device 200a uses a generation information predictor that has been trained in advance. Database creation device 200a also analyses dissertation data 1 to extract information to be used by image generator 107. For example, database creation device 200a detects and extracts a paragraph that describes a generation process from dissertation data 1.

Such database creation device 200a includes dissertation obtainer 202, text segmenter 203, segment descriptor generator 204, label provider 205, generation information trainer 206a, label obtainer 207, and information extractor 208. Dissertation obtainer 202, text segmenter 203, and segment descriptor generator 204 perform the same processing as that described in each of Embodiments 1 through 5.

[Label Provider 205]

Label provider 205 provides a label for a paragraph obtained from text segmenter 203, in response to an input operation by the user of database creation device 200a. The label indicates whether or not information regarding the generation of a material is included in the paragraph. In the generation of the material, the material is generated from one or more raw materials. Label provider 205 then outputs the label provided for the paragraph to generation information trainer 206a and label obtainer 207.

[Generation Information Trainer 206a]

Generation information trainer 206a obtains, from segment descriptor generator 204, a segment descriptor corresponding to each of a plurality of paragraphs, and obtains a label provided for each of the plurality of paragraphs from label provider 205. Generation information trainer 206a then conducts training regarding the relationship between the segment descriptor corresponding to each of the plurality of paragraphs and the label provided for the paragraph, to create a generation information predictor that indicates the relationship. Clustering, for example, is used for such a prediction means, as in each of Embodiments 1 through 5. The generation information predictor outputs, in response to the input of a segment descriptor, a label indicating whether information regarding material generation is included in the paragraph corresponding to the segment descriptor.

After the generation information predictor is created, generation information trainer 206a obtains a segment descriptor from segment descriptor generator 204 without obtaining a label from label provider 205. Upon obtaining the segment descriptor, generation information trainer 206a inputs the segment descriptor to the generation information predictor to obtain a label corresponding to the segment descriptor from the generation information predictor. Generation information trainer 206a outputs the label obtained from the generation information predictor to label obtainer 207.

[Label Obtainer 207]

Label obtainer 207 obtains a paragraph from text segmenter 203 and obtains a label corresponding to the paragraph from label provider 205 or generation information trainer 206a. Before a generation information predictor is created, i.e., before the generation information predictor is trained, label obtainer 207 obtains the label from label provider 205. After a generation information predictor is created, i.e., after the generation information predictor is trained, label obtainer 207 obtains the label from generation information trainer 206a. Label obtainer 207 assigns, to a paragraph obtained from text segmenter 203, a label corresponding to the paragraph and obtained from label provider 205 or generation information trainer 206a. Label obtainer 207 then outputs the paragraph assigned with the label to information extractor 208.

[Information Extractor 208]

Information extractor 208 obtains, from label obtainer 207, a paragraph assigned with a label indicating that information regarding material generation is included. Information extractor 208 then extracts the information from the paragraph assigned with the label. The information is related to a material generation process and indicates at least one of the name of a generation process, the names of one or more raw materials, the composition formulae, crystal structures, property values, or process conditions of one or more raw materials, for example. For example, information extractor 208 searches a character string indicating the name of a generation process in the paragraph to extract the name of the generation process from the paragraph. Information extractor 208 also searches a character string indicating the name of a raw material in the paragraph to extract the name of the raw material from the paragraph.

Information extractor 208 also searches the unit of a temperature used in a generation process as well as a numerical value placed before that unit in the paragraph, to extract a process condition indicating the temperature from the paragraph. Information extractor 208 also searches a character string indicating a crystal structure in the paragraph to extract information indicating the crystal structure from the paragraph. Information extractor 208 also searches the unit of a property value as well as a numerical value placed before that unit in the paragraph, to extract information indicating the property value from the paragraph.

Information extractor 208 associates the extracted generation process name with the extracted one or more raw material names. With this, information extractor 208 generates first generation information 2c indicating, in association with each other, one or more raw materials and a generation process for generating a known material. Information extractor 208 also associates attributes of the known material that exclude a generation process with the names of the one or more raw materials. With this, information extractor 208 generates second generation information 2d indicating, in association with each other, one or more raw materials and attributes of a known material.

FIG. 22A and FIG. 22B are each a diagram illustrating one example of information indicated in a second database. In the example illustrated in FIG. 22A or FIG. 22B, in the second database, a plurality of first generation information items 2c and a plurality of second generation information items 2d are indicated together in the form of a table. The second database illustrated in FIG. 22A indicates the names of a magnetic material and the names of a resin as the names of two raw materials. The names of a magnetic material are, for instance, "magnetic nanocomposite" and "$Fe_3O_4$". A number indicating a composition ratio in a composition formula may be indicated as a subscript or a normal character that is not a subscript. When a magnetic material is "magnetic nanocomposite" composed by "$Fe_3O_4$", both of "magnetic nanocomposite" and "$Fe_3O_4$" may be present in a name as in "magnetic nanocomposite ($Fe_3O_4$)". The names of a resin are, for instance, "PVA" and "cellulose". The second database illustrated in FIG. 22B indicates, as attributes of a known material, a material application and a literature name that is the name of dissertation data 1. The second database also indicates, as attributes of a known material, the names of generation processes such as ultrasonic processing, freeze drying, and an impurity removal, and the names of process conditions such as a resin mixing temperature, a resin mixing time, the agitation speed of a magnetic material, and a melting time.

(Overall Processing of Generation Process Search System 10a)

Figure 23:
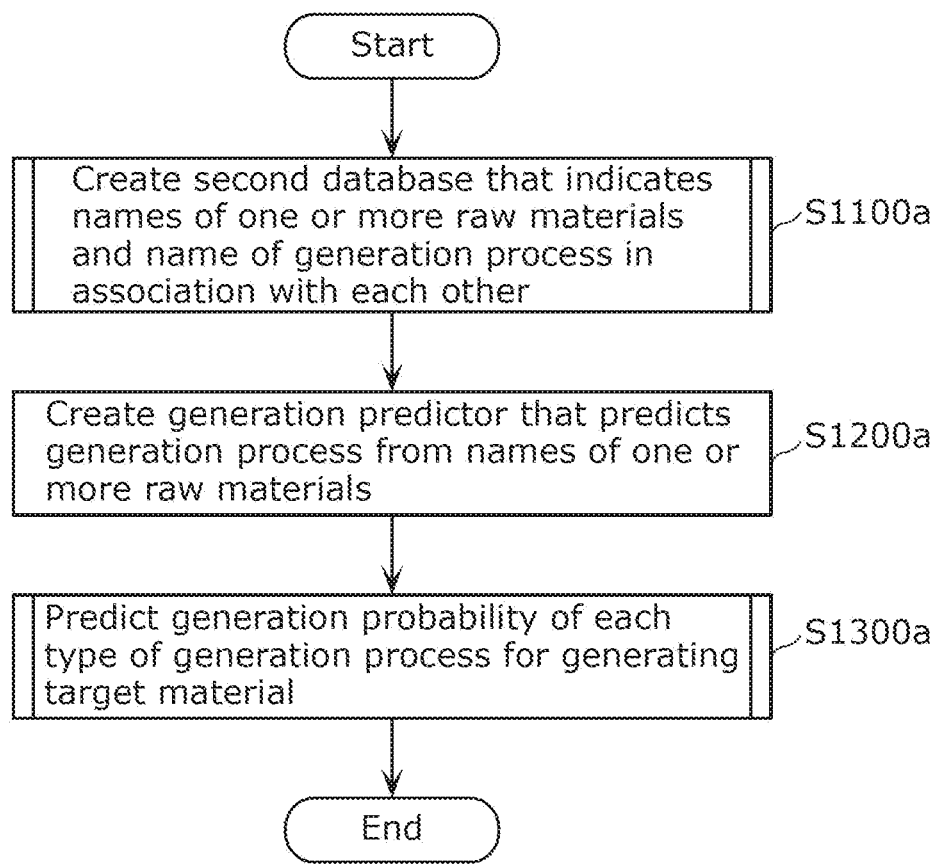
FIG. 23 is a flowchart illustrating one example of the overall flow of processing performed by the generation process search system according to Embodiment 6.

FIG. 23 is a flowchart illustrating one example of the overall flow of processing performed by generation process search system according to the present embodiment.

(Step S1100a)

Database creation device 200a creates a second database including: first generation information item 2c indicating the names of one or more raw materials and the name of a generation process in association with each other; and second generation information item 2d.

(Step S1200a)

Generation process display device 100a conducts training that uses first generation information 2c to create a generation predictor that predicts a generation process from the names of one or more raw materials. A fully-connected NeuralNetwork, for example, is used for the model of the generation predictor.

(Step S1300a)

Using the generation predictor, generation process display device 100a derives the generation probability of each type of a generation process for generating a target material from one or more raw materials. In other words, generation process display device 100a predicts, for each of plural types of generation processes, a generation probability indicating a degree that the generation process is required for the target material generation that uses the one or more raw materials.

(Processing of Database Creation Device 200a)

Figure 24:
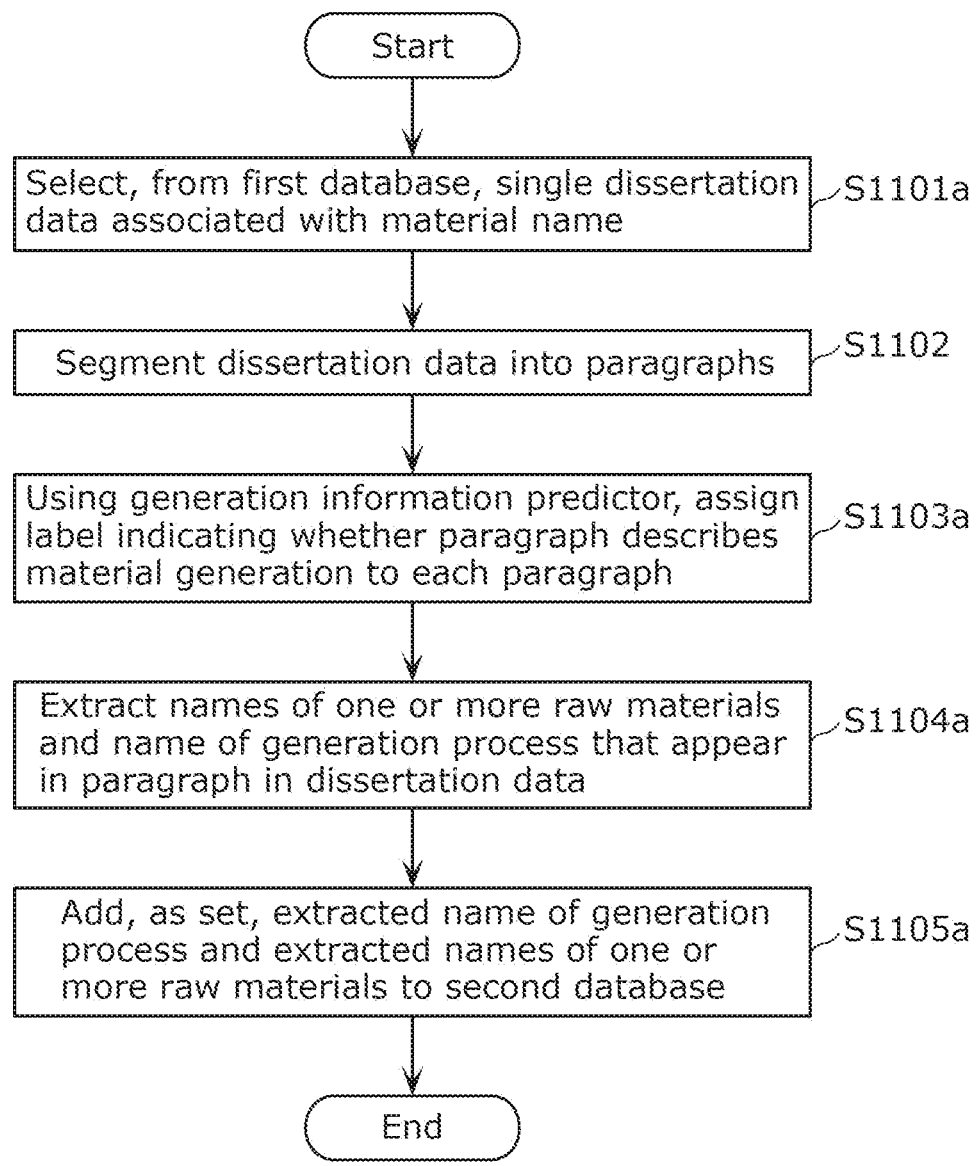
FIG. 24 is a flowchart illustrating one example of the overall flow of processing performed by the database creation device according to Embodiment 6.

FIG. 24 is a flowchart illustrating one example of the overall flow of processing performed by database creation device 200a according to the present embodiment. In other words, FIG. 24 is a flowchart illustrating the detailed flow of processes in step S1100a in FIG. 23.

In the present embodiment, the material name of a magnetic resin material which is a composite material composed of a magnetic material (magnetic powders to be specific) and a resin is associated with each of a plurality of dissertation data items 1 stored in first storage 301. Dissertation data 1 is associated with a material name by manually checking the material name of a material mainly discussed in that dissertation data 1 to associate the material name with dissertation data 1. The method of associating a material name with dissertation data 1, however, is not limited to this, and a material name may be checked automatically. A magnetic resin material may be referred to as a magnetic resin mixed material, a magnetic powder resin material, or a magnetic powder resin mixed material.

(Step S1101a)

Dissertation obtainer 202 obtains single dissertation data 1 to be processed from a first database including a plurality of dissertation data items 1 that have already been published, and outputs obtained dissertation data 1 to text segmenter 203. In other words, dissertation data 1 associated with a material name in advance is selected.

(Step S1102)

Text segmenter 203 segments dissertation data 1 obtained from dissertation obtainer 202 into paragraphs to obtain dissertation data 1. Text segmenter 203 outputs each of the obtained paragraphs to label obtainer 207, segment descriptor generator 204, and label provider 205.

(Step S1103a)

Upon obtaining a paragraph from text segmenter 203, segment descriptor generator 204 generates a segment descriptor corresponding to the paragraph. After the creation of a generation information predictor, generation information trainer 206a inputs the segment descriptor to the generation information predictor to obtain a label indicating whether information regarding the generation of a material corresponding to the material name is included in the paragraph corresponding to the segment descriptor. Generation information trainer 206a then outputs the label to label obtainer 207. Before the creation of a generation information predictor, label provider 205 outputs the label to label obtainer 207 in response to an input operation by the user of database creation device 200a. Label obtainer 207 obtains the label output from generation information trainer 206a or label provider 205, i.e., the label indicating whether the paragraph describes material generation, and assigns the obtained label to the paragraph. Label obtainer 207 then outputs the paragraph assigned with the label to information extractor 208.

(Step S1104a)

Information extractor 208 extracts information indicating, for instance, the names of one or more raw materials and the name of a generation process from a paragraph that describes material generation, i.e., a paragraph that includes information regarding material generation among the paragraphs obtained from label obtainer 207. A plurality of names of raw materials and a plurality of names of generation processes, for instance, are registered in advance in information extractor 208. In step S1104a, information extractor 208 determines whether the name of a registered generation process is present in the paragraph that describes material generation. When determining that the name of the registered generation process is present, information extractor 208 extracts the name of the generation process. When determining that the names of a plurality of generation processes are present, information extractor 208 extracts the names of all of the generation processes. Information extractor 208 extracts also the names of one or more raw materials as well as the names of the generation processes. When a known material is a magnetic resin material, the names of one or more raw materials to be used for the generation of the known material includes both the name of a magnetic material and the name of a resin.

Information extracted by information extractor 208 includes not only the name of a generation process and the names of one or more raw materials, but also the attributes of a known material that are included in dissertation data 1 obtained in step S1101*a*. The attributes are, for example, the literature information of dissertation data 1, the location of a paragraph that describes the name of the generation process, or the crystal structure, process condition, property value, application, etc. of the known material described in the paragraph.

(Step S1105*a*)

Information extractor 208 also associates the name of the generation process with the names of one or more raw materials, both of which are extracted in step S1104*a*, to add these names to a second database. In other words, first generation information 2*c* is generated and added to the second database. Information extractor 208 also associates attributes other than the generation process extracted in step S1104*a* with the names of one or more raw materials to add the attributes and the names to the second database. In other words, second generation information 2*d* is generated and added to the second database.

(Display Examples)

Figure 25:
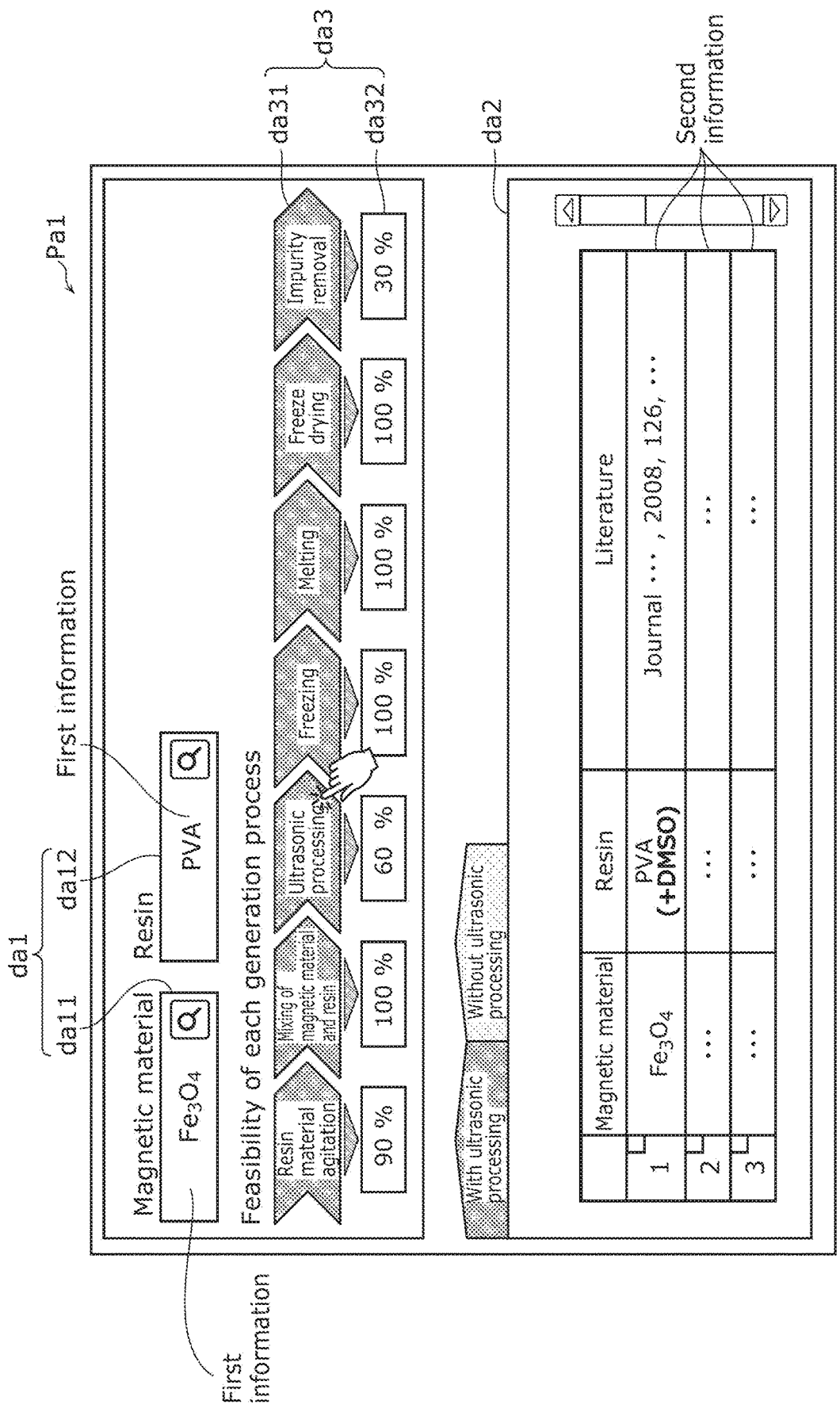
FIG. 25 is a diagram illustrating an example of a process-related image according to Embodiment 6.

FIG. 25 is a diagram illustrating one example of a process-related image according to the present embodiment. As illustrated in FIG. 25, image generator 107 generates process-related image Pa1 and outputs process-related image Pa1 to display 108. This process-related image Pa1 includes raw material area da1, known material area da2, and generation possibility area da3. In raw material area da1, the names of one or more raw materials for generating a target material, which are indicated in first information obtained by first information obtainer 102, are displayed. In the present embodiment, raw material area da1 includes first raw material area da11 and second raw material area da12. The name of a magnetic material that is a raw material is displayed in first raw material area da11, and the name of a resin that is a raw material is displayed in second raw material area da12. In known material area da2, one or more second information items obtained by second information obtainer 106 are displayed. In generation possibility area da3, a generation probability derived by probability deriver 105, i.e., the generation probability of each of plural types of generation processes for generating a target material using one or more raw materials is displayed. In other words, the names of one or more raw materials for generating a target material, which are input by the user, and the generation probability of each type of a generation process for generating the target material are displayed in process-related image Pa1.

More specifically, the name "$Fe_3O_4$" of a magnetic material and the name "PVA" of a resin are displayed as examples in first raw material area da11 and second raw material area da12 in raw material area da1. These names are input by the user. A magnetic material is used as magnetic powders. From raw materials of these names, a composite material of magnetic powders and a resin is generated as a target material. The name of a raw material may be a composition formula such as "$Fe_3O_4$", a registered trademark such as "LAPONITE", or a chemical product name such as "magnetite". The name of a raw material may be an abbreviation such as "PVA" (or "PVAL" or "PVOH"), an abbreviated name such as "POVAL", or a chemical product name such as "polyvinyl alcohol".

In generation possibility area da3, the generation probability of each type of a generation process for generating, from the magnetic material "$Fe_3O_4$" and the resin "PVA", a composite material that is a target material is displayed. The generation probability is one example of the generation parameter described above, and indicates a degree that the generation process is required for the generation of the target material. Accordingly, a generation probability or a generation parameter may be also referred to as a generation possibility that is a possibility that the generation is performed or feasibility that the generation is feasible.

Generation possibility area da3 includes objects da31 each indicating the name of a different one of plural types of generation processes, and probability boxes da32 for displaying the generation probabilities of the generation processes whose names are indicated by objects da31. The types of the generation processes according to the present embodiment are seven types that are resin material agitation, mixing of magnetic material and resin, ultrasonic processing, freezing, melting, freeze drying, and impurity removal, but the present disclosure is not limited to these. The types of generation processes to be displayed are based on first generation information 2*c*. For example, in probability box da32 corresponding to object da31 indicating ultrasonic processing in generation possibility area da3, a probability "60%" indicating a probability that ultrasonic processing is required for the generation of a composite material is displayed as a generation probability. These objects da31 are displayed in a manner selectable by the user. In other words, the user can select any one of objects da31 through an input operation to input unit 110. Stated differently, the user can select a desired object da31, i.e., a desired generation process.

A sub area with a tab related to the generation process selected by the user is displayed as one example in known material area da2. Known material area da2 includes, for example, two sub areas each with a tab. Information about one or more related raw materials used for the generation of a known material on which the generation process selected by the user is performed is displayed as second information in one of the two sub areas. Information about one or more related raw materials used for the generation of a known material on which the generation process selected by the user is not performed is displayed as second information in the other of the two sub areas. The second information indicates, for example, the names of two related raw materials and the literature information of dissertation data 1 that describes a known material generation process that uses these related raw materials. The display of one of the two sub areas and the display of the other of the two sub areas are switched by the user's selection between these tabs. A single second information item or a plurality of second information items may be displayed in a sub area. In other words, information regarding the generation of each of one or more known materials is displayed as second information in a sub area.

Image generator 107 according to the present embodiment thus generates, for each type of a generation process, process-related image Pa1 indicating second information regarding each of one or more known materials generated by performing the generation process. This enables the user to easily find out, in process-related image Pa1, second information of each of the one or more known materials generated using the same generation process as the generation process required for a target material generation that uses two raw materials, for example. Alternatively, image generator 107 according to the present embodiment generates, for each type of a generation process, second information regarding each of one or more known materials generated without performing the generation process. This enables the user to easily find out, in process-related image Pa1, second information of each of the one or more known materials generated without using a generation process that is not required for the target material generation that uses two raw materials, for example.

In the example in FIG. 25, a sub area with the tab "with ultrasonic processing" is firstly displayed out of two tabs for ultrasonic processing that is a generation process type. The tab "with ultrasonic processing" is a tab related to a generation that uses the generation process "ultrasonic processing" selected by the user among the seven types of generation processes. In other words, image generator 107 outputs, to display 108, first, the sub area with the tab related to the generation that uses the generation process selected by the user. In the example in FIG. 25, the generation probability of the generation process "ultrasonic processing" selected by the user is 60%. Thus, when the generation probability is at least 50%, image generator 107 may display, first, the sub area with the tab related to the generation that uses the generation process "ultrasonic processing" selected by the user. When the generation probability is less than 50%, image generator 107 may display, first, a sub area with a tab related to a generation that does not use the generation process "ultrasonic processing" selected by the user. In other words, the sub area with the tab "without ultrasonic processing" may be displayed first.

Image generator 107 may display, side by side on display 108, also the sub area with the tab related to the generation that uses the generation process selected by the user and the sub area with the tab related to the generation that does not use the generation process selected by the user. This enables the user to visually easily grasp known information regarding a generation that uses a selected generation process and a generation that does not use the selected generation process.

In known material area da2, information regarding one or more related raw materials is displayed as second information. A combination of one or more related raw materials is also referred to as a related raw material combination, and a combination of one or more raw materials indicated in first information is hereinafter also referred to as a raw material combination. A related raw material combination is a set of materials similar to materials in a raw material combination, and is a combination of one or more materials close to the materials in the raw material combination in terms of distance between vectors. In other words, a related raw material combination is a set of materials each having a descriptor close to the descriptor of the raw material combination. When a plurality of second information items are displayed in known material area da2, a line including the names of one or more related raw materials indicated in each of the plurality of second information items are displayed in a predetermined order in known material area da2. In the example in FIG. 25, the line includes, for instance, the name "$Fe_3O_4$" of a magnetic material and the name "PVA (+DMSO)" of a resin. The predetermined order is the ascending order of the aforementioned distance between vectors. In the example in FIG. 25, the vector of a related raw material combination of the magnetic material "$Fe_3O_4$" and the resin "PVA (+DMSO)" is the closest to the vector of a raw material combination of the magnetic material "$Fe_3O_4$" and the resin "PVA". In other words, a composite vector obtained from the vector of the magnetic material "$Fe_3O_4$" and the vector of the resin "PVA (+DMSO)" is the closest to a composite vector obtained from the vector of the magnetic material "$Fe_3O_4$" and the vector of the resin "PVA" whose names are indicated in first information. Accordingly, the lines including, for instance, the name "$Fe_3O_4$" of a magnetic material and the name "PVA (+DMSO)" of a resin are displayed at the top. The order of such line including the names of one or more related raw materials may be, for example, determined by second information obtainer 106 and notified to image generator 107. The second information of a related raw material combination having a distance between vectors that is at most a threshold is displayed in known material area da2. Alternatively, the second information of each of a predetermined number of related raw material combinations may be displayed in the ascending order of the aforementioned distance between vectors.

Image generator 107 according to the present embodiment thus arranges second information of each of one or more related raw material combinations in an order according to the vectors or descriptors of the one or more related raw material combinations, and generates process-related image Pa1 indicating one or more second information items arranged in the order. For example, second information indicating a related raw material combination same as or similar to a raw material combination for generating a target material is arranged with higher priority. This enables the user to easily find out desired second information from those second information items.

In the example in FIG. 25, two related raw materials displayed in known material area da2 are same as two raw materials for generating a target material, respectively. In other words, the magnetic material "$Fe_3O_4$" and the resin "PVA (+DMSO)" that are two related raw materials are same as the magnetic material "$Fe_3O_4$" and the resin "PVA" that are two raw materials indicated in first information. It is also indicated in known material area da2 that the generation process "ultrasonic processing" selected by the user is used for a known material generation that uses the two related raw materials. A part of the name of a related raw material indicated in second information, which is different from the name of a raw material indicated in first information, may be displayed with more emphasis than a part of the name of the related raw material indicated in the second information, which is same as the name of the raw material indicated in the first information. The different part may be emphasized, for example, in bold. In the example in FIG. 25, "DMSO" indicated as the solvent of the resin "PVA" is emphasized in bold.

The attribute of a known material in the second information displayed in known material area da1 includes, for example, literature information of dissertation data 1 that is the source of the known material. The literature information is obtained from second generation information 2d in a second database. Alternatively, the literature information may be obtained from a different database via network 401 such as the Internet.

Figure 26:
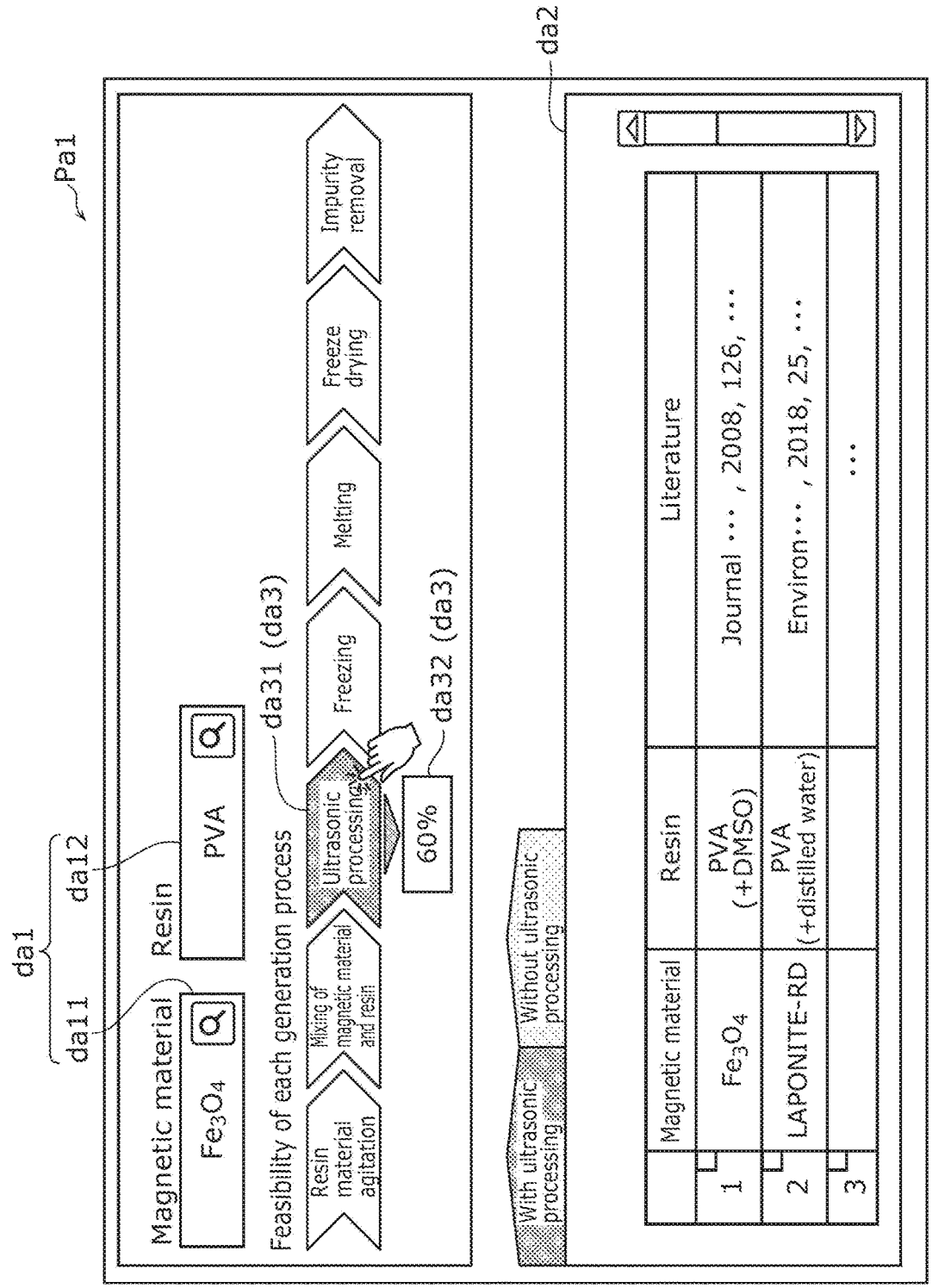
FIG. 26 is a diagram illustrating another example of the process-related image according to Embodiment 6.

FIG. 26 is a diagram illustrating another example of process-related image Pa1 according to the present embodiment.

The generation probability of each of the seven types of generation processes is displayed in process-related image Pa1 illustrated in FIG. 25. In process-related image Pa1 in FIG. 26, however, only the generation probability of the generation process of the type selected by the user among the seven types of generation processes is displayed. In other words, probability box da32 is not displayed for each of seven objects da31 indicating the names of the generation processes, and only probability box da32 corresponding to object da31 selected by the user is displayed. In that probability box da32, the generation probability of the generation process whose name is indicated in object da31 selected by the user is displayed. For example, the generation probability "60%" of the generation process "ultrasonic processing" is displayed in probability box da32.

This enables the user to focus only on the generation probability of a specific generation process that the user desires to study about whether or not the specific generation process is necessary for generating a target material. Accordingly, it is possible to display only the generation probability of the generation process that the user desires to study, thereby optimally supporting material development.

(Overall Processing of Generation Process Display Device 100a According to Embodiment 6)

Figure 27:
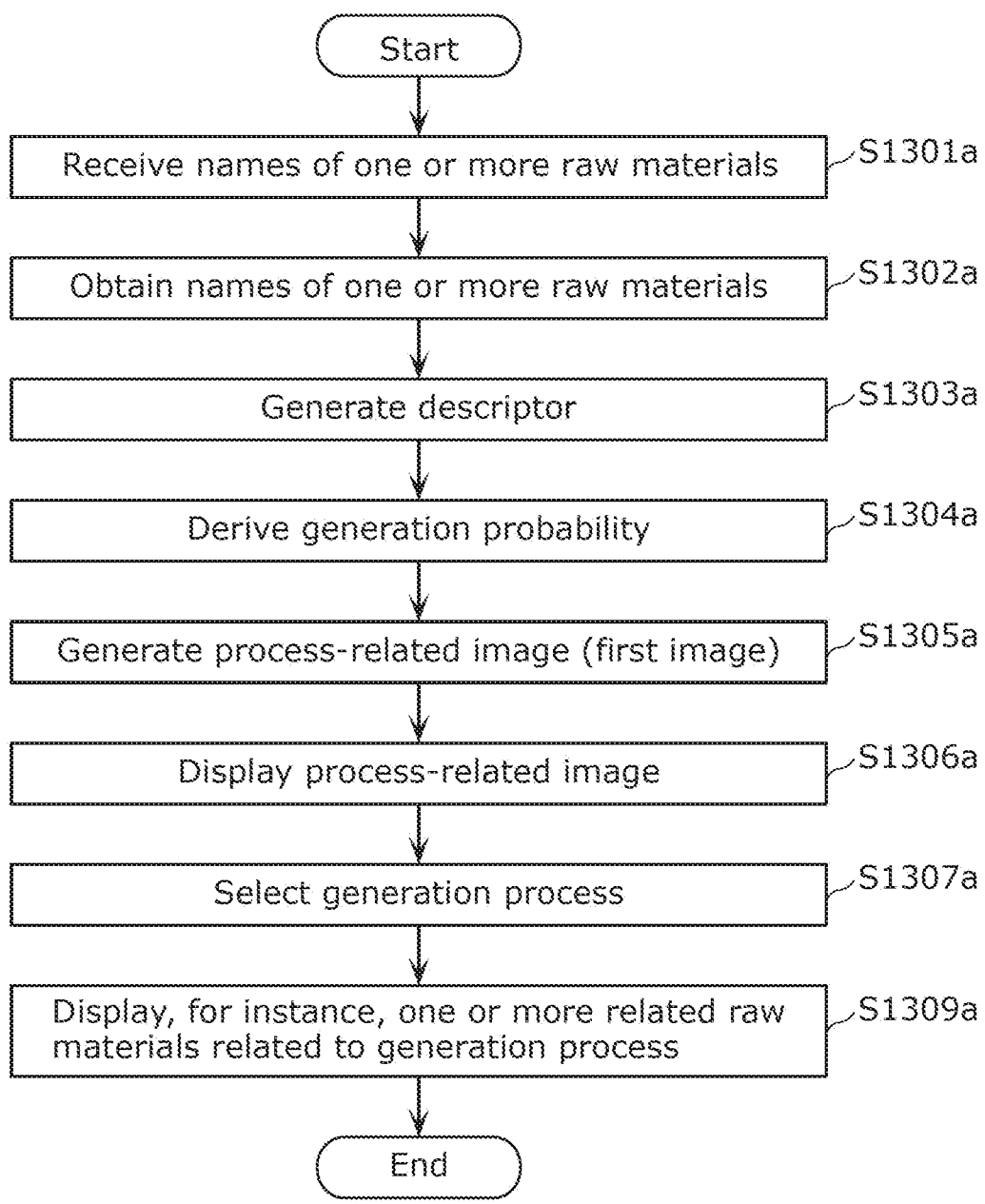
FIG. 27 is a flowchart illustrating one example of the overall flow of processing performed by the generation process display device according to Embodiment 6.

FIG. 27 is a flowchart illustrating one example of the overall 100a according to Embodiment 6. In other words, FIG. 27 is a flowchart illustrating the detailed flow of processes in step S1300a in FIG. 23.

(Step S1301a)

First input unit 101 receives, through a user's input operation, names of one or more raw materials to be displayed, and outputs the names to first information obtainer 102.

(Step S1302a)

First information obtainer 102 obtains the names of the one or more raw materials from first input unit 101 and outputs the names to descriptor generator 103a.

(Step S1303a)

Descriptor generator 103a generates a descriptor corresponding to each of the names of the one or more raw materials obtained from first information obtainer 102, and outputs the descriptor to probability deriver 105 and second information obtainer 106.

(Step S1304a)

Generation trainer 104a inputs, to a trained generation predictor, one or more descriptors obtained from descriptor generator 103a via probability deriver 105, to obtain the generation probability of each of types of generation processes corresponding to the one or more descriptors. Generation trainer 104a then outputs the generation probability to probability deriver 105. When the second database is updated, generation trainer 104a may conduct retraining of the generation predictor based on the difference between the second database after the update and the second database before the update. Probability deriver 105 then obtains the generation probability of each of the types of the generation processes from generation trainer 104a to derive the generation probability of each of types of generation processes for generating a target material using one or more raw materials. Probability deriver 105 outputs the derived generation probability to image generator 107.

(Step S1305a)

Image generator 107 generates process-related image Pa1 indicating the names of the one or more raw materials that are input by the user and obtained from first information obtainer 102. This process-related image Pa1 indicates seven types of generation processes and the generation probability of each of the seven types of generation processes, which is obtained from probability deriver 105. This process-related image Pa1 also includes second information of each of one or more related raw material combinations related to a raw material combination, which is obtained from second information obtainer 106. The second information indicates, for example, the names of one or more related raw materials included in the related raw material combination and the attributes of a known material generated from the one or more related raw materials. The attributes are, for instance, literature information and the location of a paragraph.

(Step S1306a)

Image generator 107 displays process-related image Pa1 generated in step S1305a on display 108.

(Step S1307a)

For example, first information obtainer 102 selects the generation process of a type according to an input operation to first input unit 101 by the user among the seven types of generation processes presented in process-related image Pa1. First information obtainer 102 then notifies image generator 107 of the selected generation process.

(Step S1309a)

Image generator 107 displays, in known material area da1 in process-related image Pa1, one or more second information items related to the notified generation process, i.e., the generation process selected by the user. Each of the one or more second information items indicates (i) the names of one or more related raw materials for generating a known material using the generation process, and (ii) the attributes of the known material. Alternatively, each of the one or more second information items indicates (i) the names of one or more related raw materials for generating a known material without using the generation process, and (ii) the attributes of the known material.

Variation 1 of Embodiment 6

A function of each of plural types of organic inorganic mixed materials varies depending not only on raw materials including an organic material and an inorganic material, but also on the generation processes of the raw materials. Accordingly, it is necessary to appropriately select a generation process depending on a function to be achieved. In generating, as a target material, a magnetic resin material which is one example of an organic inorganic mixed material, when a magnetic resin material having an absorption function is generated, synthesis is performed through ultrasonic processing in many cases. The necessity of each of generation processes such as resin material agitation and repetition of freezing and melting differs depending on a magnetic material and a resin to be used as raw materials, as well as the function of the magnetic resin material.

In view of this, first information according to the present variation indicates not only one or more raw materials for generating a target material, but also a function of the target material. In this case, descriptor generator 103a generates a function descriptor for a function indicated in the first information. Probability deriver 105 then derives the generation probability of each type of a generation process for generating, from the one or more raw materials, the target material having the function. In other words, probability deriver 105 obtains the descriptor of each of the one or more raw materials and the function descriptor from descriptor generator 103a, and outputs these descriptors to generation trainer 104a. Generation trainer 104a inputs these descriptors to a generation predictor to obtain the generation probability of each of types of generation processes corresponding to these descriptors, and outputs these generation probabilities to probability deriver 105. Probability deriver 105 obtains these generation probabilities from generation trainer 104a to derive the generation probabilities. When a function descriptor is not input to the generation predictor, the generation probability of each of types of generation processes for generating at least one of a target material having an optional function or a target material not having any function is derived.

In the present variation, first generation information 2c indicates, in association with the names of one or more raw materials, not only the name of a generation process but also the name of the function of a known material generated from the one or more raw materials. The generation process is a process for generating, from the one or more raw materials, a known material having the function. The generation predictor of generation trainer 104a is created through training that uses such first generation information 2c. Information extractor 208 in database creation device 200a according to the present variation extracts also the name of the function of the known material from a paragraph of dissertation data 1 to generate first generation information 2c described above. In other words, information extractor 208 extracts not only the names of one or more raw materials used for the generation of a known material, the name of a generation process, and the attributes of the known material, but also the name of the function of the known material. Alternatively, each of dissertation data items 1 in the first database may be assigned not only with a material name as described above, but also with the name of the function of a known material. In this case, information extractor 208 generates first generation information 2c that indicates the name of the function assigned to dissertation data 1 in association with the names of one or more raw materials. The function of a known material may be indicated in the second database as an attribute of the known material.

A function descriptor generated by descriptor generator 103a may be described as the aforementioned One Hot Vector. A function is indicated in information not appropriate for presenting variables (also referred to as category information), such as variables indicating temperatures or times, which are physically continuous. Functions of a magnetic resin material include, for example, absorption and conductivity. In order to present these functions by One Hot Vector, the vector [0,0] whose number of dimensions is "2" is prepared for each of absorption and conductivity. The descriptor of the function "absorption" is presented as the vector [1,0] and the descriptor of the function "conductivity" is presented as the vector [0,1]. Thus, an element flag corresponding to a target indicated by a descriptor (i.e., a function) is enabled, i.e., the value of the corresponding element is changed from 0 to 1. When the number of function candidates is four, the number of dimensions is 4, and when the number of function candidates is 6, the number of dimensions is 6. The number of dimensions (stated differently, the length) of a vector is thus set in accordance with the number of function candidates.

Figure 28:
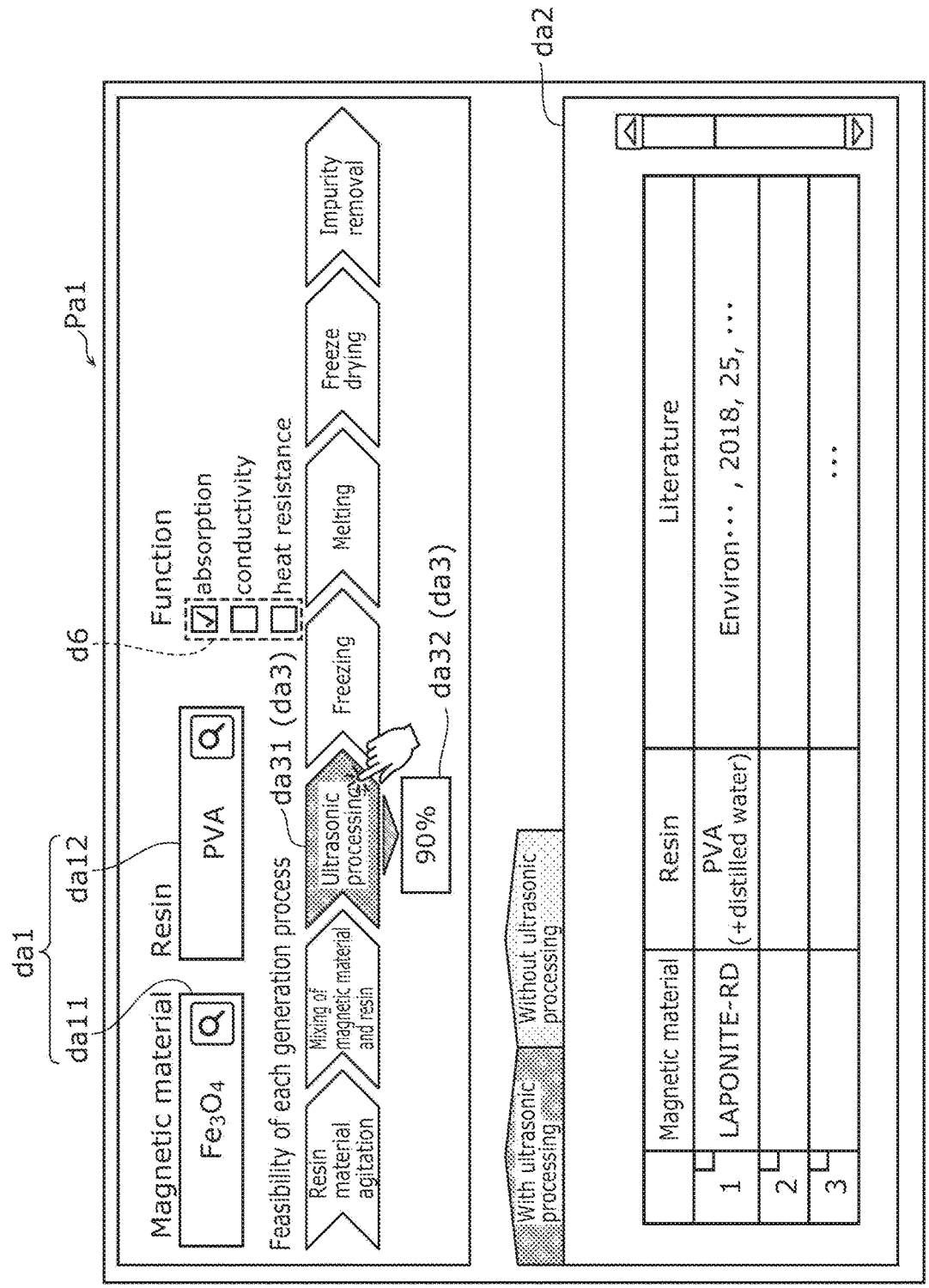
FIG. 28 is a diagram illustrating an example of a process-related image according to Variation 1 of Embodiment 6.

FIG. 28 is a diagram illustrating one example of process-related image Pa1 according to the present variation.

In process-related image Pa1 in FIG. 28, check boxes d6 for selecting any one of functions are displayed. First, the user performs an input operation to first input unit 101 to input the name "Fe$_3$O$_4$" of a magnetic material and the name "PVA" of a resin to raw material area da1 in process-related image Pa1, for example. The user performs an input operation to first input unit 101 also to select object da31 indicating "ultrasonic processing" as a generation process. As a result, the generation probability "60%" of the generation process "ultrasonic processing" is displayed in probability box da32, as illustrated in FIG. 26.

The user performs an input operation to first input unit 101 to select, for example, a single function among a plurality of functions. In other words, the user inputs a check mark to any one of check boxes d6 associated with the plurality of functions. With this, the function associated with check box d6 to which the check mark is input is selected. Each of the plurality of functions is a function of a target material and is, for example, absorption, conductivity, or heat resistance. Absorption is a function of a target material (i.e., a magnetic resin material) to absorb a chemical substance or medicine. Conductivity is a function of a target material to transmit electricity. Heat resistance is a function of a target material to be tolerant against high temperatures. In the example illustrated in FIG. 28, the user selects the function "absorption" among these functions. When such a function is selected, first information indicates not only the names of two raw materials firstly input by the user but also the name of the selected function. As a result, probability deriver 105 updates the generation probability of each of the seven types of generation processes based on the first information. For example, probability deriver 105 updates the generation probability of the generation process "ultrasonic processing" from "60%" to "90%". The generation probability thus updated is displayed in probability box da32, as illustrated in FIG. 28.

With this, it is possible to narrow down a target material generated using a generation process to a target material having a function selected by the user. Accordingly, the generation probability of the generation process can be narrowed down to a probability that the generation process is required for the generation of the target material having the function selected by the user. In the example illustrated in FIG. 26 or FIG. 28, with the function "absorption" being selected, the generation probability of the generation process "ultrasonic processing" is updated from "60%" to "90%". In other words, in order to generate a composite material having an absorption function, a probability that ultrasonic processing is required increases compared with the generation of a composite material that is not limited by a function. The composite material is a target material and is more specifically a magnetic resin material. In this way, it is possible to easily and precisely understand even a generation probability that depends on the function of a target material. With this, material development can be supported more optimally.

Although a single function "absorption" is selected in the example illustrated in FIG. 28, a plurality of functions may be selected. In this case, the generation probability of a generation process is displayed as a probability that the generation process is required for the generation of a target material having the plurality of functions that have been selected.

Figure 29:
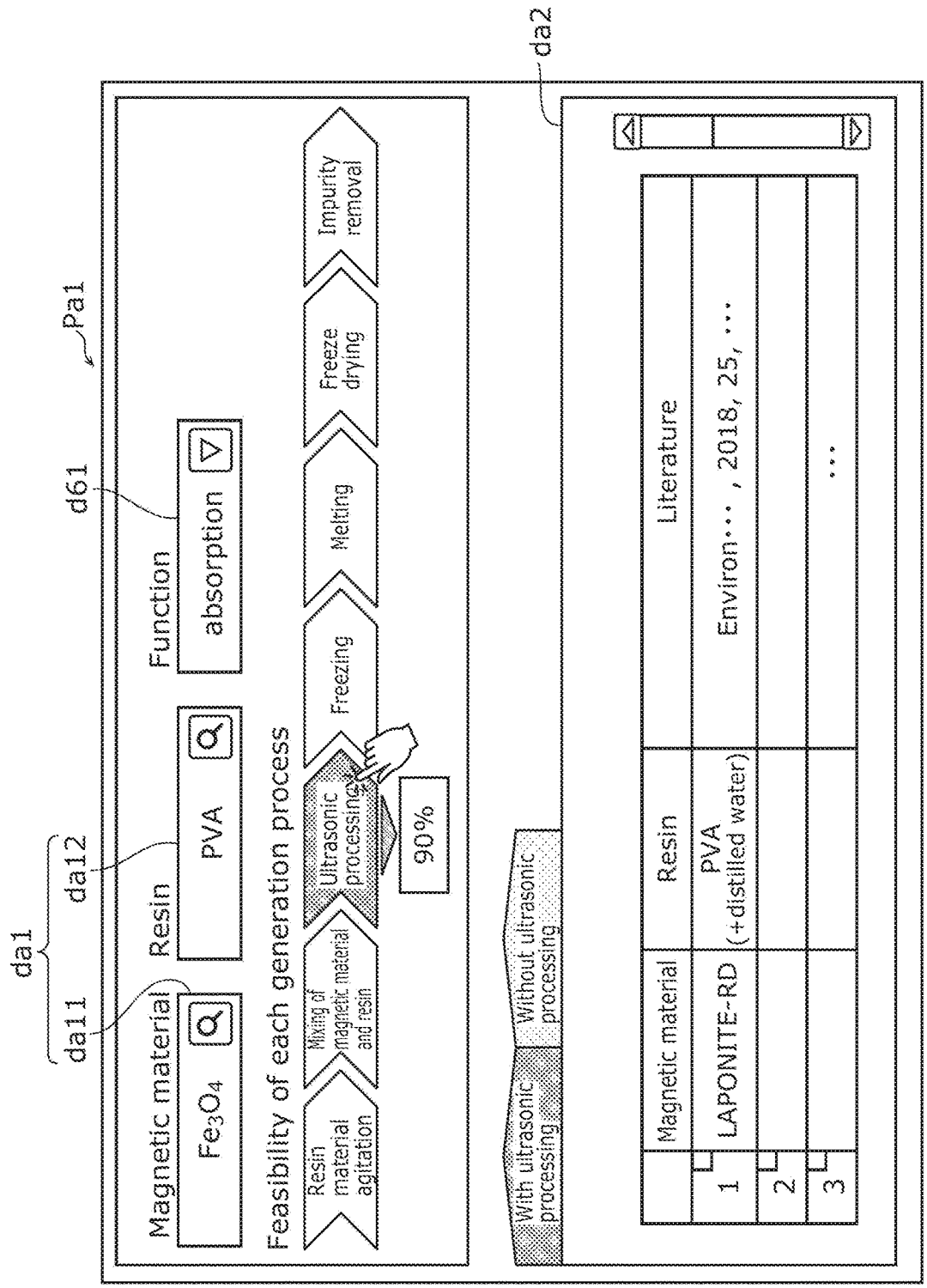
FIG. 29 is a diagram illustrating another example of the process-related image according to Variation 1 of Embodiment 6.

FIG. 29 is a diagram illustrating another example of process-related image Pa1 according to the present variation.

In the example illustrated in FIG. 28, the selection of a function is performed through an input in check box d6, but may be performed through a selection from options displayed by pull down d61, as illustrated in FIG. 29. Pull down d61 is also referred to as a pull-down menu, a pull-down list, or a drop down. The options are items presenting the names of functions.

With this, it is possible, even in the example illustrated in FIG. 29, to narrow down the generation probability of the generation process selected by the user to a probability that the generation process is required for the generation of a target material having the function selected by the user. Moreover, even when multiple functions are provided as options, the user can easily select a desired function.

Although the function of a target material is selected using pull down d61 in the example illustrated in FIG. 29, the user may directly input the name of the function of a target material.

In the present variation, first information may indicate not only one or more raw materials for generating a target material and the function of the target material, but also an application of the target material. In this case, descriptor generator 103a generates a descriptor for the application indicated in the first information. The One Hot Vector mentioned above may be used for the generation of the descriptor. Subsequently, probability deriver 105 derives the generation probability of each type of a generation process for generating, from the one or more raw materials, the target material having the function and the application. In other words, probability deriver 105 obtains the descriptor of each of the one or more raw materials and the descriptors of the function and the application from descriptor generator 103a, and outputs these descriptors to generation trainer 104a. Generation trainer 104a inputs these descriptors to a generation predictor to obtain the generation probability of each of types of generation processes corresponding to these descriptors and output the generation probabilities to probability deriver 105. Probability deriver 105 obtains the generation probabilities to derive the generation probabilities. When an application descriptor is not input to the generation predictor, the generation probability of each of types of generation processes for generating at least one of a target material having any one of applications or a target material having no application is derived.

In the present variation, first generation information 2c indicates the following in association with each other: the names of one or more raw materials; the names of function and application of a known material generated from the one or more raw materials; and the name of a generation process for generating, from the one or more raw materials, the known material having the function and the application. The generation predictor of generation trainer 104a is created through training that uses such first generation information 2c. Information extractor 208 in database creation device 200a according to the present variation extracts also the names of the function and application of the known material from a paragraph of dissertation data 1 to generate first generation information 2c described above. In other words, information extractor 208 extracts not only the names of one or more raw materials used for the generation of a known material, the name of a generation process, and the attributes of the known material, but also the names of the function and application of the known material. Alternatively, each of dissertation data items 1 in a first database may be associated not only with a material name as described above but also with the names of the function and application of a known material. In this case, information extractor 208 generates first generation information 2c that indicates, in association with one or more raw materials, the names of the function and application associated with dissertation data item 1. The function and application of a known material may be indicated in the second database as attributes of the known material.

Figure 30:
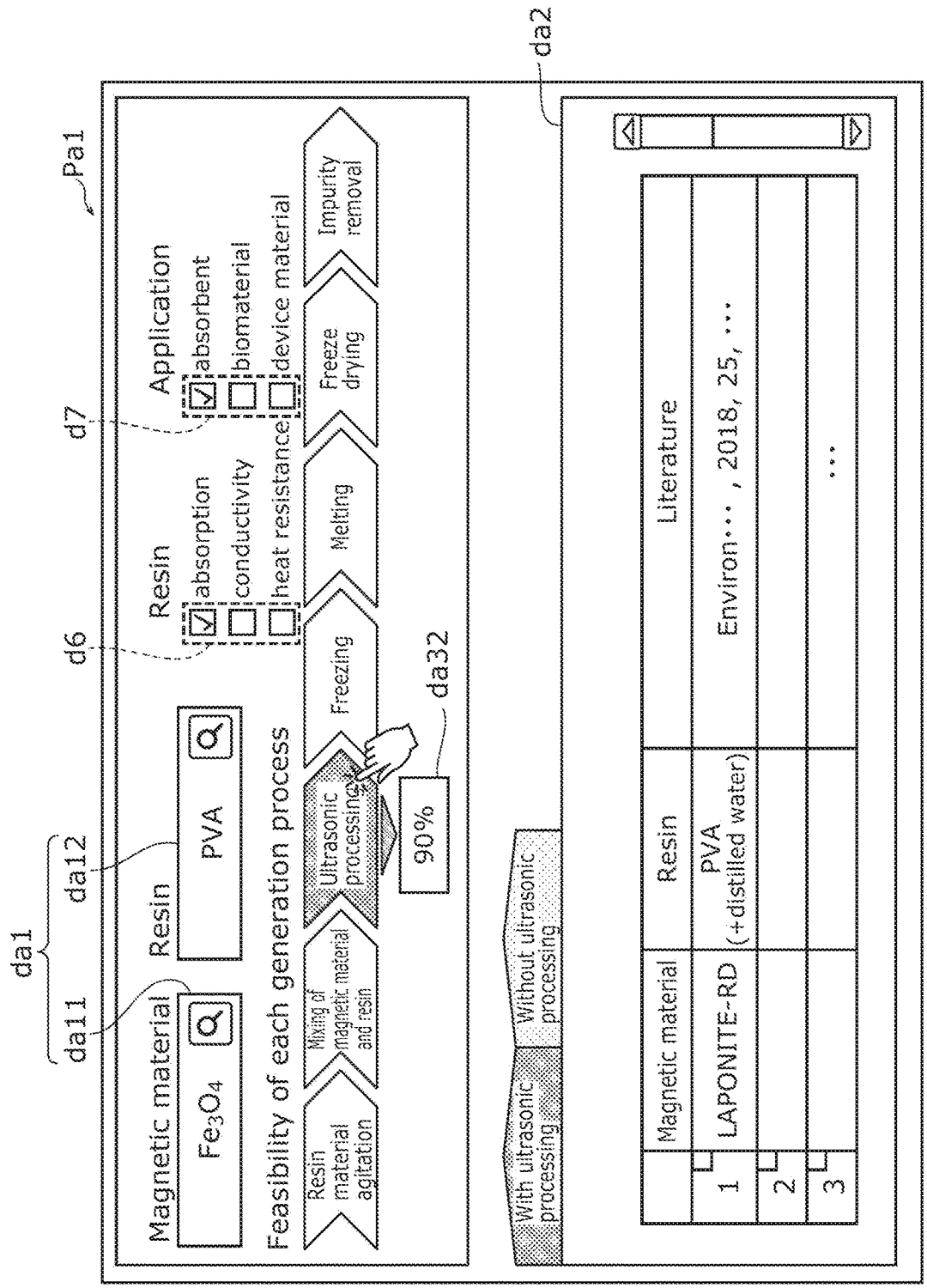
FIG. 30 is a diagram illustrating yet another example of the process-related image according to Variation 1 of Embodiment 6.

FIG. 30 is a diagram illustrating another example of process-related image Pa1 according to the present variation.

In process-related image Pa1 illustrated in FIG. 30, check boxes d7 for selecting any one of a plurality of applications are also displayed. The user performs an input operation to first input unit 101 to select, for example, an application among the plurality of applications. In other words, the user inputs a check mark to any one of check boxes d7 associated with the plurality of applications. With this, the application associated with check box d7 to which the check mark is input is selected. Each of the plurality of applications is an application of a target material and is, for example, a different one of an absorbent, a biomaterial, and a device material. An absorbent is an application used for the absorption of, for instance, a chemical substance or medicine. A biomaterial is an application used for, for instance, an implant to a living body of a human, for instance. A device material is an application used for incorporation into a machine.

First, the user performs an input operation to first input unit 101 to input the name "$Fe_3O_4$" of a magnetic material and the name "PVA" of a resin to raw material area da1 in process-related image Pa1, for example. The user performs an input operation to first input unit 101 to also select object da31 indicating "ultrasonic processing" as a generation process. As a result, the generation probability "60%" of the generation process "ultrasonic processing" is displayed in probability box da32, as illustrated in FIG. 26.

The user performs an input operation to first input unit 101 to select, for example, the function "absorption" among a plurality of functions and also select, for example, the application "absorbent" among a plurality of applications. When such function and application are selected, first information indicates not only the names of two raw materials firstly input by the user but also the names of the selected function and application. As a result, probability deriver 105 updates the generation probability of each of the seven types of generation processes based on the first information. For example, probability deriver 105 updates the generation probability of the generation process "ultrasonic processing" from "60%" to "90%". The generation probability thus updated is displayed in probability box da32, as illustrated in FIG. 30.

With this, it is possible to narrow down a target material generated using a generation process to a target material having the function and application selected by the user. Accordingly, the generation probability of the generation process can be narrowed down to a probability that the generation process is required for the generation of the target material having the function and application selected by the user. In the example illustrated in FIG. 26 or FIG. 30, with the function "absorption" and the application "absorbent" being selected, the generation probability of the generation process "ultrasonic processing" is updated from "60%" to "90%". In other words, in order to generate a composite material that has an absorption function and used as an absorbent, a probability that ultrasonic processing is required increases compared with the generation of a composite material that is neither limited by a function nor an application. It is thus possible to easily and precisely understand even a generation probability that depends on the function and application of a target material. This can support material development more optimally.

Although a function and an application are selected in the example illustrated in FIG. 30, only one of a function and an application may be selected. In selecting only an application, a target material generated using a generation process can be narrowed down to a target material having the application selected by the user. Accordingly, the generation probability of the generation process can be narrowed down to a probability that the generation process is required for the generation of the target material having the application selected by the user.

Variation 2 of Embodiment 6

In Embodiment 6, a plurality of raw materials are input in raw material area da1. In the present variation, however, only a single raw material is input in raw material area da1. In this case, second information obtainer 106 obtains, from a second database in second storage 302a, second information indicating, as a related raw material, a raw material having a name same as or similar to the name of the single raw material indicated in first information. In other words, second information obtainer 106 obtains second information indicating, as a related raw material, a raw material having the distance of at most a threshold between the vector of that raw material and the vector of the single raw material indicated in the first information. When the single raw material indicated in the first information is a resin, for example, second information, which indicates a resin having the distance of at most a threshold between the vector of that resin and the vector of the single raw material indicated in the first information, is obtained. The second information may indicate not only a resin that is the related raw material, but also a magnetic material. The magnetic material is any magnetic material that is not to be limited by first information.

Figure 31:
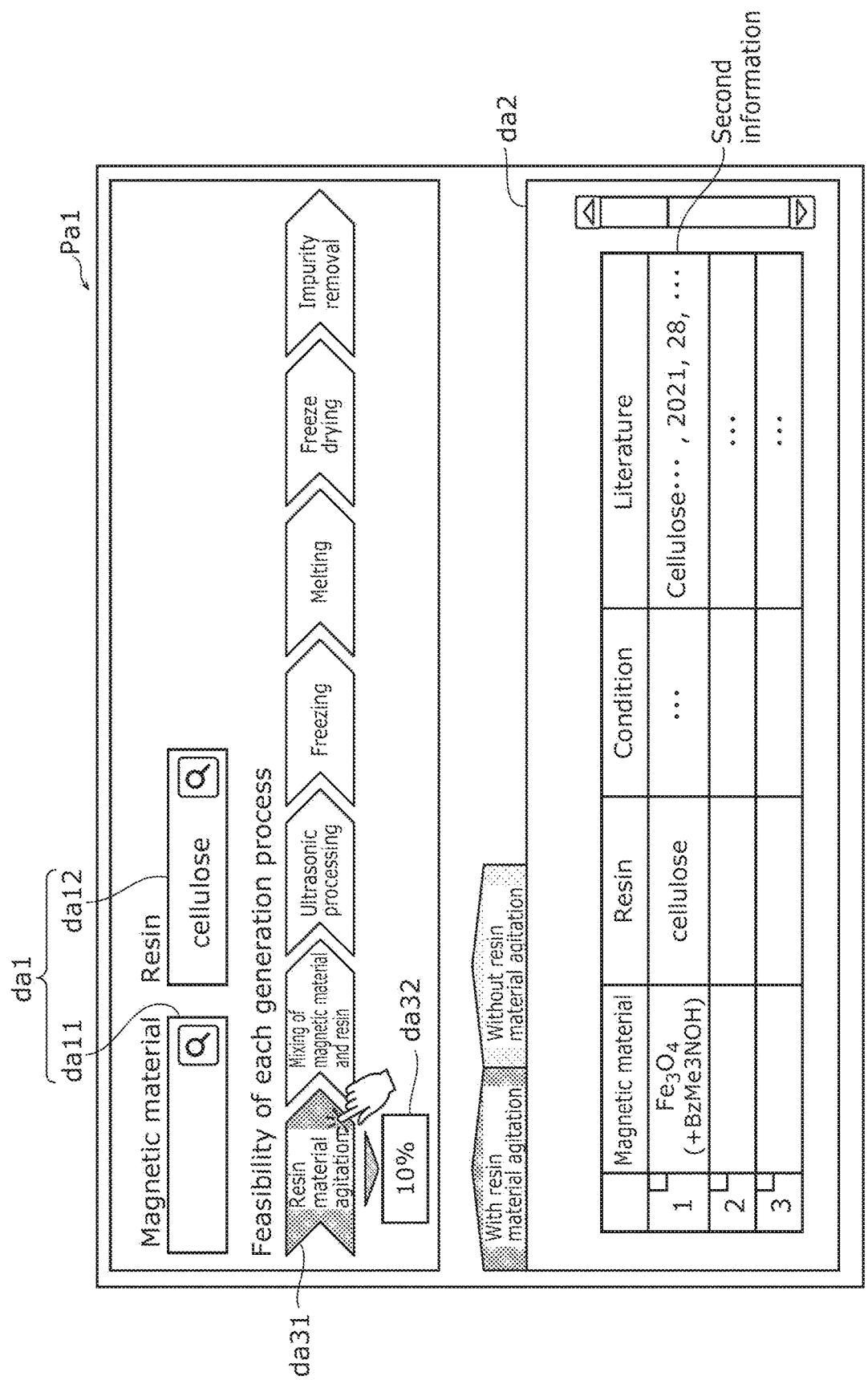
FIG. 31 is a diagram illustrating an example of a process-related image according to Variation 2 of Embodiment 6.
Figure 32:
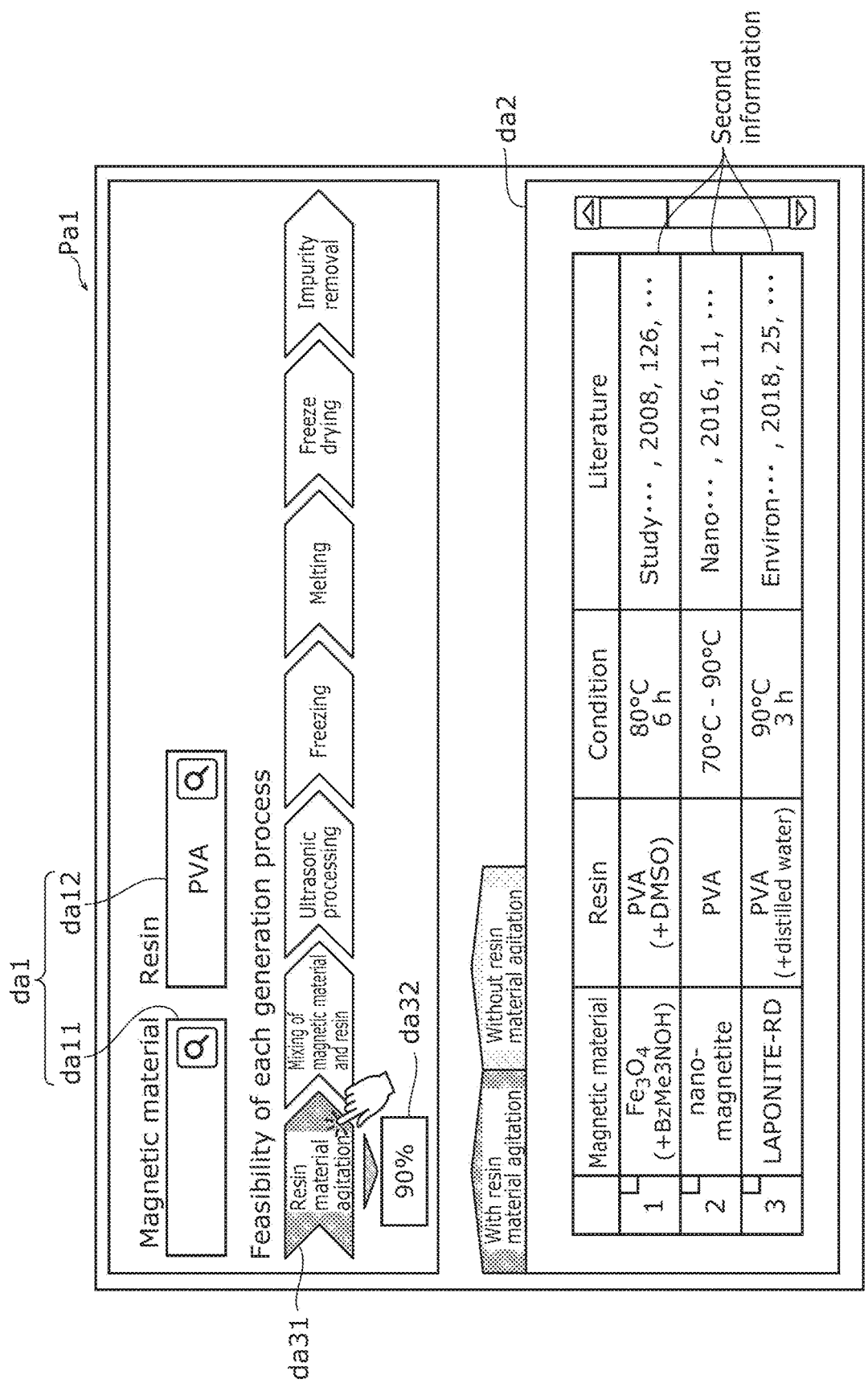
FIG. 32 is a diagram illustrating another example of the process-related image according to Variation 2 of Embodiment 6.

FIG. 31 and FIG. 32 are each a diagram illustrating one example of process-related image Pa1 according to the present variation.

In the example illustrated in FIG. 31, the user does not input the name of a raw material that is a magnetic material to first raw material area da11, and inputs the name "cellulose" of a raw material that is a resin to second raw material area da12. With this, generation process display device 100a obtains first information indicating the name "cellulose" of the raw material, and derives the generation probability of each of the seven types of generation processes based on the first information. Subsequently, when object da31 indicating the generation process "resin material agitation", which is one of the seven types of generation processes, is selected by the user, generation process display device 100a displays the generation probability "10%" of the generation process "resin material agitation" in probability box da32.

In the example illustrated in FIG. 32, the user does not input the name of a raw material that is a magnetic material to first raw material area da11, and inputs the name "PVA" of a raw material that is a resin to second raw material area da12. With this, generation process display device 100a obtains first information indicating the name "PVA" of the raw material, and derives the generation probability of each of the seven types of generation processes based on the first information. Subsequently, when object da31 indicating the generation process "resin material agitation", which is one of the seven types of generation processes, is selected by the user, generation process display device 100a displays the generation probability "90%" of the generation process "resin material agitation" in probability box da32.

When comparing FIG. 31 with FIG. 32, a low generation probability is displayed for the generation process "resin material agitation" in the case of using the raw material "cellulose" as a resin, and a high generation probability is displayed for the generation process "resin material agitation" in the case of using the raw material "PVA" as a resin.

Accordingly, in the present variation, by focusing on a single raw material such as a resin, it is possible to easily and precisely understand a generation probability that depends on the raw material. This can support material development more optimally.

In known material area da1 in process-related image Pa1, second information indicating a related raw material having a name same as or similar to the name "cellulose", which is input by the user, of a raw material that is a resin is displayed.

In the example in FIG. 31, for example, second information indicating the name "cellulose" of a related raw material that is a resin is displayed. In this example, the second information indicates the name "$Fe_3O_4$ (+$BzMe_3NOH$)" of a magnetic material and attributes of a known material generated using the magnetic material and the resin. The attributes include literature information of dissertation data 1 that describes the generation of the known material and a condition (i.e., a process condition) used for the generation process "resin material agitation" selected by the user.

In the example in FIG. 32, second information indicating the names "PVA (+DMSO)", "PVA", and "PVA (+distilled water)" of a related raw material that is a resin is displayed. In this example, the second information indicating the name "PVA (+DMSO)" of a related raw material indicates not only the name "PVA (+DMSO)" but also the name "$Fe_3O_4$ (+$BzMe_3NOH$)" of a magnetic material and attributes of a known material generated using the magnetic material and the resin. Likewise, second information indicating the name "PVA" of a related raw material indicates not only the name "PVA" but also the name "nano-magnetite" of a magnetic material and attributes of a known material generated using the magnetic material and the resin. Second information indicating the name "PVA (+distilled water)" of a related raw material indicates not only the name "PVA (+distilled water)" but also the name "LAPONITE-RD" of a magnetic material and attributes of a known material generated using the magnetic material and the resin. The attributes include literature information of dissertation data 1 that describes the generation of the known material and a process condition used for the generation process "resin material agitation" selected by the user. In generating a known material from the magnetic material "$Fe_3O_4$ (+$BzMe_3NOH$)" and the resin "PVA (+DMSO)", agitation of six hours at 80 degrees Celsius is indicated as a process condition for the generation process "resin material agitation".

In the present variation, it is thus possible to display, in accordance with second information displayed in known material area da1, a process condition and the related raw material of a magnetic material that is a raw material which has not been input in raw material area da1. For example, when a generation process such as repetition of freezing and melting is required for the generation of a magnetic resin material that is one example of an organic nonorganic mixed material, for example, it may take a few days to only generate a single sample of the magnetic resin material. In such a case, the number of days required for the generation is displayed as a process condition in the present variation. Accordingly, the user can guess, to some extent, a generation process implementable in a user's situation based on the process condition before starting an experiment of generating a target material, thereby achieving significant efficiency in the search of a generation process. Equipment used in the generation process may be displayed as a process condition. In some cases, a required generation process differs depending on a raw material to be used, and required equipment also differs depending on a required generation process. With such equipment being displayed, it is possible for the user to easily determine that the target material can be generated using the generation process if the user owns the equipment.

In the present variation, function and application of a target material may be input, as in Variation 1. When magnetic resin materials are same but have different functions and applications, a generation process required for the generation of one magnetic resin material may differ from a generation process required for the generation of the other magnetic resin material, and necessary equipment also differs depending on a required generation process. In the present variation, since necessary equipment is displayed, it is possible for the user to easily determine, even in the case described above, that a magnetic resin material can be generated using the generation process if the user owns that equipment.

Figure 33:
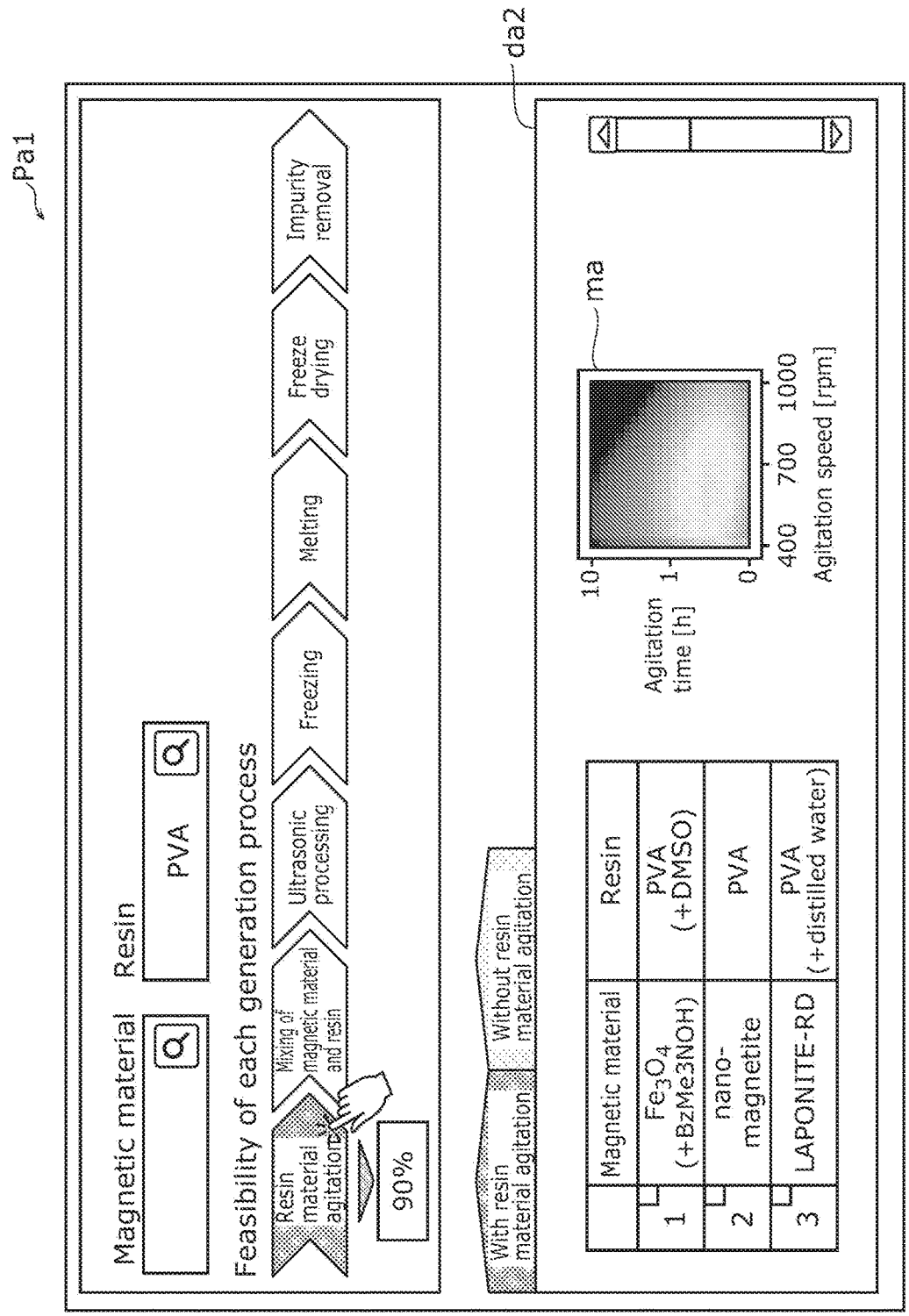
FIG. 33 is a diagram illustrating yet another example of the process-related image according to Variation 2 of Embodiment 6.

FIG. 33 is a diagram illustrating another example of process-related image Pa1 according to the present variation.

Process conditions are displayed as numerical values in the example in FIG. 32, but may be displayed as map ma, as illustrated in FIG. 33. In other words, image generator 107 may generate map ma presenting the relationship of attributes of each of one or more known materials indicated in second information, and output map ma to display 108. A known material is a composite material (i.e., a magnetic resin material) generated from a magnetic material and a resin that are each a related raw material. In the example in FIG. 33, "resin material agitation" is selected as a generation process. In this case, map ma, which indicates the relationship between (i) an agitation time and an agitation speed used as process conditions of the generation process and (ii) the number of dissertation data items 1 each of which describes an agitation time and an agitation speed, is displayed. In one specific example, the horizontal axis of map ma indicates an agitation speed and the vertical axis of map ma indicates an agitation time. A color or the density of the color according to the number of dissertation data items 1 each of which describes an agitation speed and an agitation time is shown at a location specified by an agitation speed on the horizontal axis and an agitation time on the vertical axis. For example, a darker black color is shown as the number of dissertation data items 1 increases, and a lighter black color is shown as the number decreases.

This enables the user to visually easily compare between attributes of each of one or more known materials indicated in the second information of the known material. This can support material development more optimally.

Although the name of a resin is input and the name of a magnetic material is not input in raw material area da1 in the examples in FIG. 31 through FIG. 33, the name of a magnetic material may be input and the name of a resin need not be input. Even in such a case, the same advantageous effects as those described above can be produced.

Variation 3 of Embodiment 6

In each of Embodiment 6 and Variations 1 and 2 thereof, the generation probabilities of all of generation processes or the generation probability of the generation process selected by the user are displayed. In the present variation, however, only a generation process corresponding to the generation probability of at least a threshold among all of generation processes is displayed.

Figure 34:
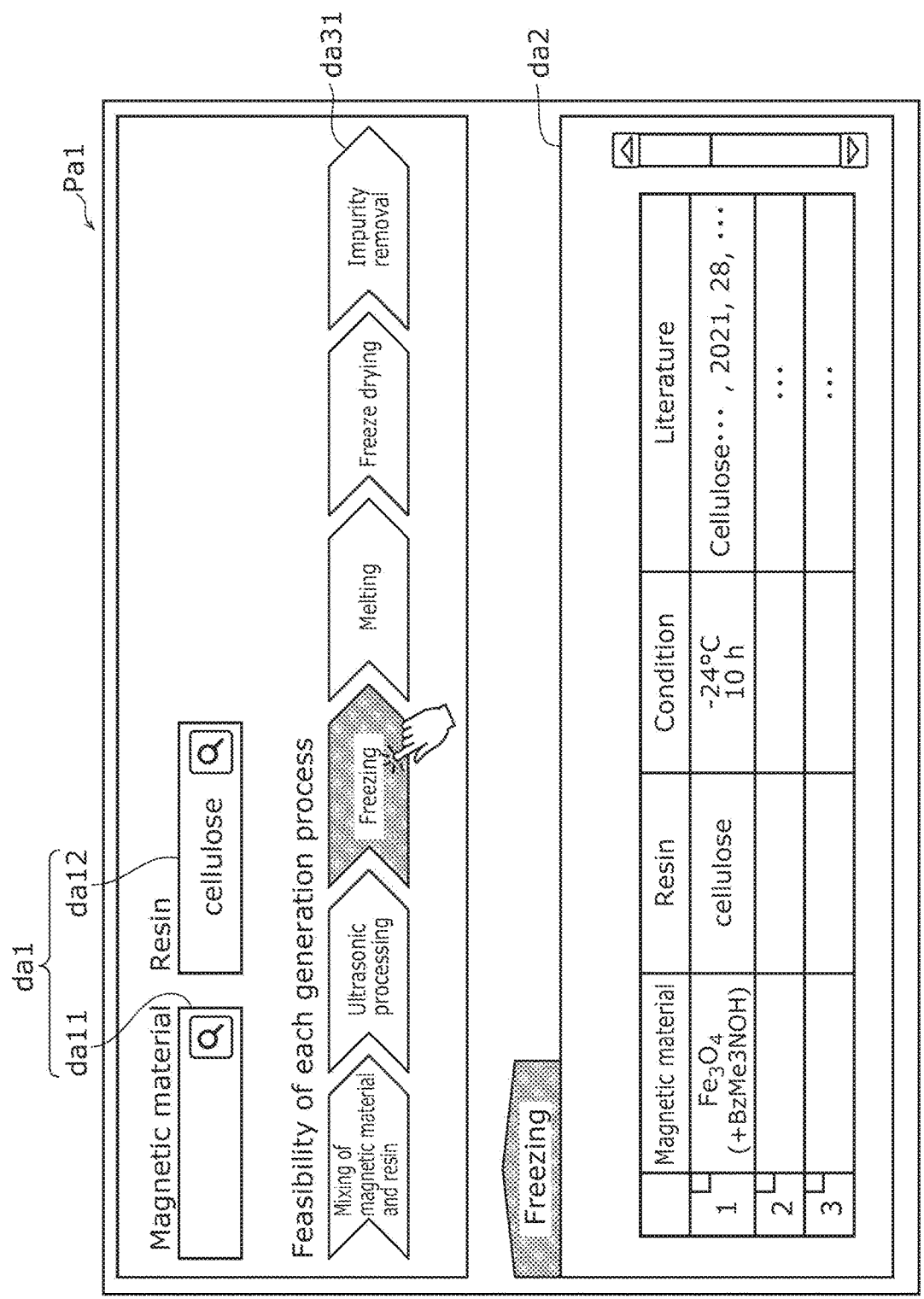
FIG. 34 is a diagram illustrating an example of a process-related image according to Variation 3 of Embodiment 6.

FIG. 34 is a diagram illustrating one example of process-related image Pa1 according to the present variation.

Image generator 107 displays, on display 108, process-related image Pa1 indicating only a generation process corresponding to the generation probability of, for example, at least the threshold "50%" among seven types of generation processes. For example, image generator 107 does not display object da31 indicating the generation process "resin material agitation" and displays only object da31 of each of the other six types of generation processes among the seven types of generation processes.

For example, the user does not input the name of a raw material that is a magnetic material to first raw material area da11, and inputs the name "cellulose" of a raw material that is a resin to second raw material area da12, as in the example illustrated in FIG. 31. In this case, the generation probability of the generation process "resin material agitation" is 10% and is not more than the threshold "50%". Accordingly, object da31 indicating the generation process "resin material agitation" is not displayed.

This enables the user to easily understand only a generation process whose generation probability is at least a threshold. As a result, material development can be supported more optimally.

Figure 35:
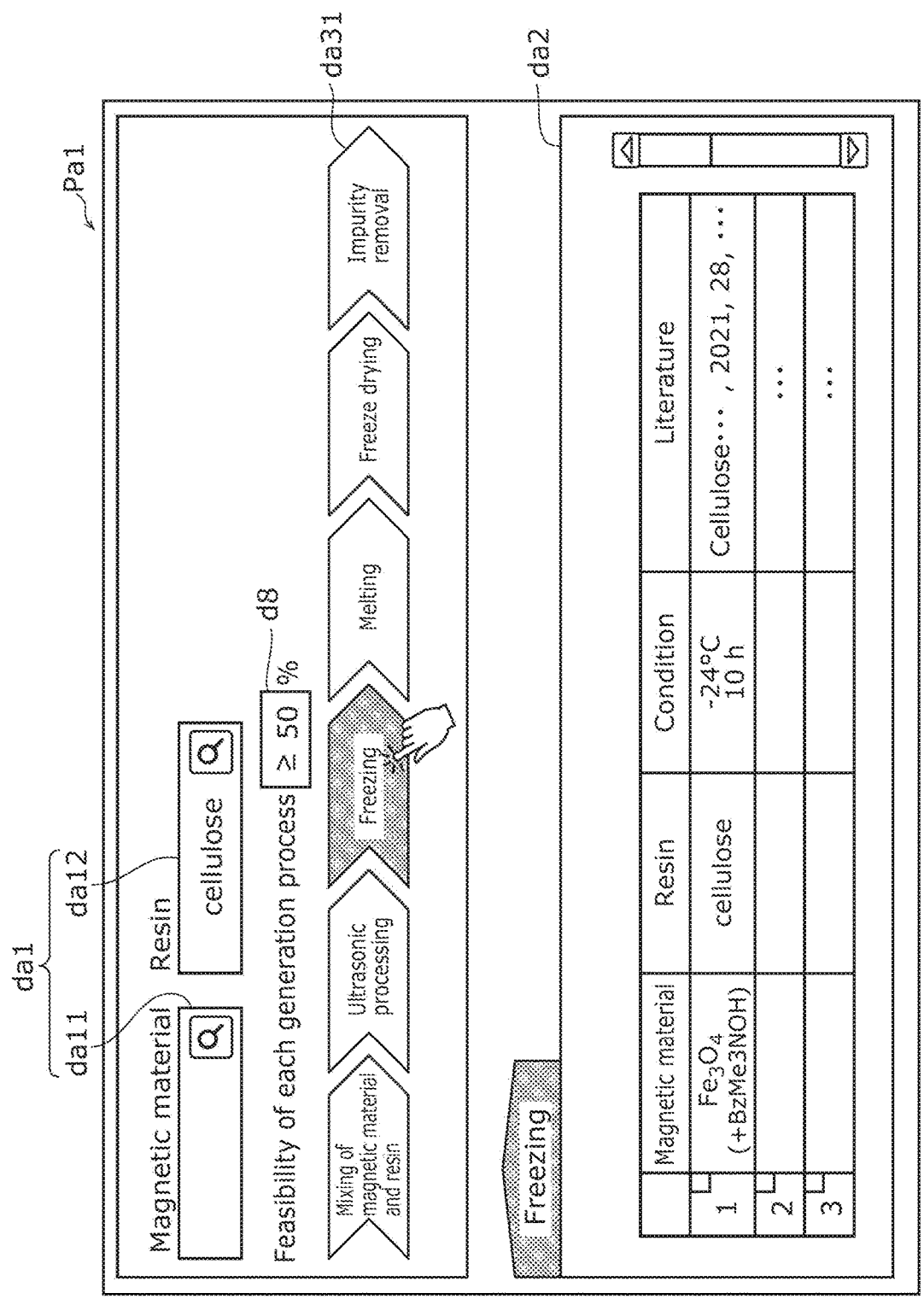
FIG. 35 is a diagram illustrating another example of the process-related image according to Variation 3 of Embodiment 6.

FIG. 35 is a diagram illustrating another example of process-related image Pa1 according to the present variation.

In the example in FIG. 34, the threshold "50%" is predetermined. In the example in FIG. 35, a threshold can be discretionarily set by the user. In other words, image generator 107 displays, on display 108, process-related image Pa1 including threshold box d8 in which a threshold is input. The user performs an input operation to input unit 110 to input a threshold in threshold box d8. The user may input a condition such as "at least a threshold" or "less than a threshold" in threshold box d8. With this, only a generation process that satisfies the threshold condition input by the user is included in process-related image Pa1 and then displayed.

This enables the user to easily understand only a generation process that satisfies a desired threshold condition. This can support material development more optimally. Although a generation probability is not displayed for each of displayed generation processes in the examples in FIG. 34 and FIG. 35, the generation probability of each of the displayed generation processes may be displayed, as in the example illustrated in FIG. 25.

Although Embodiment 6 and Variations 1 through 3 thereof are described above, the present disclosure is not limited to these embodiment and variations. Various variations obtained by applying various modifications conceived by persons skilled in the art to Embodiment 6 and Variations 1 through 3 thereof may be also included in the present disclosure so long as they do not depart from the spirit of the present disclosure. Moreover, Embodiment 6 and Variations 1 through 3 thereof may be combined with any one of Embodiments 1 through 5.

In each of Embodiment 6 and Variations 1 through 3 thereof, the names of two raw materials are input in raw material area da1, for example, but the names of three or more raw materials may be input. Raw materials are not limited to a magnetic material and a resin and may be any other materials.

In each of Embodiment 6 and Variations 1 through 3 thereof, the generation probability of each of a plurality of generation processes is derived, but the generation probability of a single generation process may be derived.

(Summary of Embodiments 1 Through 6)

It can be said that generation process display devices 100 and 100a according to Embodiments 1 through 6 and variations thereof described above are each a generation process output device as described below.

The generation process output device includes: first information obtainer 102 that obtains first information about a target material; a deriver that derives, for each of one or more types of generation processes, a generation parameter based on a database regarding materials, where the generation parameter indicates a degree that the generation process is required for generating the target material specified by the first information; and an outputter that outputs one or more generation parameters that have been derived, where each of the one or more generation parameters is the generation parameter. The outputter is, for example, image generator 107 that generates and outputs, for example, an image including generation parameters. The first information may directly indicate a target material by the composition of the target material or indirectly indicate a target material by one or more raw materials used for the generation of the target material. The outputter may output the generation parameter indicating the degree as at least one of a generation probability or a ranking. The generation probability may be a probability that a generation process of a type corresponding to the generation probability is required for the generation of the target material. The ranking may be achieved by arranging the one or more types of generation processes in order of the degree. When the generation parameter is a generation probability, the deriver described above is, for example, probability deriver 105 that derives a generation probability. The ranking is a ranking illustrated in, for example, FIG. 8A. The database is, for example, a second database according to each of Embodiments 1 through 6.

With this, the generation parameter of each type of a generation process for a target material is output. In other words, the user can easily grasp, for each type of the generation process, the necessity of the generation process for the generation of the target material, i.e., a possibility that the target material is generated using the generation process. Accordingly, in the generation of the target material, the user can firstly grasp, for each generation process type, the possibility that the target material is generated, and then select a generation process. As a result, even if the user is a researcher with poor knowledge and experience, they can easily select a generation process. If the user is a researcher with good knowledge and experience, they can make the use of their knowledges and experiences to select a generation process more accurately. When the generation parameter of each of plural types of generation processes is output and displayed, for example, the user can find out, from those generation processes, a generation process of a type that is most required for the generation of a target material. It can be also said that the generation process of such a type is a generation process of a type that is most likely to generate the target material. Thus, the user can determine that the target material can be generated using that generation process. As a result, the search of a generation process for a target material by the user can be more appropriately supported.

The deriver inputs a descriptor related to the target material to a predictor to derive the generation parameter of each of the one or more types of generation processes for the target material. The predictor is trained using the database to output, in response to the input of a descriptor related to a material, the generation parameter of each of the one or more types of generation processes for the material. The predictor is, for example, the sintering predictor or generation predictor described above, and a specific example of the predictor is, for instance, a neural network. The predictor is trained using the database to output, in response to the input of a descriptor indicating a composition, the generation parameter of each of the one or more types of generation processes for a material having the composition. The deriver inputs a descriptor indicating the composition of the target material to the predictor to derive the generation parameter of each of the one or more types of generation processes for the target material. For example, the generation probability of each of plural types of sintering methods is derived as the generation parameter of each of plural types of generation processes, as in each of Embodiments 1 through 5. Alternatively, the predictor is trained using the database to output, in response to the input of a descriptor indicating one or more raw materials for generating a material, the generation parameter of each of the one or more types of generation processes for the material. The deriver inputs a descriptor indicating one or more raw materials for generating the target material to the predictor, to derive the generation parameter of each of the one or more types of generation processes for the target material. For example, the generation probability of each of plural types of generation processes is derived as a generation parameter, as in Embodiment 6.

With this, even though neither the composition of a target material nor one or more raw materials are indicated in a database, the generation parameter of each of one or more types of generation processes for an unknown target material can be derived by using a trained predictor.

The outputter generates a first image indicating the one or more generation parameters, and outputs the first image to a display to output the one or more generation parameters. In other words, the outputter in this case is equivalent to image generator 107. The first image is, for example, process-related image P1 or Pa1 described above.

With this, a first image indicating generation parameters is displayed on display 108, and the user can therefore easily grasp the generation parameters by viewing the first image. When the generation parameter of each of plural types of generation processes is indicated in the first image, for example, the user can determine that a target material can be generated using the generation process of a type corresponding to the largest generation parameter. If the user does not own a generation device capable of implementing the generation process of the type corresponding to the largest generation parameter, the user can check the generation parameter of a type corresponding to a generation process implementable by a generation device owned by the user. The user can determine to attempt the generation of the target material even with the generation process of a type corresponding to the smallest generation parameter if the generation parameter indicates the generation probability of, for example, at least 30%.

The generation process output device, like generation process display device 100 according to each of Embodiments 1 through 5, may include second information obtainer 106 that obtains second information of each of one or more known materials related to the target material from a database regarding materials. The outputter may generate the first image so as to additionally indicate the second information of each of the one or more known materials. When a single second information item among second information items of the one or more known materials indicated in the first image is selected, second information obtainer 106 may further obtain, from the database, an area of part of literature that describes a generation process for generating the known material indicated in the selected single second information item. The outputter may further generate, as a second image, an image indicating the description in the area of the part of the literature, to output the image to display 108.

With this, the following is displayed for each of one or more known materials related to a target material: second information indicating the known material; and the area of part of literature that describes the generation process of the known material. As a result, in the generation of the target material, the user can firstly grasp, for each generation process type and from a wider viewpoint, a possibility that the target material is generated, and then select a generation process. In other words, the user can easily know what kind of generation process is performed for a known material similar to the target material. Accordingly, the search of a generation process for a target material can be more appropriately supported.

When the generation parameter of each of N types of generation processes is derived by the deriver and the generation parameter of each of M types of generation processes satisfies a predetermined condition, where N is an integer of 3 or greater, M is a predetermined integer of at least 1 and less than N, and the M types of generation processes each have a greater degree than other remaining generation processes among the N types of generation processes, the outputter generates the first image indicating the generation parameter of each of the M types of generation processes and not indicating generation parameters of the other remaining generation processes among the N types of generation processes.

Accordingly, when a generation probability indicated by the generation parameter of one type of generation process among plural types of generation processes is the only generation probability indicating at least a threshold 80%, for example, only the generation probability of that one type of generation process is displayed and the generation probabilities of the other remaining generation processes are not displayed. In the example described above, a predetermined condition is that a generation probability is at least a threshold 80%. Accordingly, the user can easily find the most probable generation process for a target material. When the sum of two highest generation probabilities among the generation probabilities of three or more generation processes is at least a threshold 90%, for example, only the two highest generation probabilities are displayed and the other remaining generation probabilities are not displayed. The two highest generation probabilities are two generation probabilities higher than any other generation probabilities. In the example described above, a predetermined condition is that the sum of two highest generation probabilities is at least a threshold 90%. Accordingly, a generation parameter such as a generation probability that has no chance of generating a target material can be omitted from the first image, and unnecessary provision of information for the user can be inhibited.

Second information obtainer 106 obtains the second information indicating the composition formula and attribute of the known material. The outputter further generates (i) a map presenting the relationship of composition formulae indicated in the second information items of the one or more known materials, (ii) a map presenting the relationship between a composition formula and an attribute that are indicated in the second information of each of the one or more known materials, or (iii) a map presenting the relationship of attributes indicated in the second information items of the one or more known materials, to output the map to display 108, where each of the composition formulae is the composition formula, each of the attributes is the attribute, and each of the second information items is the second information. For example, the map (iii) is map ma presented in FIG. 33.

With this, even when multiple second information items are displayed, the user can easily find out desired second information from those second information items since the second information items are displayed on a map. As a result, the user can easily select the desired second information and easily view a second image (i.e., a reference image) corresponding to the selected second information.

The attribute of the known material indicated in the second information is at least one of the following: the crystal structure of the known material; a process condition in a generation process for generating the known material; a property value indicating the property degree of the known material; literature information for identifying literature that describes the known material; and an application of the known material. The process condition is a condition used for a generation process and is, for example, a temperature, a time, or the like.

Since this enables the user to know the attributes of each of known materials, the user can easily predict, based on these attributes, information serving as a reference for the generation of a target material.

The outputter further: specifies the type of a generation process implementable by a generation device owned by a user; and assigns mutually different weights to (i) a degree indicated by the generation parameter of the generation process of the specified type, and (ii) degrees indicated by the other remaining generation parameters among the generation parameters of the one or more types of generation processes, to generate the first image indicating the generation parameter of each of the one or more types of generation processes that have been updated With this, it is possible to increase the generation parameter of a generation process implementable by a generation device owned by the user and decrease the generation parameter of a generation process implementable only by a generation device not owned by the user. Accordingly, not only a possibility for the chemical generation of a material but also a possibility for a generation that takes user's environment related to the generation into consideration can be derived as a generation parameter. As a result, the display of a large generation parameter can be inhibited for a generation process implementable only by a generation device not owned by the user, i.e., a generation process with a low generation possibility in terms of user's environment.

Second information obtainer 106 further obtains estimated information regarding the estimation of a generation device that can implement one or more of the other remaining generation processes excluding the generation process of the specified type among the one or more types of generation processes. The outputter further outputs an image indicating the estimated information to display 108.

This enables the user to easily request, in accordance with displayed estimated information, the estimation of a generation device not owned by the user.

The second information of each of the one or more known materials includes an estimated required time which is a time required for generating the known material. The outputter arranges the second information of each of the one or more known materials in an order according to the estimated required time indicated in the second information, and generates the first image indicating one or more second information items arranged in the order, where each of the one or more second information items is the second information.

With this, the estimated required time of each of one or more known materials is displayed, and the user can therefore predict a time required for the generation of a target material based on the estimated required times. Moreover, since the estimated required times are arranged in order and displayed, the user can easily grasp the largest value, the smallest value, or the dispersion of the estimated required time and more appropriately predict the time required for the generation of the target material. If the second information of each of one or more known materials also indicates a generation process for generating the known material, the user can easily determine which generation process can reduce the time required for the generation of the target material. Even when the user considers using a generation process corresponding to the largest generation parameter indicated in the first image for the generation of the target material, for example, if the estimated required time of the generation process is long, the user can determine to use a generation process corresponding to the second largest generation parameter for the generation of the target material. In other words, the user can select a generation process for the target material in consideration of a time required for the generation of the target material.

In each of Variations 1 through 3 of Embodiment 6, each of elements may be configured by dedicated hardware or realized by executing a software program suitable for the element. Each of elements may be realized by a program executor such as a central processing unit (CPU) or a processor reading and executing a software program recorded on a recording medium such as a hard disk or a semiconductor memory. A software program for implementing the generation process display device and the database creation device according to each of the above embodiments causes a computer to execute each of the steps in the flowcharts illustrated in FIGS. 5 to 7, FIG. 9, FIG. 11, FIG. 13, FIG. 16, and FIG. 18.

In each of the embodiments and variations thereof described above, each of elements may be configured by dedicated hardware or realized by executing a software program suitable for the element. Each of elements may be realized by a program executor such as a central processing unit (CPU) or a processor reading and executing a software program recorded on a recording medium such as a hard disk or a semiconductor memory. A software program for implementing the generation process display device and the database creation device according to each of the above embodiments causes a computer to execute each of the steps in the flowcharts illustrated in FIGS. 5 to 7, FIG. 9, FIG. 11, FIG. 13, FIG. 16, FIG. 18, FIG. 23, FIG. 24, and FIG. 27.

The following cases are also included in the present disclosure.

(1) At least one of the devices described above is specifically a computer system configured including, for instance, a microprocessor, read-only memory (ROM), random access memory (RAM), a hard disk unit, a display unit, a keyboard, and a mouse. A computer program is stored in the RAM or hard disk unit. At least one of the devices described above realizes the functions of the device by the microprocessor operating in accordance with the computer program. In order to achieve a predetermined function, the computer program is configured by combining a plurality of instruction codes indicating commands directed to the computer.

(2) Some or all of elements included in at least one of the devices described above may be configured by a single integrated circuit through system LSI (Large-Scale Integration). "System LSI" refers to very-large-scale integration in which a plurality of constituent elements are integrated on a single chip, and specifically, refers to a computer system configured including, for instance, a microprocessor, ROM, and RAM. A computer program is stored in the RAM. The system LSI circuit realizes the functions of the device by the microprocessor operating in accordance with the computer program.

(3) Some or all of elements included in at least one of the devices described above may be configured by an IC card or a single module that is attachable to and detachable from the device. The IC card or module is a computer system configured including, for instance, a microprocessor, ROM, and RAM. The IC card or module may include the aforementioned very-large-scale integration. The IC card or module realizes the functions of the device by the microprocessor operating in accordance with the computer program. The IC card or module may have tamper resistance.

(4) The present disclosure may be the methods described above. Moreover, the present disclosure may be a computer program that achieves these methods using a computer, or a digital signal including the computer program.

The present disclosure may be a computer program or a digital signal recorded on a computer-readable recording medium, e.g., a flexible disk, a hard disk, a compact disc (CD)-ROM, DVD, DVD-ROM, DVD-RAM, Blu-ray (registered trademark) Disc, a semiconductor memory, etc. Moreover, the present disclosure may be a digital signal recorded on any one of these recording media.

The present disclosure may transmit a computer program or a digital signal via, for instance, a telecommunication line, a wireless or wired communication line, a network as represented by the Internet, or data broadcasting.

A program or a digital signal may be recorded on a recording medium and transferred, or may be transferred via a network or the like, so that the present disclosure is implemented by a separate and different computer system.

INDUSTRIAL APPLICABILITY

The present disclosure produces an advantageous effect of, for example, appropriately supporting the search of a generation process for a material by the user, and can be used in computer devices or systems for displaying information regarding the generation process.

The invention claimed is:
1. A generation process output device comprising:
a memory having one or more instructions stored thereon; and
a processor, wherein the processor executes the one or more instructions to cause the generation process output device to:
obtain a first information about a target material;
derive, for each of two or more types of generation processes for generating the target material from a same one or more raw materials, a generation parameter based on a database regarding materials, the two or more types of generation processes being included in a route for generating the target material, the generation parameter indicating a degree that the generation pro- cess is required for generating the target material specified in the first information; and output one or more generation parameters derived, each of the one or more generation parameters being the generation parameter, wherein the deriving comprises inputting information related to the target material to a predictor to derive the generation parameter of each of the two or more types of generation processes for the target material, the predictor being trained using the database to output, in response to an input of information related to a material, the generation parameter of each of the two or more types of generation processes for the material.

2. The generation process output device according to claim 1, wherein the generation parameter indicates the degree as at least one of a generation probability or a ranking, the generation probability is a probability that a generation process of a type corresponding to the generation probability is required for the generation of the target material, and the ranking is achieved by arranging the two or more types of generation processes in order of the degree.

3. The generation process output device according to claim 1, wherein the predictor is trained using the database to output, in response to an input of a descriptor indicating a composition, the generation parameter of each of the two or more types of generation processes for a material having the composition, and the descriptor indicates a composition of the target material to the predictor to derive the generation parameter of each of the two or more types of generation processes for the target material.

4. The generation process output device according to claim 1, wherein the predictor is trained using the database to output, in response to an input of a descriptor indicating one or more raw materials for generating a material, the generation parameter of each of the two or more types of generation processes for the material, and the descriptor indicates one or more raw materials for generating the target material to the predictor, to derive the generation parameter of each of the two or more types of generation processes for the target material.

5. The generation process output device according to claim 1, wherein the processor executes the one or more instructions to further cause the generation process output device to generate a first image indicating the one or more generation parameters; and output the first image to a display to output the one or more generation parameters.

6. The generation process output device according to claim 5, wherein the processor executes the one or more instructions to further cause the generation process output device to:

obtain second information of each of one or more known materials related to the target material from a database regarding materials; wherein the first image additionally indicates the second information of each of the one or more known materials;

based on a single second information item among second information items of the one or more known materials indicated in the first image being selected, obtain, from the database, an area of part of literature that describes a generation process for generating the known material indicated in the single second information item selected, and generate, as a second image, an image indicating the description in the area of the part of the literature, to output the image to the display.

7. The generation process output device according to claim 6, wherein the processor executes the one or more instructions to further cause the generation process output device to based on the generation parameter of each of N types of generation processes is derived and the generation parameter of each of M types of generation processes satisfies a predetermined condition, N being an integer of 3 or greater, M being a predetermined integer of at least 1 and less than N, the M types of generation processes each having a greater degree than other remaining generation processes among the N types of generation processes, generate the first image indicating the generation parameter of each of the M types of generation processes and not indicating generation parameters of the other remaining generation processes among the N types of generation processes.

8. The generation process output device according to claim 6, wherein the processor executes the one or more instructions to further cause the generation process output device to obtain the second information indicating a composition formula and an attribute of the known material, and generate (i) a map presenting a relationship of composition formulae indicated in the second information items of the one or more known materials, (ii) a map presenting a relationship between a composition formula and an attribute that are indicated in the second information of each of the one or more known materials, or (iii) a map presenting a relationship of attributes indicated in the second information items of the one or more known materials, to output the map to the display, each of the composition formulae being the composition formula, each of the attributes being the attribute, each of the second information items being the second information.

9. The generation process output device according to claim 8, wherein the attribute of the known material indicated in the second information is at least one of the following: a crystal structure of the known material; a process condition in a generation process for generating the known material; a property value indicating a property degree of the known material; literature information for identifying literature that describes the known material; and an application of the known material.

10. The generation process output device according to claim 6, wherein the processor executes the one or more instructions to further cause the generation process output device to:

specify a type of a generation process implementable by a generation device owned by a user; and assign mutually different weights to (i) a degree indicated by a generation parameter of a generation process of the type specified, and (ii) degrees indicated by the other remaining generation parameters among the generation parameters of the two or more types of generation processes, to generate the first image indicating the generation parameter of each of the two or more types of generation processes that have been updated.

11. The generation process output device according to claim 10, wherein the processor executes the one or more instructions to further cause the generation process output device to obtain estimated information regarding an estimation of a generation device that can implement one or more of the other remaining generation processes excluding the generation process of the type specified among the two or more types of generation processes, and output an image indicating the estimated information to the display.

12. The generation process output device according to claim 6, wherein the second information of each of the one or more known materials includes an estimated required time which is a time required for generating the known material, and the processor executes the one or more instructions to further cause the generation process output device to arrange the second information of each of the one or more known materials in an order according to the estimated required time indicated in the second information, and generate the first image indicating one or more second information items arranged in the order, each of the one or more second information items being the second information.

13. The generation process output device according to claim 1, wherein the raw material includes an inorganic material.

14. The generation process output device according to claim 1, wherein the target material is an inorganic material or a mixed material generated by mixing an organic material and an inorganic material.

15. A generation process output method comprising the following to be executed by a computer:

obtaining first information about a target material;

deriving, for each of two or more types of generation processes for generating the target material from a same one or more raw materials, a generation parameter based on a database regarding materials, the two or more types of generation processes being included in a route for generating the target material, the generation parameter indicating a degree that the generation process is required for generating the target material specified by the first information; and outputting one or more generation parameters derived, each of the one or more generation parameters being the generation parameter, wherein the deriving comprises inputting information related to the target material to a predictor to derive the generation parameter of each of the two or more types of generation processes for the target material, the predictor being trained using the database to output, in response to an input of information related to a material, the generation parameter of each of the two or more types of generation processes for the material.

16. A non-transitory computer-readable recording medium having recorded thereon a computer program for causing a computer to execute:

obtaining first information about a target material;

deriving, for each of two or more types of generation processes for generating the target material from a same one or more raw materials, a generation parameter based on a database regarding materials, the two or more types of generation processes being included in a route for generating the target material, the generation parameter indicating a degree that the generation process is required for generating the target material specified by the first information; and outputting one or more generation parameters derived, each of the one or more generation parameters being the generation parameter, wherein the deriving comprises inputting information related to the target material to a predictor to derive the generation parameter of each of the two or more types of generation processes for the target material, the predictor being trained using the database to output, in response to an input of information related to a material, the generation parameter of each of the two or more types of generation processes for the material.

* * * * *